US012225855B2

(12) United States Patent
Dahl et al.

(10) Patent No.: US 12,225,855 B2
(45) Date of Patent: Feb. 18, 2025

(54) OVER-CENTER LATCH WITH MOUNT, BASE PLATE, LEVER, AND CENTER PIN FOR COMBINE CONCAVES

(71) Applicant: CALMER HOLDING COMPANY, LLC, Lynn Center, IL (US)

(72) Inventors: Andrew Dahl, Lynn Center, IL (US); Marion Calmer, Alpha, IL (US); Daniel Wallerstedt, Rio, IL (US)

(73) Assignee: CALMER HOLDING COMPANY, LLC, Lynn Center, IL (US)

( * ) Notice: Subject to any disclaimer, the term of this patent is extended or adjusted under 35 U.S.C. 154(b) by 0 days.

(21) Appl. No.: 18/676,197

(22) Filed: May 28, 2024

(65) Prior Publication Data

US 2024/0306551 A1 Sep. 19, 2024

Related U.S. Application Data

(63) Continuation-in-part of application No. 18/520,943, filed on Nov. 28, 2023, which is a continuation of application No. 29/868,301, filed on Nov. 29, 2022.

(60) Provisional application No. 63/579,718, filed on Aug. 30, 2023.

(51) Int. Cl.
| A01F 12/24 | (2006.01) |
| A01F 12/26 | (2006.01) |
| A01F 12/28 | (2006.01) |
| F21V 17/18 | (2006.01) |
| A45C 13/10 | (2006.01) |
| F16B 7/14 | (2006.01) |

(52) U.S. Cl.
CPC ............. *A01F 12/24* (2013.01); *A01F 12/26* (2013.01); *A01F 12/28* (2013.01); *F21V 17/18* (2013.01); *A45C 13/1084* (2013.01); *F16B 7/1418* (2013.01); *Y10S 292/30* (2013.01)

(58) Field of Classification Search
CPC .......... A01F 12/24; A01F 12/26; A01F 12/28; F21V 17/18; A45C 13/1084; F16B 7/1418; Y10S 292/30
See application file for complete search history.

(56) References Cited

U.S. PATENT DOCUMENTS

| 1,840,037 | A | * | 1/1932 | Johan ..................... E05C 3/162 |
| | | | | 292/228 |
| 5,919,087 | A | * | 7/1999 | Strong .................... A01F 12/24 |
| | | | | 460/109 |
| 8,690,652 | B1 | | 4/2014 | Estes |
| 9,080,353 | B2 | * | 7/2015 | Washio ................... E05B 83/30 |
| 9,504,204 | B2 | | 11/2016 | Kile |
| 10,045,487 | B1 | * | 8/2018 | Robertson ............. A01F 12/185 |
| 10,779,474 | B2 | | 9/2020 | Ritter |
| 10,869,427 | B2 | | 12/2020 | Robertson |
| 10,905,050 | B2 | * | 2/2021 | Robertson ............. A01F 12/185 |
| 2007/0178951 | A1 | | 8/2007 | Voss et al. |

(Continued)

*Primary Examiner* — Arpad Fabian-Kovacs
(74) *Attorney, Agent, or Firm* — McKee, Voorhees & Sease, PLC

(57) ABSTRACT

An over-center latch for a concave combine comprises a mount directly attached to a concave combine or an accessory for a concave combine, a pentagonal base plate formed from steel, a lever with a loop at one end that is configured to attach to a catch plate, and a center pin that allows the lever to rotate with respect to a handle. Either the handle or the lever can be pulled into a vertical position.

4 Claims, 47 Drawing Sheets

(56) References Cited

U.S. PATENT DOCUMENTS

| | | |
|---|---|---|
| 2015/0250101 A1 | 9/2015 | Kile |
| 2015/0313085 A1* | 11/2015 | Coppinger .............. A01F 12/46 |
| | | 460/101 |
| 2017/0105351 A1* | 4/2017 | Matway ................... A01F 12/28 |
| 2018/0084728 A1* | 3/2018 | Regier .................... A01F 12/26 |
| 2018/0103588 A1 | 4/2018 | Ritter |
| 2018/0352746 A1 | 12/2018 | Ritter et al. |
| 2019/0166767 A1* | 6/2019 | Robertson ............. A01F 12/185 |
| 2019/0166768 A1* | 6/2019 | Robertson ............. A01F 12/185 |
| 2020/0196530 A1 | 6/2020 | Van Hullebusch et al. |
| 2021/0105946 A1 | 5/2021 | Robertson |
| 2022/0194149 A1* | 6/2022 | Choe ...................... B60D 1/065 |

* cited by examiner

OVER-CENTER LATCH WITH MOUNT, BASE PLATE, LEVER, AND CENTER PIN FOR COMBINE CONCAVES

CROSS REFERENCE TO RELATED APPLICATIONS

This application is a continuation-in-part (CIP) application of U.S. Ser. No. 18/520,943, titled "METHODS OF REGULATING THE FLOW OF MATERIAL OTHER THAN GRAIN THROUGH COMMON CONCAVES WHILE SIMULTANEOUSLY EQUALIZING THE FLOW OF GRAIN THROUGH COMMON CONCAVES", filed Nov. 28, 2023, which claims priority under 35 U.S.C. § 120 to design patent application U.S. Ser. No. 29/868,301, titled "LIMITER PLATES", filed Nov. 29, 2022. These applications are herein incorporated by reference in their entireties, including without limitation, the specification, claims, and abstract, as well as any figures, tables, appendices, or drawings thereof.

This application claims priority under 35 U.S.C. § 119 to provisional patent applications U.S. Ser. No. 63/488,584, titled "SERIES OF ACTUATABLE MATERIAL OTHER THAN GRAIN LIMITING INSERTS FOR COMMON CONCAVE", filed Mar. 6, 2023; and U.S. Ser. No. 63/579,718, titled "METHODS OF REGULATING THE FLOW OF MATERIAL OTHER THAN GRAIN THROUGH COMMON CONCAVES WHILE SIMULTANEOUSLY EQUALIZING THE FLOW OF GRAIN THROUGH COMMON CONCAVES", filed Aug. 30, 2023. The provisional patent applications are herein incorporated by reference in their entireties, including without limitation, the specification, claims, and abstract, as well as any figures, tables, appendices, or drawings thereof.

TECHNICAL FIELD

The present disclosure relates generally to an apparatus and method applicable to the harvest of agricultural crops including a variety of small grain crops. A persistent problem presented to farmers in the threshing operation is the separation of the grain from the plant's stems, leaves, weeds, volunteer plants, and other trash or foreign materials, all of which is referred to as material(s) other than grain (MOG), which are all introduced to the combine in the harvest operation. Critical to maximizing the capture of the grain in harvest and the return obtained by the farmer is the robust, yet efficient separation of the grain from MOG. In particular, but not exclusively, the present disclosure relates to a series of MOG limiting devices that attach to and function in cooperation with a concave positioned within a combine.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

Historically, a number of issues confront the farmer in conjunction with the harvest of large grains and small grains. In one regard, a problem presented to the farmer in harvest is the successful separation of the grain from the MOG which includes the application of abrasing forces upon the crop by acting upon itself as well as the metallic threshing components in the rotor chamber of the combine. Once the grain is separated, there is a need to rapidly direct the grain out of the rotary chamber of the combine while retaining the MOG within the chamber so as to maintain a low chaff load and not overwhelm the grain processing and cleaning system of the combine with MOG thus allowing for grain loss, generally referred to as sieve loss and the introduction of MOG into the grain bin resulting in the application of a dockage penalty to the farmer due to the foreign matter (FM), also referred to as foreign material, in the grain delivered for storage and sale.

In the harvest of large grain like corn, it can be difficult to divert the threshed kernels out of the rotary chamber, leaving the kernels to be acted upon by the continued threshing forces which may result in the fracture or milling of the kernel to create fines. The net result is loss of yield to the farmer. To prevent this damage and yield loss, large openings may be provided in the concaves which allows for expedited removal of the kernels, but also provides a ready pathway for large volumes of MOG to enter the cleaning system.

In the harvest of small grains, the issue presented to the farmer is to retain the crop within the threshing chamber for a sufficiently long time to allow for complete separation of the grain from the pod or other plant covering.

A notable problem with soybeans is an evolving moisture difference in the crop. In past years soybean harvest was made easier by a similar moisture content between soybean pods and stems. In recent years, soybean header widths have grown from 10 feet to 50 feet, and the headers are used on combines having dynamically increased horsepower and capacity. Most recently, the introduction of fungicides which operate to extend plant life and genetic improvements in soybean varieties contribute to difficulties in that the combine now encounters green pods, wet pods, and dry normal pods all in the same swath as well as greener stems then encountered in years past. This creates a wide range of moisture content in the material being processed within the rotary chamber of the combine. As a part of this issue, farmers no longer wait for moisture content in the soybeans to become more homogeneous given the increased number of acres to be harvested prior to the onset of colder and wetter weather. Thus, the threshing operation is faced with the requirement to process green stems with dry stems and green pods with dry pods. As a result, there is a need for increases in threshing power while simultaneously reducing the amount of MOG that passes into the cleaning system. Finally, and notably, the green stems increases the problems of plugging in both the concaves as well as the separation plates—all to the effect of increasing sieve loss.

In this effort to achieve a balance between the separation and capture of the grain while, at the same time, retaining the MOG within the rotary chamber until it is ejected at the back end onto the field historically has resulted in around the adjustment of the combine. Also, the configuration of the threshing concaves and separation grates played an important role in the threshing of the grain and removal from the rotor chamber of the combine, however, it was and remains impractical for the farmer to change out the concaves when transitioning from one crop to another for harvest. Cover or filler plates have been available to the farmer for use with the threshing concaves, but these have been most difficult to install and, further, operated to dam-up or restrict the entire open area on each half of the concaves. This configuration operated to retain the grain within the rotor chamber with resultant damage.

Given the higher volume of plant materials processed by the combine in harvest in combination with the differing moisture values of the plant material, there exists a need in the art for an apparatus which allowed for case of installation combined with a refinement of operation and adjustability so as to produce the maximum beneficial results for the farmer.

SUMMARY

A list of additional problems known in the art follow.

Large wire concaves have been used successfully for many years in position #1 in older combines that were smaller and designed to handle lower corn yields than commonly grown today. In today's high-yielding corn crops harvested in higher-moisture conditions newer combines have more horsepower and bigger appetites. The advancements have overwhelmed the capacity of the concave designs that worked sufficiently in the past. Large wire concave limitations retain shelled kernels in the rotor chamber long enough to be damaged. The low pass-through rate manifests the problems of rotor loss, broken cobs, and damaged grain in the sample. Combine models known in the art need to improve their capacities. Large wire concaves used in position #1 need to increase their concave open areas in an optimized way, all while saving investment dollars in newer equipment.

Concaves known in the art cause broken or splintered cobs in the grain tank because they unnecessarily employ large wire concaves used in positions #2 and #3, thereby causing unnecessary cob breakage. When cobs are broken or splintered into smaller pieces, they fall into the cleaning area and potentially end up in the grain tank.

Many farmers make the mistake of not considering and/or not utilizing cover plates in concave position #1 when harvesting soybeans. When harvesting soybeans, most concaves used for corn harvest have openings too large to retain pods or small grains long enough for them to thresh fully (see bottom left image). Instead, when they enter the threshing chamber, the unthreshed pods fall directly through these large openings onto the auger bed. These unthreshed pods then move into and overload the cleaning system and will need to be separated and sent back a second time to thresh. This process is commonly referred to as "tailings." The tailings also contain clean threshed soybeans, which are unnecessarily rethreshed and can become split. A major problem occurs where pods are mixed with split beans and cannot be differentiated before harvest.

Another major problem in the art occurs where OEM concaves are used for harvesting all crops in all conditions. OEM concaves are either better suited for the harvest of soybeans or maize, for wet conditions or for dry conditions. A middle of the road solution does not work. If the OEM spacing between round bars in round bar concaves is aimed to be used to harvest corn and soybeans, the gaps are too narrow for corn and too wide for harvesting soybeans.

Some modern and/or persisting problems in corn include but are not limited to rotor loss, damaged grain, splintered cobs, and balancing the combination thereof.

Some modern and/or persisting problems in soybeans and other small grains include but are not limited to pods in tank, high tailings, and sieve loss.

The present disclosure sets forth a solution that enhances flow by allowing for the easy installation of inserts when harvesting all crops in all conditions. This is because the solution allows the wider round bar spacing increases flow in corn and uses inserts to narrow the spacing when harvesting all other crops.

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present disclosure to improve on or overcome the deficiencies in the art. Such deficiencies include but are not limited to a lack of control over the gap (opening) size presented by the concaves and/or separation grates within a combine which operate to allow the harvested grain to drop out of the rotor chamber and into the cleaning system for movement to the grain bin of the combine. Presently, the control over the gap size is dependent upon removal of a concave or separation grate and substitution of a completely differing one with a differing gap opening size or configuration or, alternatively, simply plugging the opening to effectively prevent anything from passing out of the rotor chamber. One embodiment of the present disclosure controls the gap size to effectively prevent MOG from passing through or plugging the opening while allowing the grain to drop out of the rotor chamber.

It is a further object, feature, and/or advantage of the present disclosure to independently utilize each of the series of MOG limiting devices, also described herein as MOG limiters. In one embodiment the MOG limiter may be approximately one-quarter of the circumference of the rotor or approximate 50% of the length of the concave openings, and such MOG limiter may be referred to as a Quarter Wrap MOG limiter. In another embodiment, the MOG limiter may be of a length to cover all or nearly all of the openings on one or both sides of the concave which limiter may be referred to as a Half Wrap MOG limiter.

The MOG limiters can be selectively attached to one or more of the concaves of a combine, such as the combine shown and described by the inventors in the co-owned, co-pending patent application U.S. Ser. No. 17/899,240, titled THRESHING GRAINS AND LEGUMES UTILIZING CONCAVES WITH ADJUSTABLE OPENINGS, filed Aug. 30, 2022, which is herein incorporate by reference in its entirety. In addition to the selectivity of restriction as to parts of one or more of the concaves, the MOG limiting devices more closely align to the curvature of radius of the concaves and utilize a preset adjustment to position the insert within each gap of the concave so as to control the remaining opening of the gap.

Another embodiment of the MOG limiter allows for an adjustable tensioning connection that not only secures the limiter in place, but also operates to control the positioning of the insert within the gap so as to control remaining gap size existing between the concave crossbars.

It is still yet a further object, feature, and/or advantage of the present disclosure to improve upon the efficiency of the harvest of soybeans or other small grains where concave cover plates have heretofore been used.

It is still yet a further object, feature, and/or advantage of the present disclosure to install a one or more of the MOG limiters which may be placed on either side of the concave or on both sides of the concave. In total, at least four independently actuatable Quarter Wrap MOG limiters may be installed on each concave. In one embodiment a first plurality of MOG limiters are arranged in series and attach to the right side of the concave and arranged in series; and a second plurality of MOG limiters are arranged in series and are attached to a left side of the concave and arranged in series. In one embodiment a first plurality/series of MOG limiters and a second plurality/series of MOG limiters are arranged in parallel. The MOG limiters can approximate one-half of the curvilinear length of a concave referred to herein as Quarter Wrap MOG limiters or MOG limiters, however it is to be appreciated that embodiments exists where the MOG limiters can approximate one third, one quarter, one fifth, etc. of the curvilinear length of the concave, thereby bringing the total number of independently actuatable MOG limiting devices employed on a single concave to six, eight, ten, etc. In various embodiments, each MOG limiter operates to regulate and distribute the flow of MOG in all rotary combines, single or dual rotor designs, passing through the combine in both the rotor chamber and cleaning system.

A first embodiment of a modified concave includes an enhanced side flow rail, a C-clamp end, a first-end round bar drive, a second end plate, a quarter wrap center catch, an enhanced flow center rail, 0.625 inch diameter round bars, a left over center catch, and a right over center catch.

A second embodiment of a modified concave includes an enhanced side flow rail, a C-clamp end, a first-end round bar drive, a second end plate, a quarter wrap center catch, an enhanced flow center rail, 0.375 inch rub bars with 0.125 inch prouds, 0.625 inch diameter round bars, a left over center catch, and a right over center catch.

A third embodiment of a modified concave includes an enhanced side flow rail, a C-clamp end, a first-end round bar drive, a second end plate, a quarter wrap center catch, an enhanced flow center rail, 0.25 inch flat rub bars, 0.625 inch diameter round bars, a left over center catch, and a right over center catch.

A fourth embodiment of a modified concave includes an enhanced side flow rail, a C-clamp end, a first-end round bar drive, a second end plate, a quarter wrap center catch, an enhanced flow center rail, 0.375 inch flat rub bars, 0.625 inch diameter round bars, a left over center catch, and a right over center catch.

It is still yet a further object, feature, and/or advantage of the present disclosure to provide a hinged connection in the middle of the concave to grab on to each of the first plurality of MOG limiters and the second plurality of MOG limiters. The hinged connection can be a hook.

It is still yet a further object, feature, and/or advantage of the present disclosure to use an adjustable tensioning connection to secure the MOG limiter in place after rotating the hinged connection to a closed position.

It is still yet a further object, feature, and/or advantage of the present disclosure to be able to install one or more MOG limiting devices which allows for controlled and adjustable restrictions of the concave gaps. When secured in place, the MOG limiter aligns the inserts against one side of the round bars of the concave or may position the inserts somewhere within the gap between the round bars to provide more restricted openings to more beneficially impact the capture of grain and the rejection of MOG.

It is still yet a further object, feature, and/or advantage of the present disclosure to widen the air gap between round bars to provide better solutions for harvest of corn, while simultaneously being able to narrow air gaps for harvest of soybeans. For example, ¼ wrap cover plates and ¼ wrap inserts can be quickly installed and/or interchanged to provide an application specific approach for the harvest of corn or soybeans.

It is still yet a further object, feature, and/or advantage of the present disclosure to uniformly distribute grain and MOG in the threshing and separation chambers of the combine. For example, the MOG limiters and/or cover plates described herein can balance an amount of MOG from a rotor area of the combine to a sieve area (also referred to as the cleaning system) of the combine and allow balance of grain throughput from the rotor area to the sieve area with respect to the left side of the concave to the right side of the concave.

It is still yet a further object, feature, and/or advantage of the present disclosure to thresh most of the grain so that it falls out as quickly as possible so that it goes into the auger bed, which is beneath the rotor. Then, it is desirable to separate and to drop the last grain onto the auger bed before the grain exits the rotor and goes onto the ground as rotor loss. The last of the grain should ideally drop out at the last separating grate.

It is still yet a further object, feature, and/or advantage of the present disclosure to maintain the use of the OEM sieves, which are non-adjustable sieves (large and heavy components).

It is still yet a further object, feature, and/or advantage of the present disclosure to place a highest importance on the choice of combines, MOG limiters, and cover plates for the concaves that are in positions #1-#3.

It is still yet a further object, feature, and/or advantage of the present disclosure to improve harvest of grain such that there is 40% less grain loss (~1 kernel/sq ft; 2 soybeans per square foot); an increase in ground speed; less damaged grain; and/or less frustration to the operator of the combine.

It is still yet a further object, feature, and/or advantage of the present disclosure to adjust or achieve a proper balance in the expedited separation of grain into the processing and cleaning system of the combine while retaining MOG within the rotary chamber to be passed out the back, which balance may allow for the removal of bottom sieve in the cleaning system which often operates to disrupt air flow blowing chaff out of the combine and away from the pathway moving grain up to the storage bin.

The present disclosure addresses difficulties presented by the moisture level of the grain being harvested. For example, with corn the use of MOG limiters operates to improve the concave flow-through of small kernel corn in low moisture conditions while preventing the passage of MOG into the cleaning system. In general, as grain moisture in the harvested crop decreases, the usefulness of MOG limiters increases.

The present disclosure addresses difficulties in harvesting small grains including small kernel corn after installing the concaves. For example, it may be necessary to level the rotor after installing the concaves described herein, else the threshing efficiency of the concaves can be diminished. In yet another example, one or more additional inserts and/or cover plates can be added and/or removed at various positions in the threshing and separation chambers (e.g. positions #1-#7) when harvesting tougher crops so as to more fully remove and/or reduce white caps in the sample. In yet another example, the rear separation grates can be rotatably moved into an "up" position, wherein spacers are removed and stored in a closed post.

Cover plates can be used to improve the threshing capability of the rasp bar threshing cylinder while simultaneously capturing additional threshed grain.

The selective use of cover plates versus inserts, including the selective use of same within a single concave, can help balance the flow of MOG and grain through the combine such that it is more equally distributed when passing through various chambers of said combine. This can allow for the better and more efficient harvest a wider variety of crop types without needing to spend large amounts of time installing and uninstalling non-adjustable cover plates, inserts, and the like that at present plague the art.

The cover plate can include an elongated plate body, such as a curvilinear plate, dimensioned to be positioned between two parallel arcuate rails of a threshing concave grate assembly. The curvilinear plate preferably does not span the entire length of said arcuate rails. The curvilinear plate of the cover plate assembly is preferably constructed of a single plate of high strength material such as metal, high strength plastics or composite fabric material. For example, the curvilinear plate can be constructed of steel plating that is permanently bent in an arcuate shape matching the exterior arcuate shape of a threshing concave grate assembly. The curvilinear plate can also be constructed of flexible, high strength materials such as stainless steel or woven composite materials, or alternatively, the cast into a predetermined arcuate shape. It is to be appreciated the material that the elongated body is constructed of may also have a natural porosity and permeability. For example, the elongated body of the cover plate may be constructed of a metal mesh or composite material having organic porosity and permeability characteristics. This can help regulate moisture release from the cover plates should they become wet.

The present disclosure addresses difficulties presented while harvesting in-field. For example, the clearance between the rotor and concaves can be increased and/or decreased during operation of the combine. In yet another example, the operator may increase and/or decrease the rotational speed of the rotor. In yet another example, the operator may alter a velocity of fan speeds. In yet another example, the operator may adjust a distance between the chaffer, sieve(s), concave(s), grate(s), and/or components thereof (e.g., calibrating a position of the louvers that are included in the bottom sieve), etc.

Crops such as rice, wheat, and barley comprise three main parts: the grain—the seeds located at the top; the chaff—the seeds' dry coatings; and the stalk—the overall stem of the plant. Not all three parts are edible. Only the grain can be collected for use in bread and cereal production, which is edible. The other two—chaff and stalk—have to be removed. Threshing refers to the task of separating grain from its attached crop. This grain preparation task comes after the reaping process. Winnowing takes place right after threshing. The process of winnowing frees the grain from the chaff.

The present disclosure addresses difficulties in efficiently threshing grain and those presented by dirty samples. For example, unthreshed grain can be placed in a return of the combine for re-threshing. In some embodiments, the return runs at least at 50% full for proper re-threshing. Where a dirty sample is concerned, a power shut down may be required so that any grain and chaff in the auger bed and/or top chaffer can be dislodged, and the combine can return to more evenly distribute material across the top chaffer and/or bottom sieve.

The MOG limiters disclosed herein can be used in a wide variety of applications for the harvest of a number of crops including, but not limited to soybeans, wheat, oats, rye, barley, sorghum, flax, sunflowers and canola, alfalfa, clover, and also low yielding corn.

It is preferred the threshing systems, accessories, and configurations disclosed herein be safe, cost effective, and durable. For example, the case of installation and removal allows the farmer to only install and utilize the MOG limiters and cover plates when needed for the specific grain being combined thereby reducing wear. Further, the radial geometry and profile of the MOG limiters and cover plates, and the composition of the steel from which they are constructed, allow for extended use over the years while resisting excessive abrasive wear and/or mechanical failures (e.g. cracking, crumbling, shearing, creeping) due to excessive impacts and/or prolonged exposure to tensile and/or compressive forces which may act upon the MOG limiters and cover plates when positioned within the rotor chamber of an operational combine.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the combine.

Methods can be practiced which facilitate use, manufacture, assembly, maintenance, and repair of MOG limiters and cover plates which accomplish some or all of the previously stated objectives.

The MOG limiters and cover plates may be incorporated independently into the harvest system of a combine, single rotor or dual rotor, or may be included in kits which provide additional components to accomplish some or all of the previously stated objectives. For example, kits that upgrade existing concaves or upgrade existing combines with concaves are disclosed herein. The kits can include pairs of MOG limiters that are intended to span half of the length of the concave and half of the width of the concave, and further, pairs of quarter-wrap cover plates. These kits can be installed on said concaves and/or combines depending on the crop to be harvested or the conditions in which harvest occurs. The components in the kit are easily interchanged. The kits can include various numbers of pairs of MOG limiters and cover plates, depending on the climate in which the kit is expected to be used.

In some combines, it may be advantageous to use a full length MOG limiter plate which covers one-half of the concave. One instance involves a combine structure wherein the shortened MOG limiter does not work due to connection problems resulting from lack of access from one side of the rotor chamber.

The adjustable use of the present disclosure provides the user the ability to more precisely balance the MOG retention within the rotor chamber and the release of grain from the rotor chamber and, also, to balance the distribution of material released from the rotor chamber onto the sieve for more efficient cleaning of the grain and increased retention of the grain during the harvest process. In areas where a smaller grain such as soybeans is harvested, immediately followed by the harvest of a large grain such as corn, the ability to adjust or easily remove MOG limiters and/or cover plates is important to facilitation of a seamless harvest which allows for optimum use of good weather days. It is also desirable to be able to adjust the size of the gaps and/or openings in the concave without needing to remove the cover plates and/or inserts, to better accommodate a wider range and/or varying in field conditions (e.g., changing moisture conditions).

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

Figure 1:
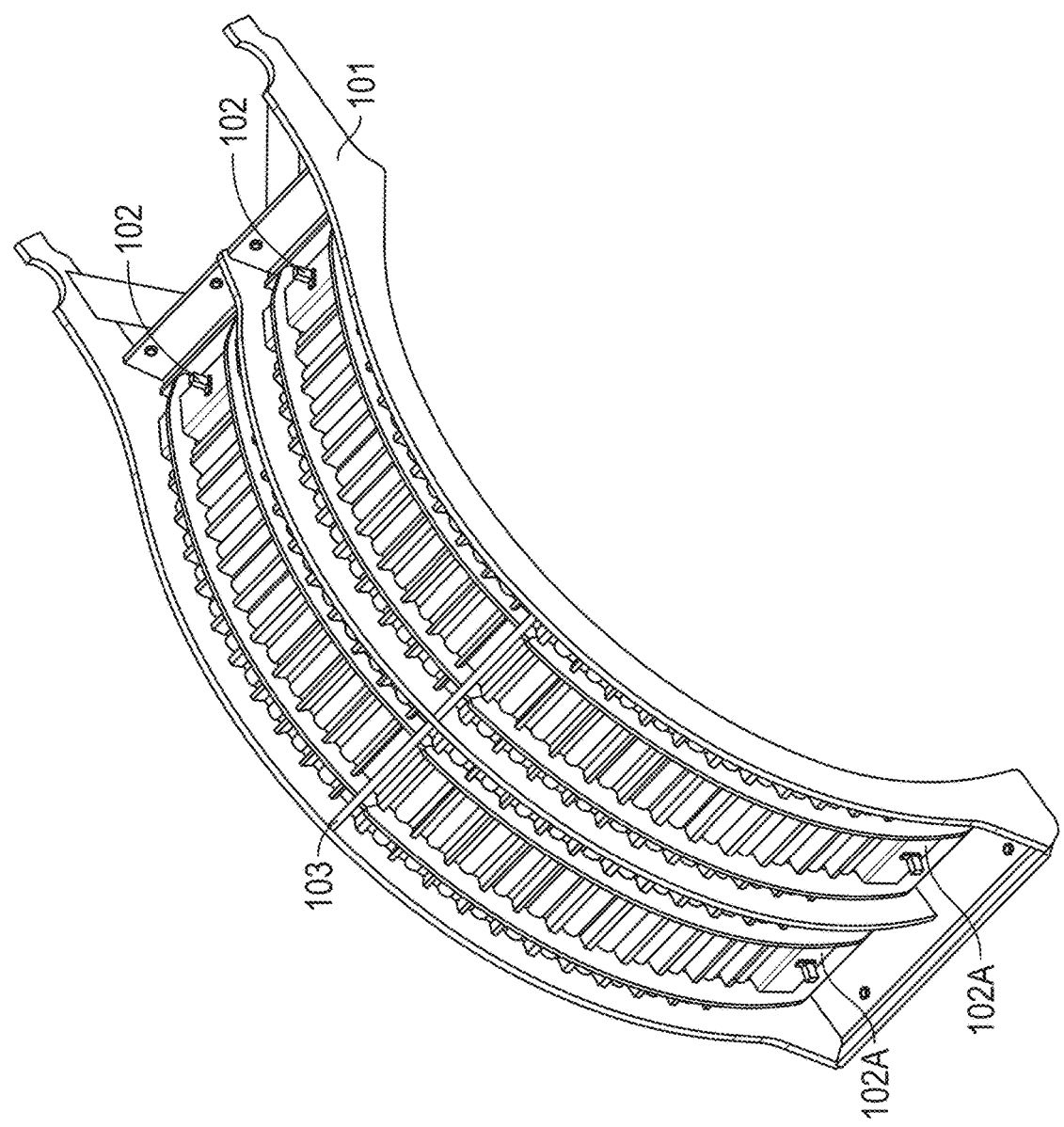
FIG. 1 shows an angled perspective of the underside of a concave with the MOG limiter, according to an embodiment of the present disclosure.
Figure 2:
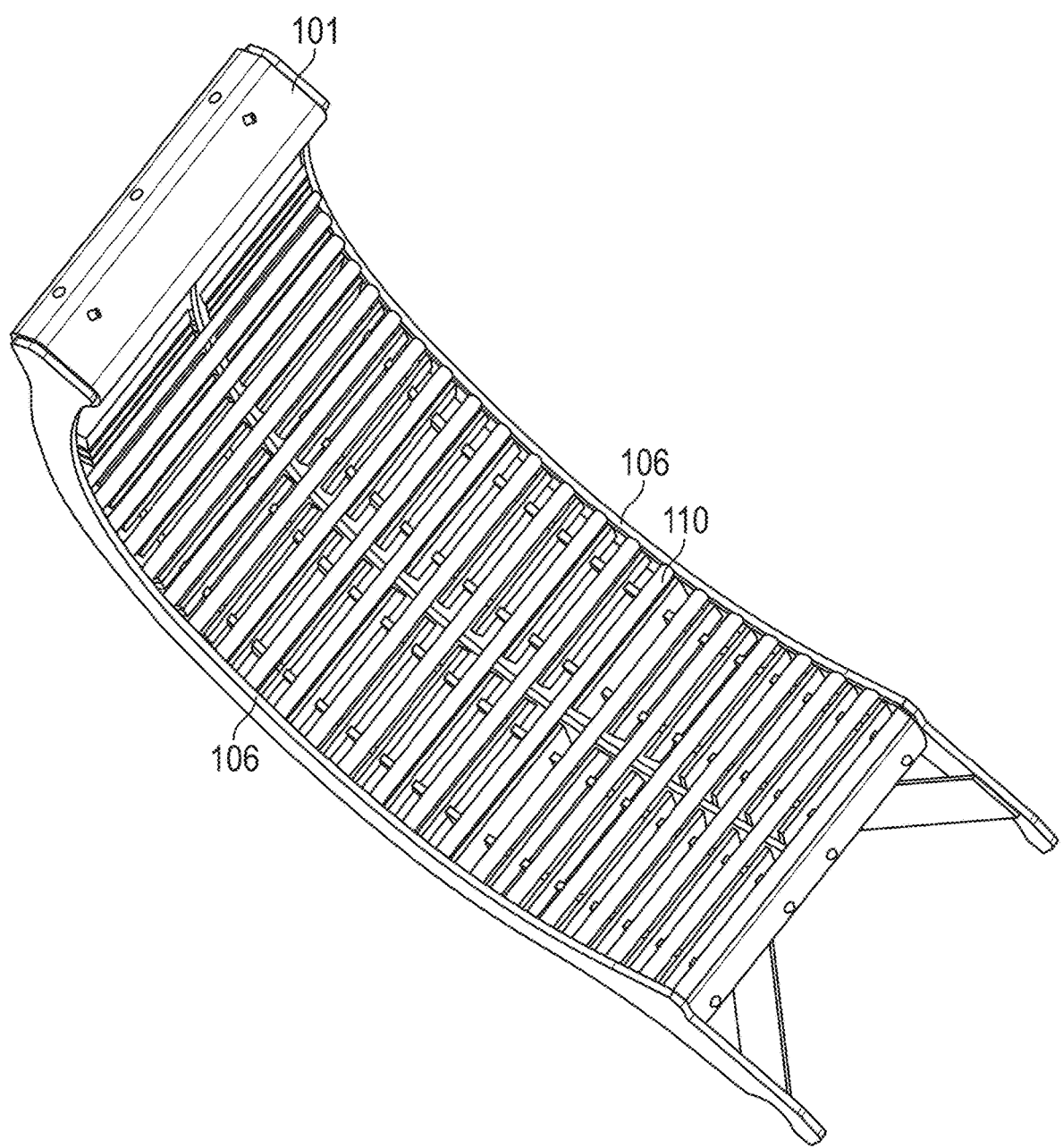
FIG. 2 shows an angled perspective view of the topside of one embodiment of FIG. 1.

An artisan of ordinary skill in the art need not view, within isolated figure(s), the near infinite distinct combinations of features described in the following detailed description to facilitate an understanding of the present disclosure.

DETAILED DESCRIPTION

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

Rotor combines utilize an internal chamber wherein the harvested plant material including the grain is passed from the head of the combine into the rotor chamber. This rotor chamber processes the material by a threshing operation and a concurrent separation operation. A series of curved apparatus are positioned at the bottom of the rotor chamber whereat grain is allowed to drop out of the chamber into the cleaning system which operates to clean the grain then convey and store the grain in the grain bin or tank in the combine. As an example of this set up, the John Deere single rotary combines have seven curved apparatus running from the front of the chamber rearwardly and positioned side-by-side in positions #1-#7. Positions #1-#3 are customarily referred to as the threshing section and are occupied by threshing concaves, and positions #4-#7 are customarily referred to as the separation section and are occupied by separation grates.

The symptoms indicative of inefficiency in the harvest of small grains such as soybeans include the presence of unthreshed pods in the grain tank or bin of the combine, excessive return tailings, MOG in the grain tank, split beans, and/or sieve loss. A primary contributor to these symptoms involves the combine which historically has utilized a single concave design in the threshing of multiple grains, larger and smaller in size.

The combine concaves are a key part of a combine harvester, with two vital roles in the harvesting process: freeing seeds from plants (threshing), and moving them away from the chaff (winnowing). The quality of the harvested crop depends significantly on the quality and configuration of combine concaves in use.

As shown in FIGS. 1A-1B, FIGS. 2-4, and FIG. 51-70, concaves 101, 500, 600, 700, 800 are elongated, heavy, and curvilinear. In a combine, several concaves 101, 500, 600, 700, 800 work in tandem to thresh and separate grain from MOG and are positioned in series. The concaves 101, 500, 600, 700, 800 represent a substantial expense if differing concave designs are used by the farmer. Further, concaves 101, 500, 600, 700, 800 are difficult and time-consuming to change out in a combine. At harvest, time is critical to take-in the crop at the optimal time as conditions for harvest change with the weather. Thus, the dilemma presented to the farmer is which concave design to use within the combine and whether to change-out the concaves or live with what is in place when the combine is originally set-up for harvest.

For example, concaves 101, 500, 600, 700, 800 that are used in the harvest of smaller grains can include narrower gaps and/or openings to limit the amount of MOG that drops out of the chamber and into the cleaning system. Concaves 101, 500, 600, 700, 800 that are intended for the harvest of larger grains should include gaps that still allow the larger grains to drop out of the chamber and into the cleaning system.

The concaves 101, 500, 600, 700, 800 are generally constructed from stainless steel or plastic. The materials that are used to construct the concaves 101, 500, 600, 700, 800 should be high-quality durable materials that stand up to wear and tear over repeated use without losing their threshing efficiency.

The concaves 101, 500, 600, 700, 800 are also preferably kept in good condition so that they can effectively separate grain from chaff without becoming clogged or damaged by stray stones or other foreign objects in the field. Maintenance of the concaves 101, 500, 600, 700, 800 can be a key part of achieving optimal performance with the concaves 101, 500, 600, 700, 800. The concaves 101, 500, 600, 700, 800 must not only be kept free from debris, but also the farmer should periodically evaluate whether the openings in the concaves 101, 500, 600, 700, 800 are an appropriate size for the crop to be harvested.

However, because of the aforementioned hardship(s) associated with changing out the concaves 101, 500, 600, 700, 800, it is highly desired to be able to use concaves 101, 500, 600, 700, 800 that are suitable for both larger and smaller grains. One such solution is to always use concaves 101, 500, 600, 700, 800 that are suitable for larger grains, and to attach removable inserts 105, 1100, 1200 and/or cover plates 300, 400, 900, 1000 which narrow the gaps and/or openings when harvesting smaller grains. The removable inserts 105, 1100, 1200 and/or cover plates 300, 400, 900, 1000 could, for example, attach to the concaves 101, 500, 600, 700, 800 at upper and lower connection points 102, 102A.

The cover plates 300, 400, 900, 1000 retain plant material to fill the large openings and create a mattress-type surface. The matte of plant material provides a gentle & natural rubbing action against each other as they travel over the horizontal grain separation bars while retaining the material in chamber for enough time to complete even the tough or green pods. The cover plates 300, 400, 900, 1000 also allow the operator to run the bottom sieve further open, pushing more air through the top sieve, reducing pod material in the tank. The use of natural plant materials reduces the chances of the rotor splitting soybeans over the longer duration in the chamber.

Use of the cover plates 300, 400, 900, 1000 allows for a more complete thresh, reduces tailings, and creates a cleaner grain sample.

A condition addressed by embodiments of the present disclosure involve the harvest of high moisture grain. In such conditions, the grain is more likely to clump or bridge the gap between concave crossbars. In such situations, MOG limiters can quickly go from helping eliminate MOG in harvested material to plugging of said gaps.

In breakdown of the threshing section of the rotor chamber of a combine, experimentation and study with the harvest of soybeans has shown that historically pods fall through the concave in the forward or #1 position due in substantial part to the failure to retain the pods within the rotor chamber to allow the pod-on-pod abrading action created by the revolving rotor and attached rasp bars which functions to open the pods and separate the beans therein. Excessive amounts of MOG historically are the function of MOG not being retained within the rotor chamber and falling through the concaves at positions #2 and #3. If OEM filler inserts are used in positions #2 and/or #3, the resultant problem is often loss of harvest yield due to the retention of the beans within the rotor chamber resulting in abrasive fracturing or crushing or their loss out the back end of the combine with the MOG.

The present disclosure is designed to address the issue of retaining MOG within the rotor chamber by metering the removal of grain from the rotor chamber. The MOG limiters thereby allow for the timely and efficient removal of the beans or other small grains, including small kernel corn, from the threshing portion of the rotor chamber of the combine. The more quickly the separated grain is removed from the rotor chamber, the lesser the process load is placed on the threshing and separation functions which increases the overall efficiency of the harvest process while maintaining heightened integrity of the grain.

The present disclosure allows the farmer to balance the load of the harvest operation in a variety of different ways. For example, several embodiments disclosed herein allow for more control over the volume of MOG dropping out of the rotor chamber to the sieve area.

In another respect, the present disclosure allows for a balance of grain throughput from rotor chamber to the sieve area. This balance relates to the constant volume flow of grain deposited through the concaves on left side versus right side. Historically, experimentation and study show that rotary combines deposit grain out of the rotor chamber heavily on the right side in what may be referred to as the 3-6 o'clock position when viewed from a position standing behind the combine. As the grain is transferred back to the cleaning area wherein the sieve is positioned, the right side of the sieve receives the majority of the material that exited the rotor chamber for cleaning while the left side of the sieve receives substantially lesser material for cleaning. Thus, the right side of the sieve is overloaded which negatively impacts its efficiency of properly separating grain from the remaining MOG and allows a greater amount of grain to be lost out of the back end of the combine. With the present disclosure, the farmer can fine tune the combine to balance out the loading of the back end to improve grain cleaning and retention for deposit in the grain tank.

Referring now to the assembly 100 shown throughout FIGS. 1-8, the MOG limiter 105 is comprised of a series of equally spaced gap bars or inserts 106, often in a rectangular configuration, positioned on the face side of the MOG limiter 105.

The series of equally spaced gap bars or inserts 106 are retained by dual, parallel rail supports 107 having a curvilinear geometry. The radius of curvature of the face side of the rail supports 107 approximates the radius of curvature of the underside of the concave 101. The inserts 106 are vertical to the rail supports 107 and are positioned to fit up and into the gap between the concave crossbars 110 to create controlled openings.

According to a preferred embodiment, the thickness of the rails is approximately 1 inch. According to yet another embodiment in need of an increase in concave open area (COA), the thickness of the rails is approximately ¼ inch where the distance in the outer surfaces of the rail supports 107 remains the same.

In one embodiment, the MOG limiter is attached to the underside of the concave 101 utilizing on one end a hinge point at the end of each rail support 107 which is insertably retained in a slotted opening of a crossbar member positioned and affixed to the bottom side of the concave 101. On the other end, a mounting plate 108 is used through which a bolt on positioned on the concave 101 protrudes with retention accomplished by use of a washer and nut assembly.

In one embodiment an over-center latch assembly is utilized in cooperation with the mounting plate 108.

In one embodiment the attachment means is adjustable so as to slidably move the inserts within the gaps between the concave crossbars so as to further control the opening remaining within said gaps.

In embodiments rounded notches 109 are made on the face side of each rail support 107 which conform to the rounded geometry of the crossbars 110 on the concave 101, and function to position the notched surface firmly against the underside of the concave 101 round crossbar 110.

Figure 3:
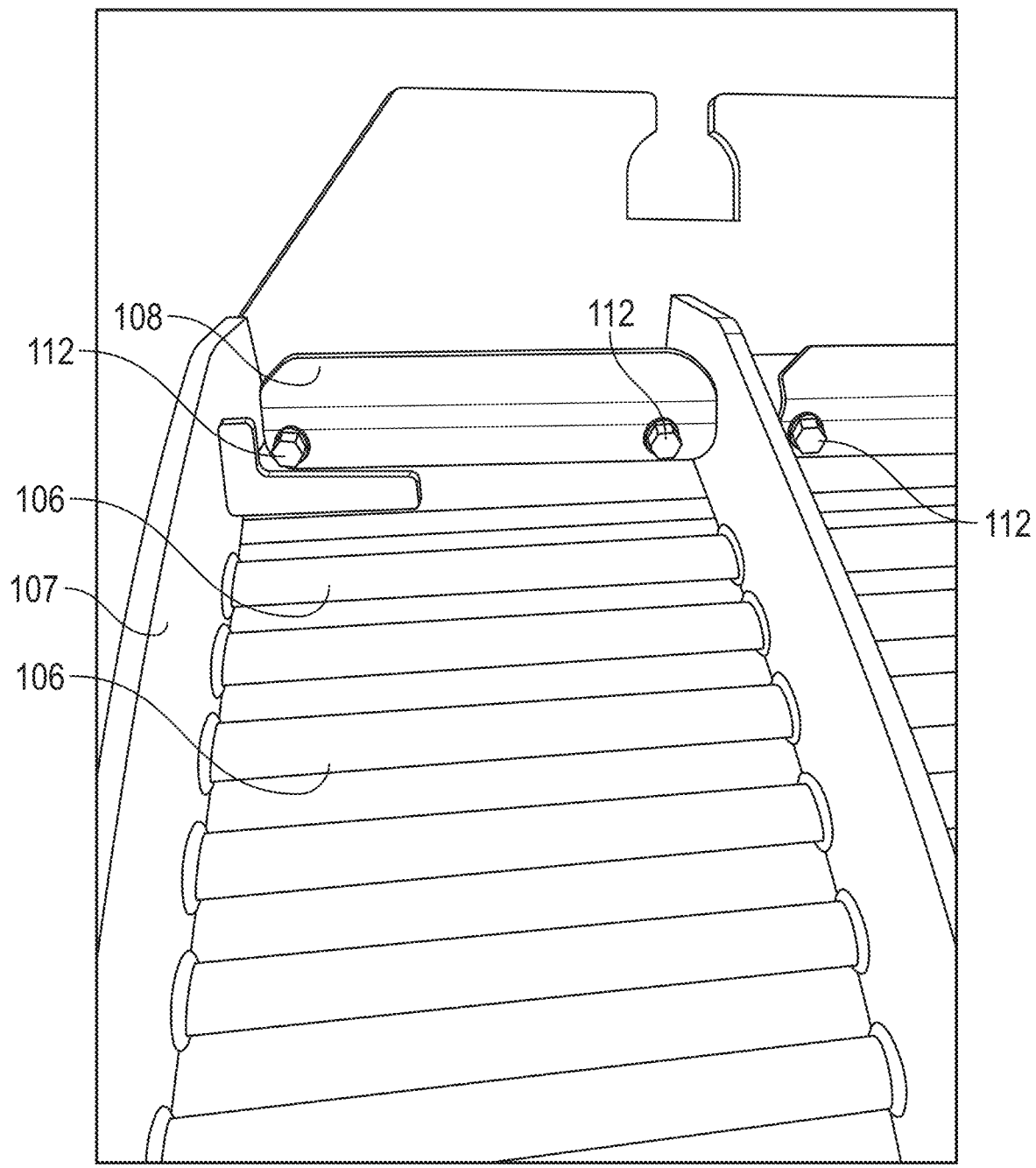
FIG. 3 shows a detailed view of the MOG limiter mounted behind the round bars of a concave.

In the embodiment as shown in FIGS. 1'3, the MOG limiters 105 are of a length which approximates one-half of the curvilinear length of the concave 101. A plurality of bolt, washer and nut assemblies protrude downwardly from the underside of the concave 101 with a single assembly positioned in the middle of each side as shown on FIGS. 1-2 which in cooperation with the mounting plate 108 on the MOG limiters 105 form an upper concave connection 102 and a lower concave connection 102A in each half of the concave 101 underside. In the cross frame 103 are positioned openings such as insert slots 104 to receive the hinge point 111 located at the end of each rail support 107. The hinge points 111 are slidably inserted into the opening 111 and then rotated upwardly to be positioned adjacent to and in conformity with the curvature of the underside of the concave 101 with the connection assemblies 102 & 102A holding the MOG limiter 105 in place. As shown in FIG. 3, bolts 112 can be used to secure the 108 mounting plate to the MOG limiter 105. The mounting plate 108 can directly attached to the axial bar 106, one or more of the rail supports 107, and/or additional supports that are added to the system to make for more robust securement.

Figure 4:
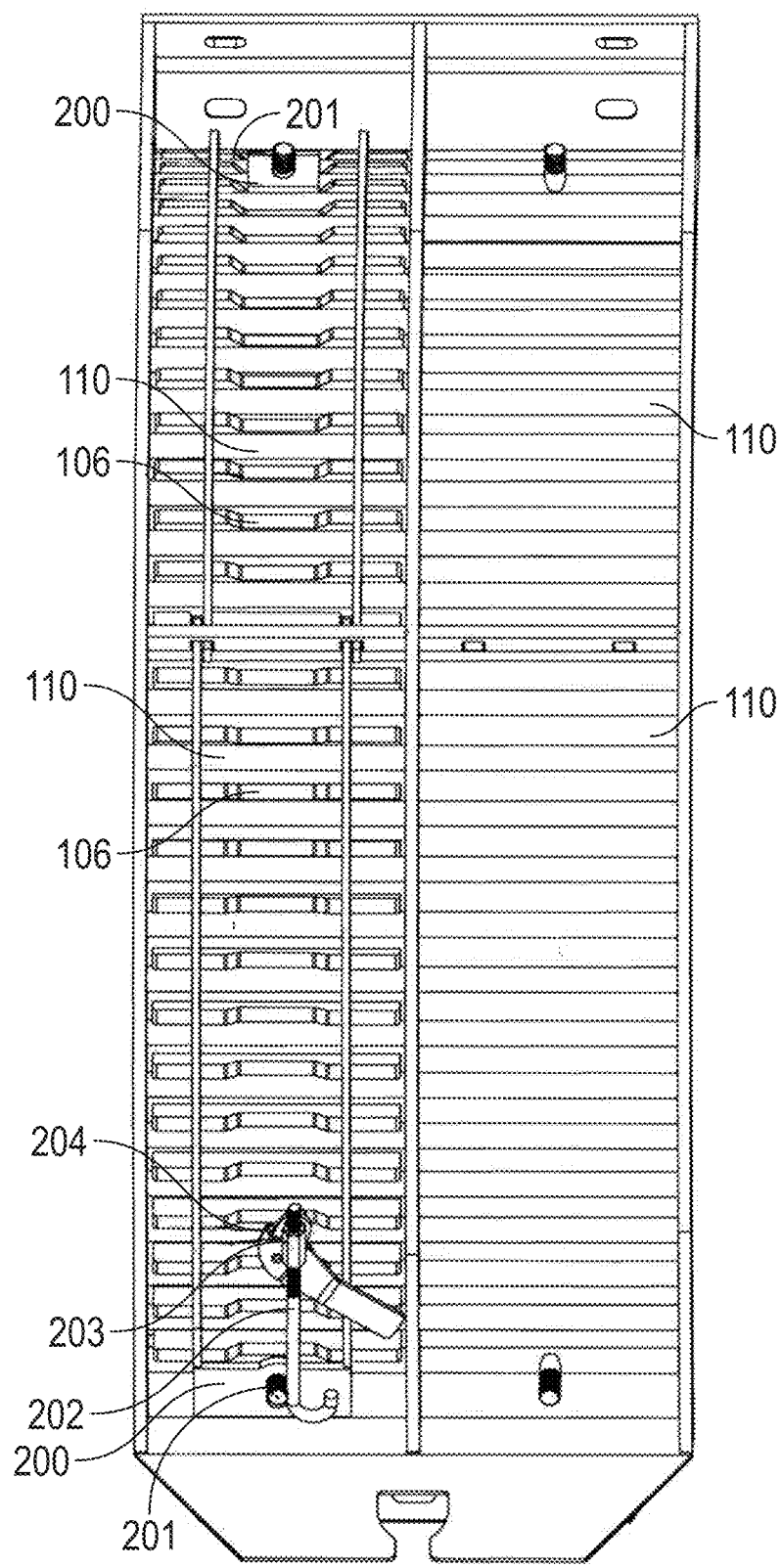
FIG. 4 shows a bottom plan view similar to that shown in FIG. 1, including exemplary hardware for attaching the MOG limiter to the concave at the upper and lower connections, according to an embodiment of the present disclosure.

FIG. 4 emphasizes view of another example of mounting hardware that can be used to attach the MOG limiter 105 to the concave 101 as depicted in FIGS. 1-5. For example, a mounting plate 200 is shown receiving a threaded post 201 that allows for a J-hook 202 to attach thereto. The J-hook includes a straight end (the top of the "J") and a hooked end (the bottom of the "J"). The J-hook 202 is threaded at the straight end. In the embodiment shown, the threads are male threaded configured to receive a female threaded hexagonal sleeve 203, which is either directly and/or indirectly attached to the lever 204.

The lever 204 comprises a beam or rigid rod pivoted at a fixed hinge, or fulcrum. The rigid body of the lever 204 is capable of rotating about said fulcrum, which in this case can be the hexagonal sleeve 203, an indirect attachment that connects to said sleeve 203, and/or any other suitable component which allows pivotal movement such that the J-hook 202 can be move in a rotational direction. After being moved in a rotational direction by the lever 204, the J-hook 202 can latch onto the threaded post 201, and in the embodiment shown in FIG. 6, indirectly to the mounting plate 200. On the basis of the locations of the sleeve 203, load from the MOG limiter 105, and effort required to be input by the user, the lever 204 is designed to amplify the input force from a user to provide a greater output force. In other words, the user provides leverage and gains a mechanical advantage in that the ratio of the output force to the input force is positive.

Figure 5:
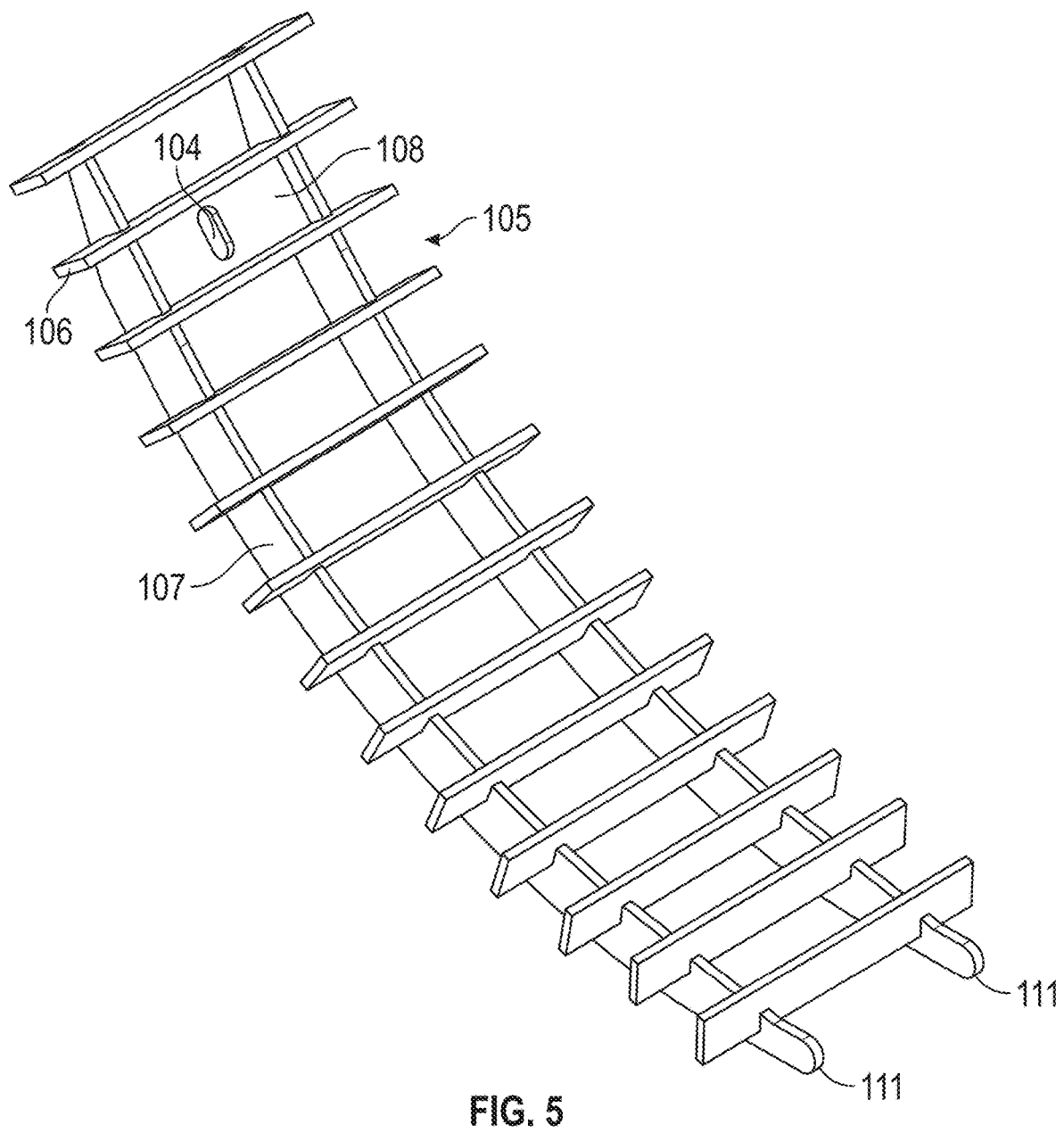
FIG. 5 shows an angled perspective view of a mog limiter, according to an embodiment of the present disclosure.
Figure 6:
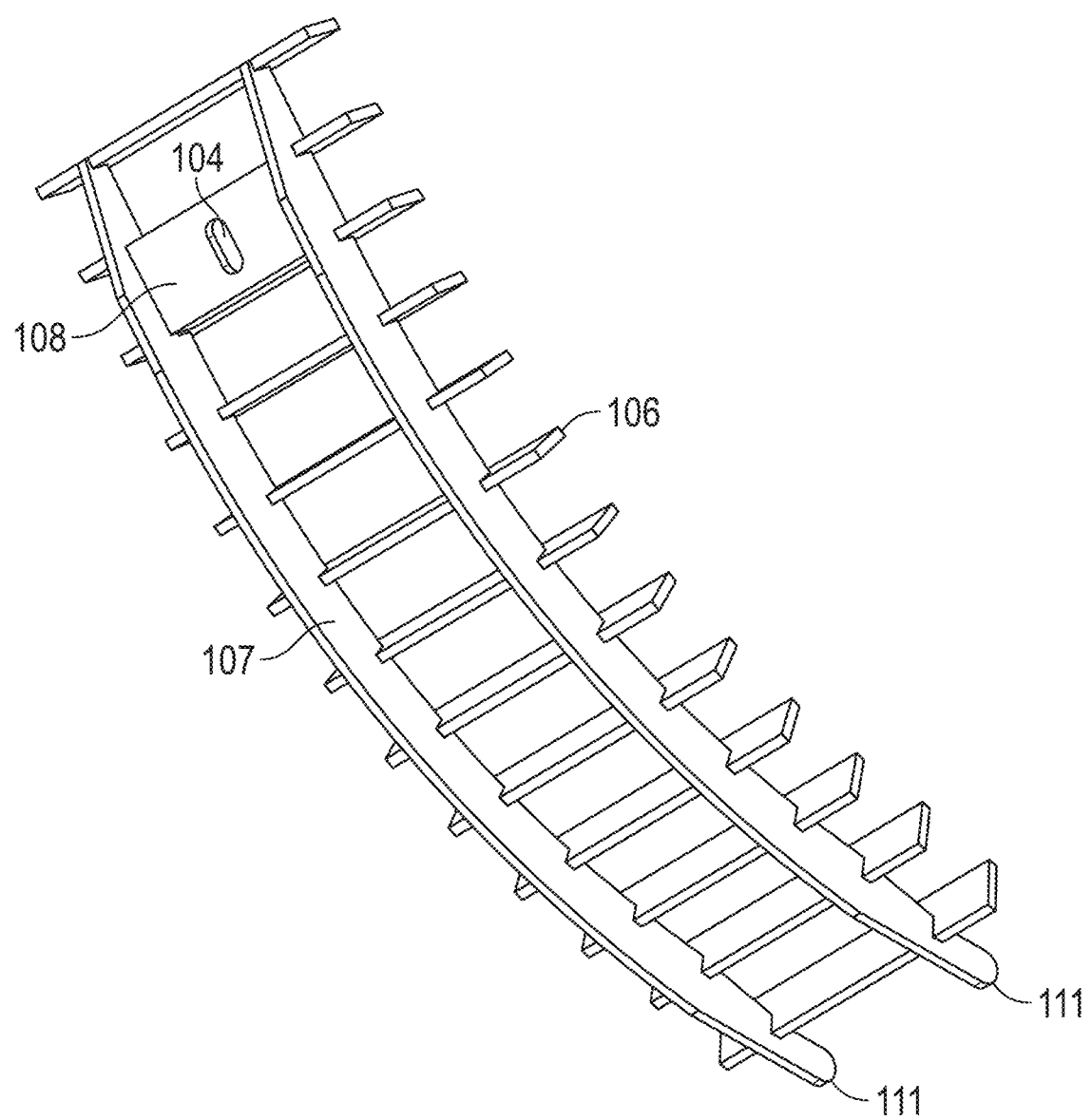
FIG. 6 is an angled perspective view showing underside of the embodiment of FIG. 5.

The embodiment disclosed in FIGS. 5-6 includes a face of the rail supports 107 that is smooth and allows the face to slide against the underside of the crossbars 10 of the concave 101 so that an adjustment mechanism at one end of the MOG limiter may operate to adjust and slidably position the inserts 106 within the gap to allow for greater control of the size of the gap and, thus, greater control by the farmer as to the operations of the threshing operation in the combine based upon weather, field conditions, crop conditions and grain type.

Figure 7:
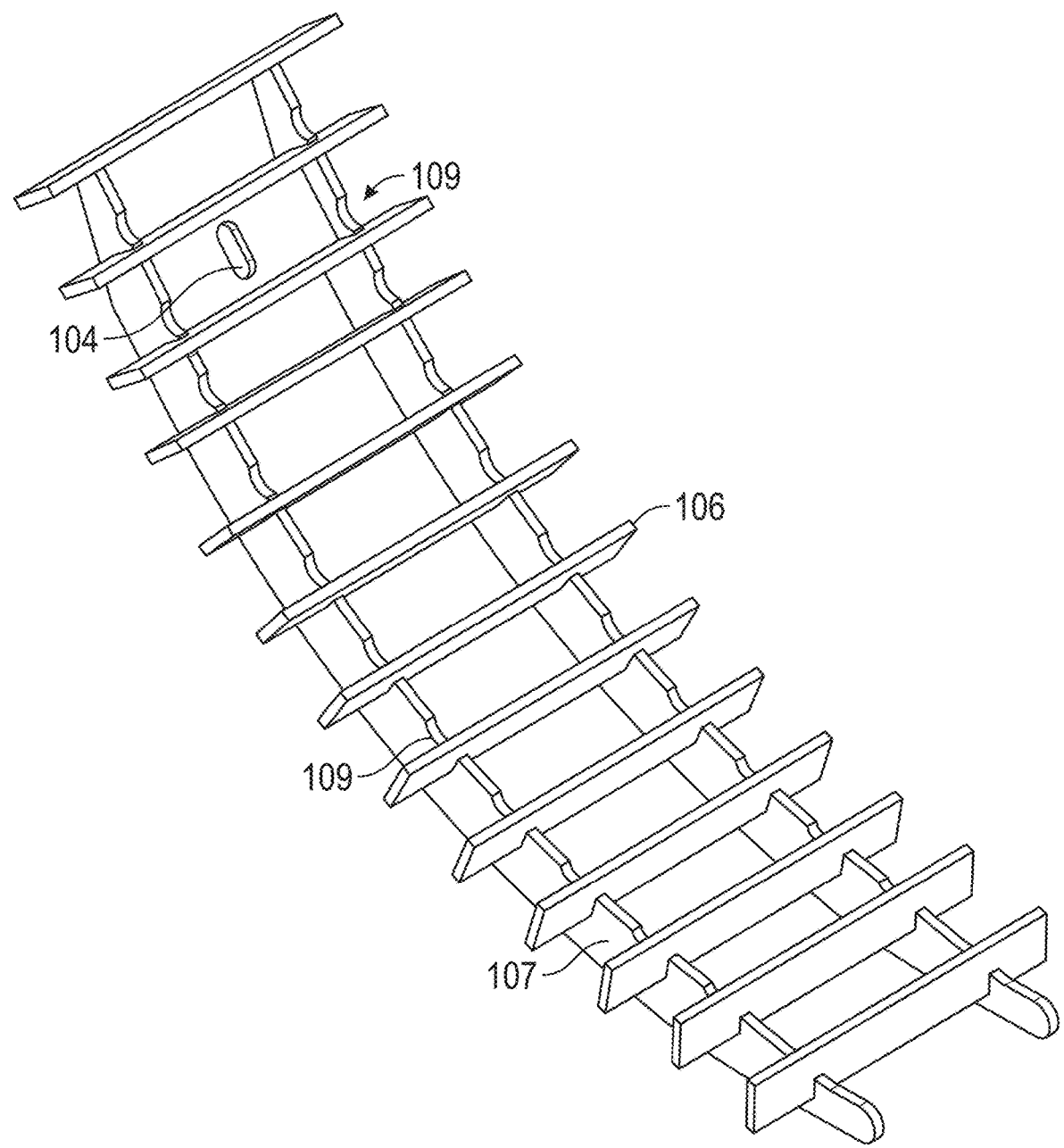
FIG. 7 is an angled view showing a topside of off-center-style Limiter plates, according to an embodiment of the present disclosure.

The embodiment disclosed in FIG. 7 positions the notches 109 adjacent to the inserts 106 which operates to position the inserts 106 adjacent to the crossbars 110 of the concave 101 creating a more restricted area on the side nearest to the crossbar 110 and a greater opening in the remaining unrestricted gap area.

Figure 8:
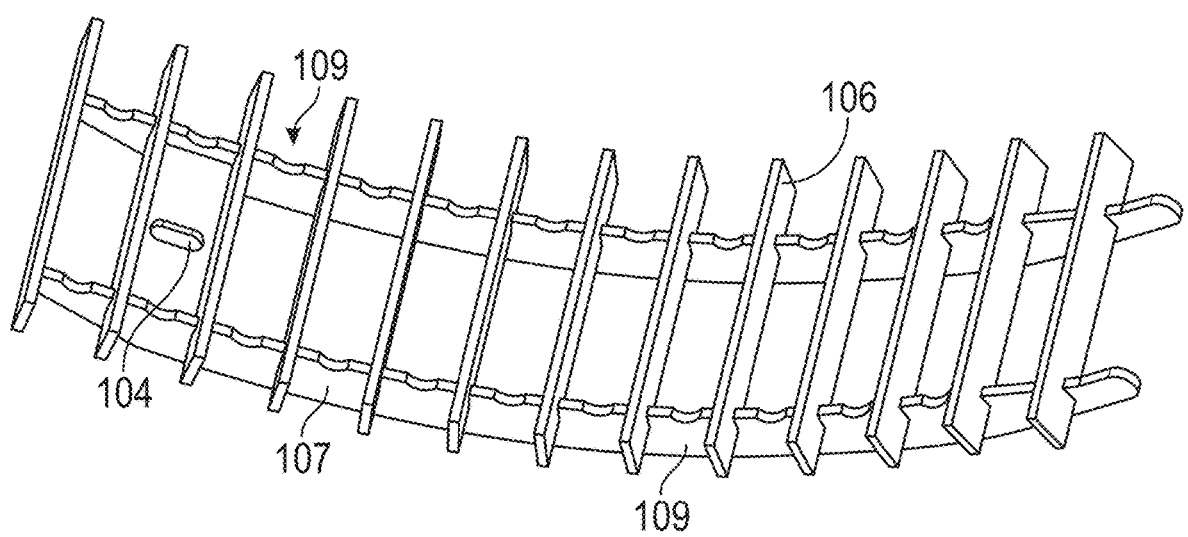
FIG. 8 is an angled view showing a topside of guide-style Limiter plates, according to an embodiment of the present disclosure.
Figure 9:
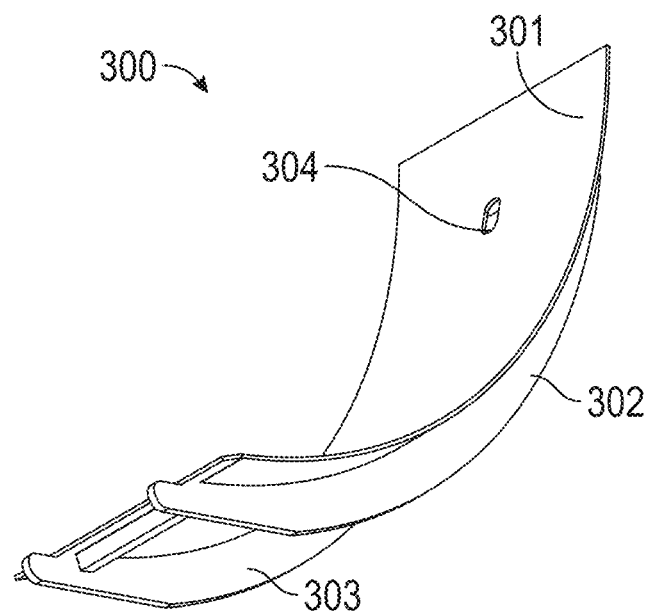
FIG. 9 is a first angled perspective view showing a left-side cover plate that can mount to the concave of a combine.
Figure 10:
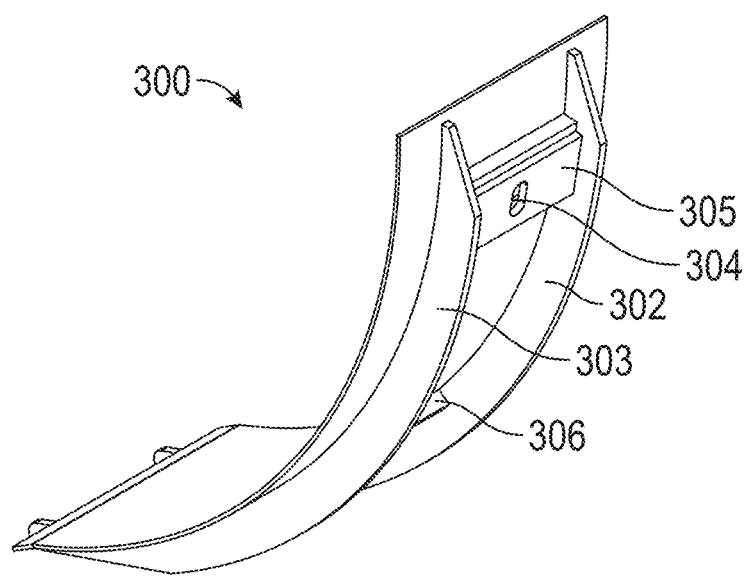
FIG. 10 is a second angled perspective view of the cover plate of FIG. 9.
Figure 11:
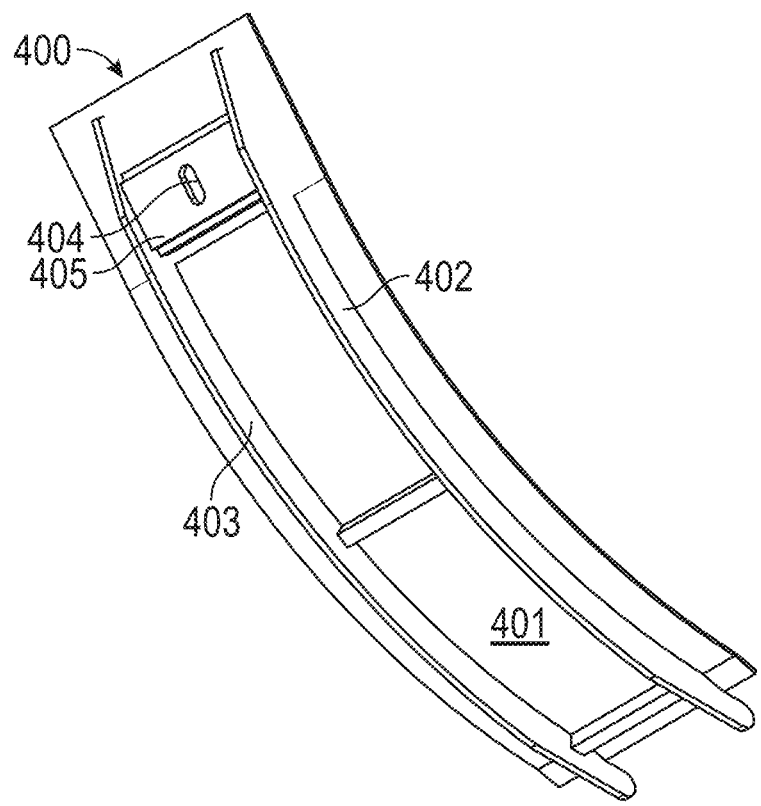
FIG. 11 is a first angled perspective view showing a left-side cover plate that can mount to the concave of a combine.
Figure 12:
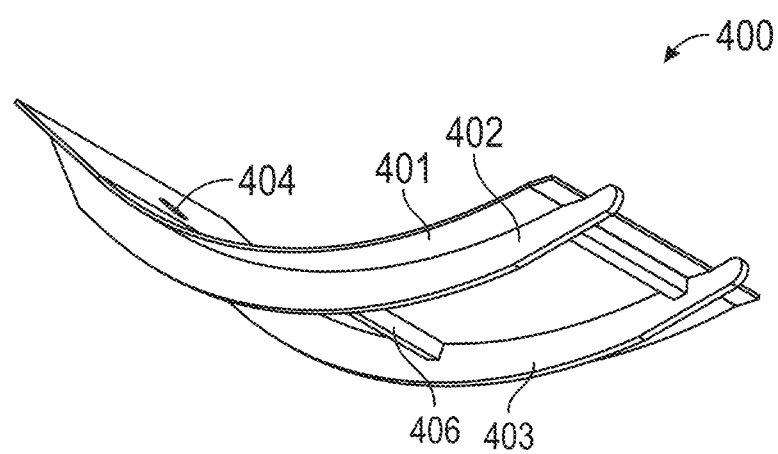
FIG. 12 is a second angled perspective view of the cover plate of FIG. 11.
Figure 13:
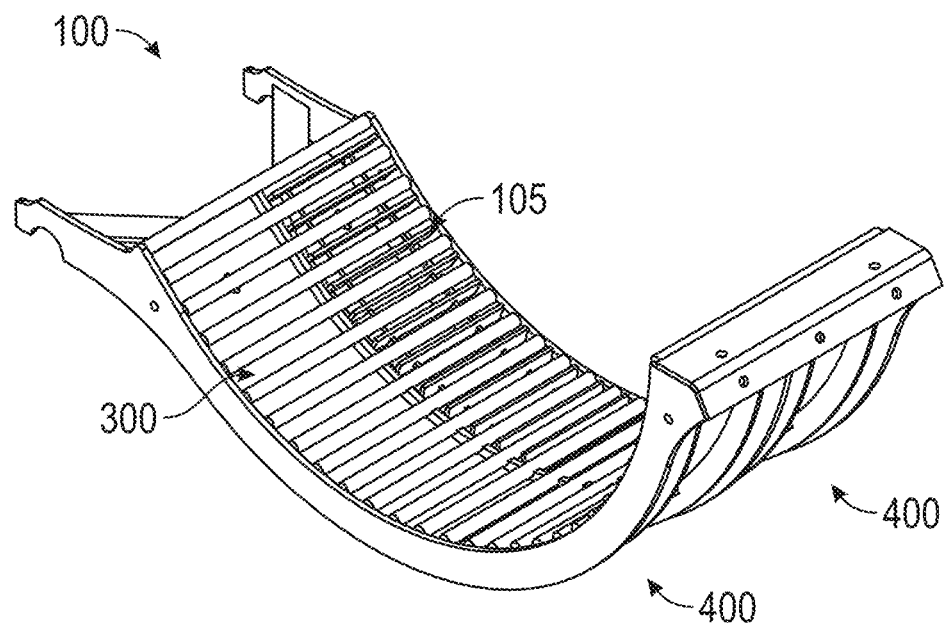
FIG. 13 is a concave, MOG limiter, and cover plate combination that includes two right-side cover plates, one left-side cover plate, and a MOG limiter installed on the left-side of the concave.
Figure 14:
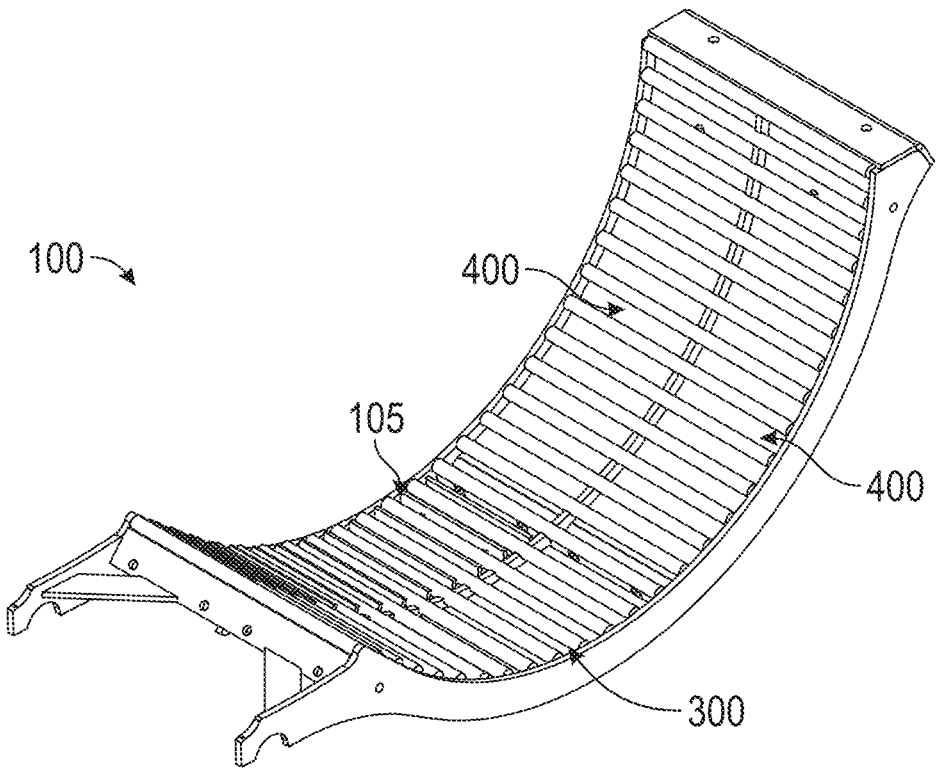
FIG. 14 is a second angled perspective view of the combination of FIG. 13.
Figure 15:
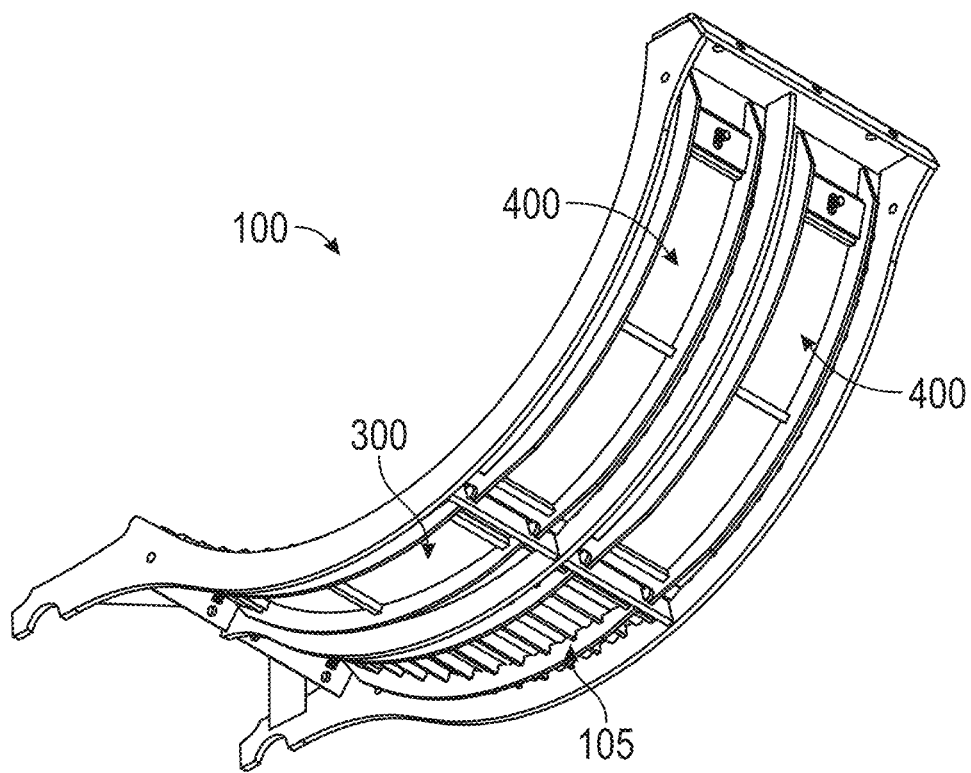
FIG. 15 is a third angled perspective view of the combination of FIG. 13.
Figure 16:
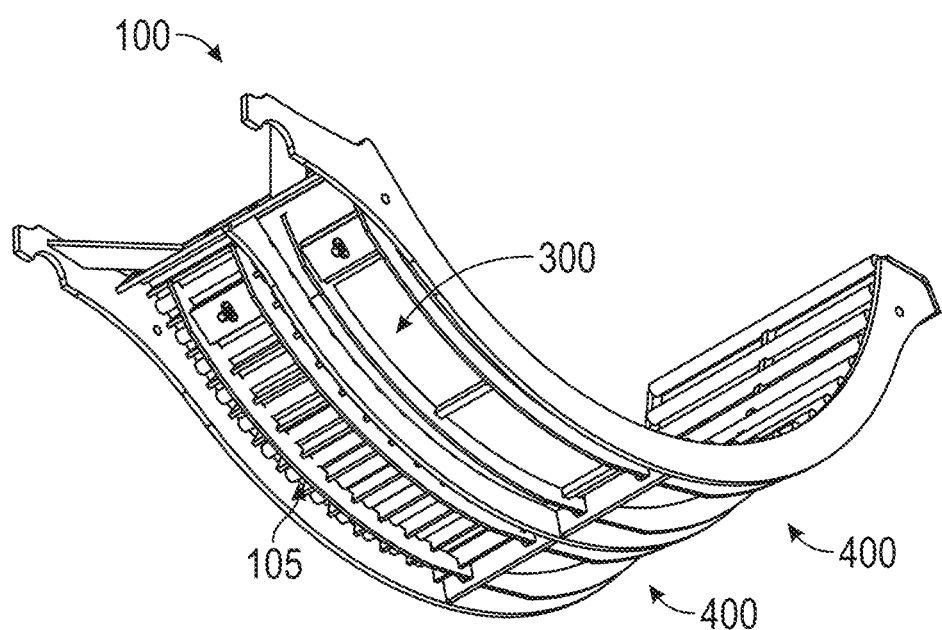
FIG. 16 is a fourth angled perspective view of the combination of FIG. 13.
Figure 17:
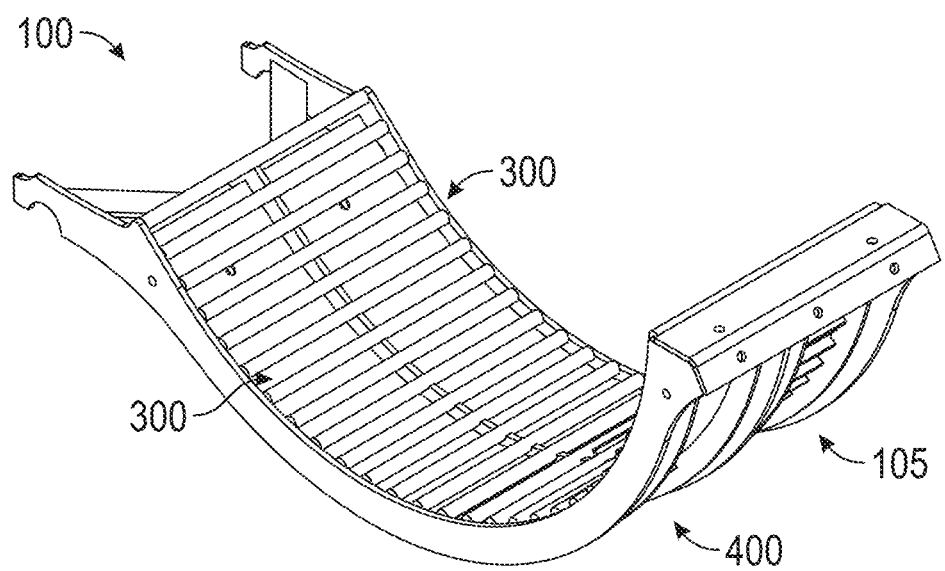
FIG. 17 is a concave, MOG limiter, and cover plate combination that includes two left-side cover plates, one right-side cover plate, and a MOG limiter installed on the right-side of the concave.
Figure 18:
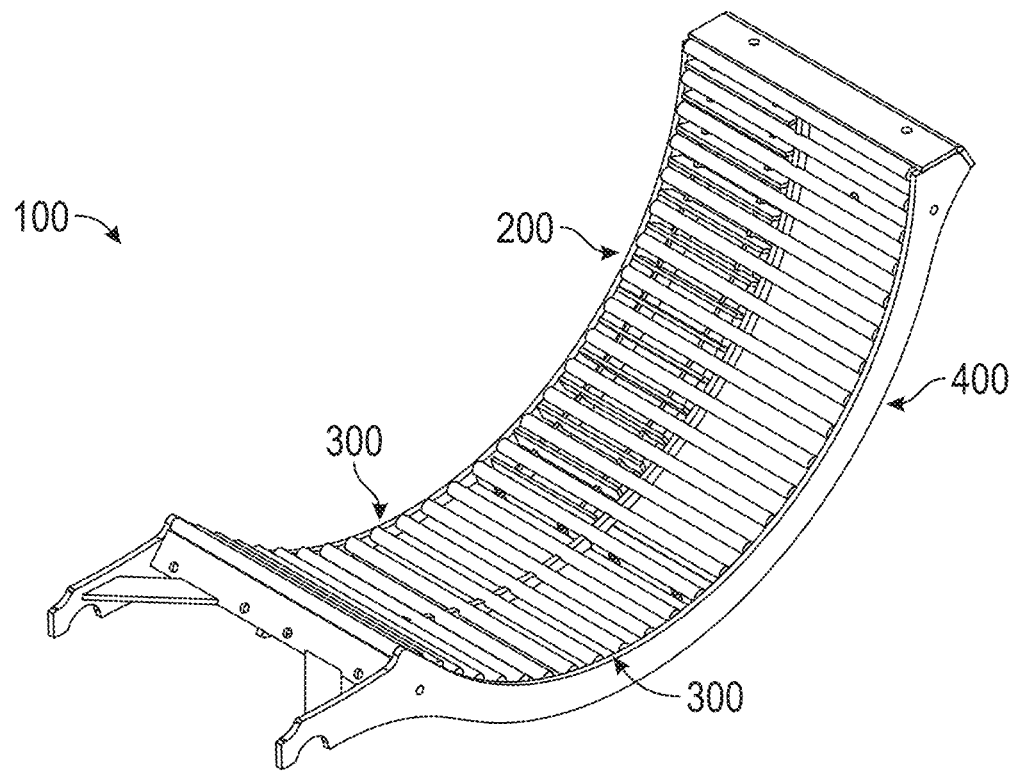
FIG. 18 is a second angled perspective view of the combination of FIG. 17.
Figure 19:
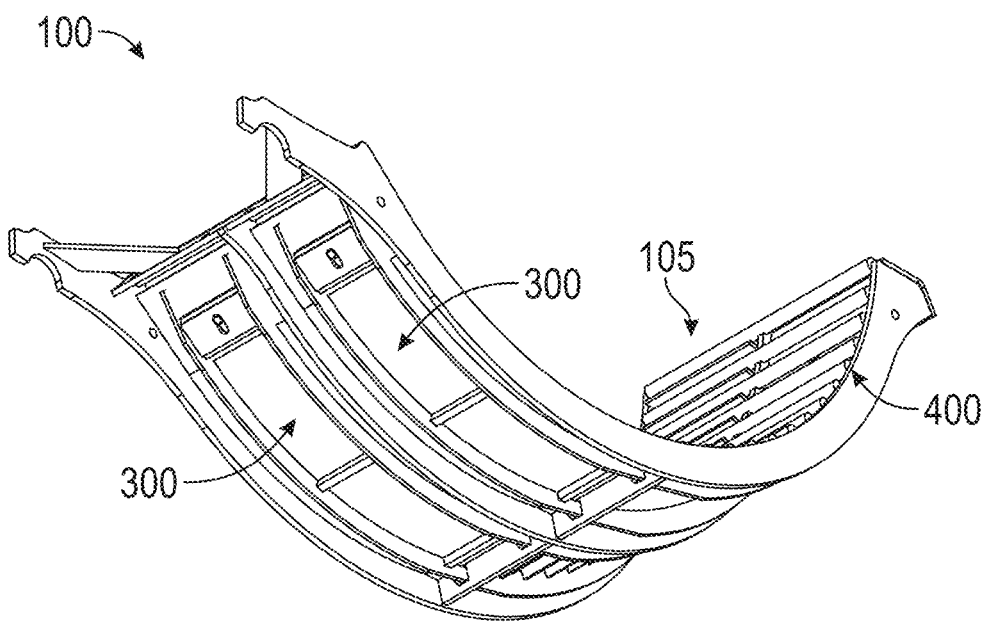
FIG. 19 is a third angled perspective view of the combination of FIG. 17.
Figure 20:
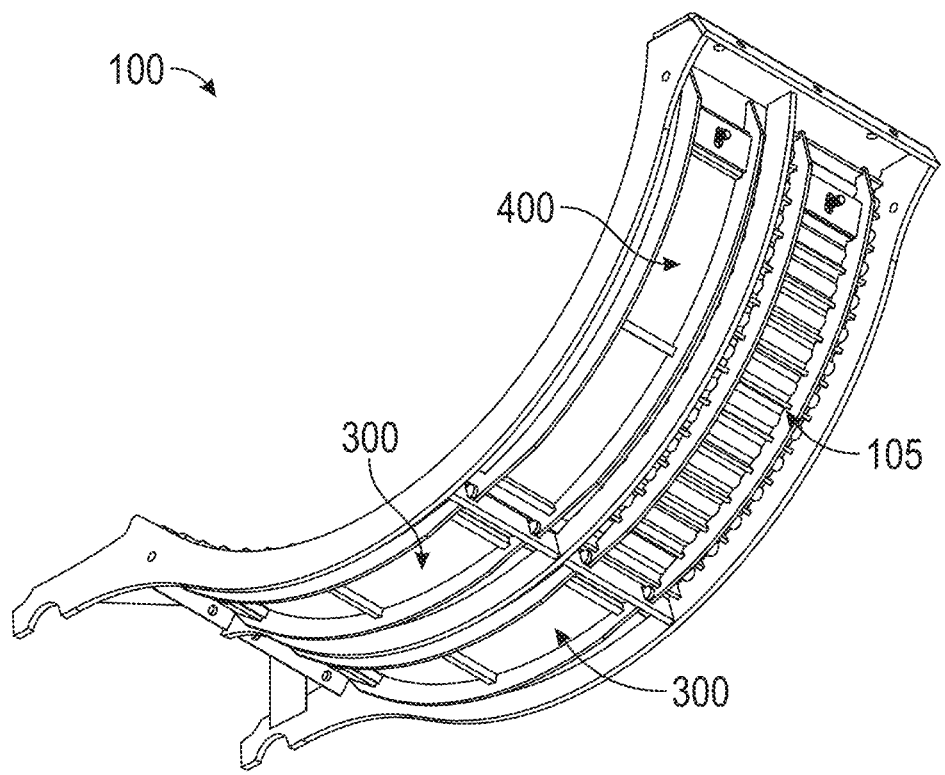
FIG. 20 is a fourth angled perspective view of the combination of FIG. 17.

The embodiment disclosed in FIG. 8 involves positioning these notches 109 approximately equal distance between the inserts 106 of the MOG limiter which facilitates the positioning of the inserts 106 in the middle of the gaps of the concave 101 thereby restricting the opening allowing for small grains to drop through the concave 101 on either side of the insert while preventing MOG from passing through.

The MOG limiter 105 as shown in FIGS. 5-8 are readily installed by the farmer or technician without requiring the assistance of a second person and are easily and quickly removed once installed. This functions to enhance the flexibility provided to the farmer who may make adjustments as to how many and where MOG limiters 105 are positioned within the threshing section of the rotor chamber.

In one embodiment a known latch assembly is utilized as the upper concave connection and lower concave connection. The latch assembly may also employ a spring tensioning handle which upon closing draws the MOG limiter up into position on the underside of the concave 101.

In one embodiment, the MOG limiter 105 is designed for use on a ⅝ inch round bar concave 101 having a ¾ inch gap between the round crossbars 110.

In one embodiment, the MOG limiter 105 utilizes a clip apparatus which inserts over the concave crossbar 110 near midpoint of the concave 101 to which it is affixed.

In one embodiment, the MOG limiter 105 utilizes a pivot joint to rotatably affix the end of the Limiter at or near the middle of the concave 101.

In one embodiment, the MOG limiter 105 utilizes an insertable T-slot pivot assembly or other known standard pivot configurations to affix and retain the one end of the MOG limiter at or near the center point of the concave 101.

In one embodiment, the MOG limiter utilizes at least one clip mechanism to fasten the end of the MOG limiter to the end of the concave 101 and to retain the MOG limiter against the curvature of the concave 101.

In one embodiment, the clip assembly of the MOG limiter 105 is adjustable thereby pushing or pulling the MOG limiter 105 in a lateral direction as it is positioned on the concave 101.

In one embodiment the MOG limiter is designed for use with a ⅝ inch round bar concave 101 having a ⅞ inch gap between the round crossbars 110.

In one embodiment, the MOG limiter 105 utilizes at least one threaded locking mechanism to fasten the end of the MOG limiter to the end of the concave 101 and to retain the MOG limiter against the curvature of the concave 101.

In one embodiment, the threaded locking mechanism of the MOG limiter may be pulled or pushed by turning a retention housing or one or more retention nuts, thereby moving the Limiter laterally as it is positioned on the concave 101.

In one embodiment, the MOG limiter 105 is mechanically moved laterally thereby positioning the as it utilizes at least one threaded locking mechanism to fasten the end of the MOG limiter 105 to the end of the concave 101 and to retain the MOG limiter against the curvature of the concave 101.

Multiple other attachment mechanisms known in the art may be used to attach and hold the MOG limiter 105 in a stationary position adjacent to the concave 101 and which may allow for the adjustment of the position of the inserts 106 of the MOG limiter within the gaps existing between the crossbars 110 of the concaves residing within the combine.

Other embodiments of the MOG limiter 105 may employ inserts 106 of greater or lesser width so as to increase or decrease the openings remaining with the limiters such that adjustments may be made by the operator of the combine. For example, in the harvest of sunflower seeds, the operator may set the Limiter to provide for a larger gap. Alternatively, in the harvest of alfalfa the opening selected may be set at or nearest to its narrowest. This may be accomplished by positioning the inserts equal distance from the crossbars to create two equal or nearly equal openings within each gap.

In a concave 101 having a center support element on the underside as shown in FIG. 1 and utilizing the MOG limiter 105 as depicted in one of FIGS. 5-8, there are four quadrants existing on the underside of the concave 101. The farmer may install MOG limiters in all four quadrants of the concaves 101 at positions #2&3 to enhance the retention of MOG within the rotor chamber of the combine.

A method of use of the MOG limiters 105 in the 3-6 o'clock position on the concaves 101 placed in positions #2 &/or 3 to control the flow and distribution of grain to the sieve below so as to maximize the cleaning of the grain with the minimum of grain loss.

The assembly 100 can also include the use of one or more covers 300, 400, as is shown throughout FIGS. 9-12. Specifically, an example configuration for a left-side cover is shown throughout FIGS. 9-10 and an example configuration for a right-side cover is shown throughout FIGS. 11-12.

The left-side cover 300 can include a curvilinear plate 301. The curvilinear plate 301 comprises a flat, opaque, and rigid material that can be used to near completely prevent the flow of MOG from dropping out of the chamber and into the cleaning system. The curvilinear plate 301 is positioned between an arcuate side rails 107 and middle support rail of a concave 101. The cover plate 300 is designed to be configured in a curved supinated position against the crossbars 110 on the exterior of the concave 101.

The cover plate 300 may also include one or more arced supports 302, 303 that provide support to the curvilinear plate 301 from behind where a load of grain and MOG is applied. The one or more arced supports 302, 303 generally traverse the length (lateral direction) of the cover plates 300. In some embodiments, the one or more arced supports 302, 302 can further facilitate attachment to the arced rails 107 of the concave 101.

The latching assembly 200-204 shown and described in FIG. 4 can similarly be employed for the latching the cover plates 300 to the concave 101. The J-hook 202 in particular can maintain the lateral position of the cover plate so that curvilinear plate 201 stays adjacent the axial bars 110, thereby stopping the flow of MOG therethrough. The slot 304 is the area of the curvilinear plate 301 that allows for the threaded post 201 to pass through. The slot is preferably centrally located within a mounting plate 305 included on the cover plate 300.

Other supports that can also be included are bridge supports 306. The bridge supports 306 support the curvilinear plate 301 from behind where a load of grain and MOG is applied. These bridge supports generally span the horizontal length of the cover plate 300 from the one or more arced supports 302, 303 to the other. In some embodiments, several are employed within a single cover plate 200 one or more arced supports 302, 300 and they are spaced throughout the lateral distance of the cover plate 300 (see e.g., FIGS. 9-10).

Likewise, the right-side cover 400 can include a curvilinear plate 401. The curvilinear plate 401 comprises a flat, opaque, and rigid material that can be used to near completely prevent the flow of MOG from dropping out of the chamber and into the cleaning system. The curvilinear plate 401 is positioned between an arcuate side rails 107 and middle support rail of a concave 101. The cover plate 400 is designed to be configured in a curved supinated position against the crossbars 110 on the exterior of the concave 101.

The cover plate 400 may also include one or more arced supports 402, 403 that provide support to the curvilinear plate 401 from behind where a load of grain and MOG is applied. The one or more arced supports 402, 403 generally traverse the length (lateral direction) of the cover plates 400. In some embodiments, the one or more arced supports 402, 402 can further facilitate attachment to the arced rails 107 of the concave 101.

The latching assembly 200-204 shown and described in FIG. 4 can similarly be employed for the latching the cover plates 400 to the concave 101. The J-hook 202 in particular can maintain the lateral position of the cover plate so that curvilinear plate 201 stays adjacent the axial bars 110, thereby stopping the flow of MOG therethrough. The slot 304 is the area of the curvilinear plate 401 that allows for the threaded post 201 to pass through. The slot is preferably centrally located within a mounting plate 405 included on the cover plate 400.

Other supports that can also be included are bridge supports 406. The bridge supports 406 support the curvilinear plate 401 from behind where a load of grain and MOG is applied. These bridge supports generally span the horizontal length of the cover plate 400 from the one or more arced supports 402, 403 to the other. In some embodiments, several are employed within a single cover plate 200 one or more arced supports 402, 400 and they are spaced throughout the lateral distance of the cover plate 400 (see e.g., FIGS. 11-12).

In some embodiments, cover plates 300, 400 are installed in the concave 101 located in position #1.

It is thus to be appreciated that depending on the application, various combinations of MOG limiters 105, left-side cover plates 300, and right-side cover plates 400 can be employed to more uniformly distribute grain and MOG in the threshing and separation chambers of the combine.

For example, in the embodiment shown throughout FIGS. 13-16, a single MOG limiter is employed at the top left quarter of the concave 101, a single left-side cover plate 300 is employed at the lower left quarter of the concave 101, and two right side cove plates 400 arc employed at the upper right quarter and the lower right quarter of the concaves.

For example, in the embodiment shown throughout FIGS. 17-20, a single MOG limiter is employed at the top right quarter of the concave 101, a single right-side cover plate 400 is employed at the lower right quarter of the concave 101, and two left side cove plates 300 are employed at the upper right quarter and the lower right quarter of the concaves.

It should further be appreciated combines including one or more assemblies (100) can include assemblies of different configurations to facilitate a more uniform grain and MOG distribution in the threshing and separation chambers of the combine. Thus, the configuration shown in FIGS. 13-16 could be used in position #1, while the configuration shown in FIGS. 17-20 could be used in position #2. An assembly having only MOG limiters could be used in position #3.

The left-side and right side covers 300, 400 are configured to compliment one another such that ends of the arced rails 302, 303, 402, 403 and/or separate pins which extend therefrom do not interfere with one another and/or interlock as they pass through the lower concave connector 103. In some embodiments, it is preferred that the left-side and right-side cover plates 300, 400 are not identical and/or mirror images of one another to help establish the aforementioned interlock.

It is to be appreciated that, in some embodiments, the left-side and right-side cover plates 300, 400 can be identically configured such that by simply rotating one 180°, a left-side cover plate 300 becomes a right-side cover plate 400 and vice-versa.

In some embodiments, it should be appreciated that the concave can be divided into six, eight, or ten equal sections instead of the four quarter sections that are shown throughout FIGS. 13-20. One example combination is suggested in FIG. 21.

Figure 22:
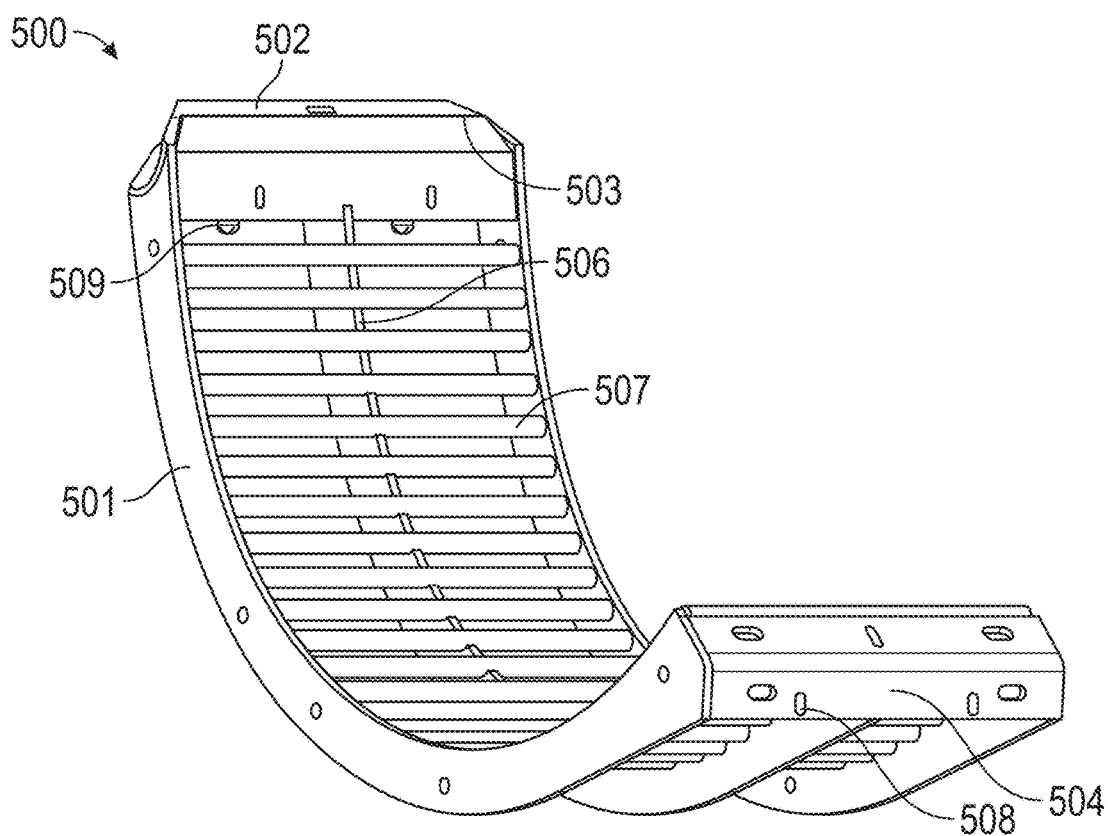
FIG. 22 shows a perspective view of a first embodiment of a modified MOG limiting concave assembly.
Figure 23:
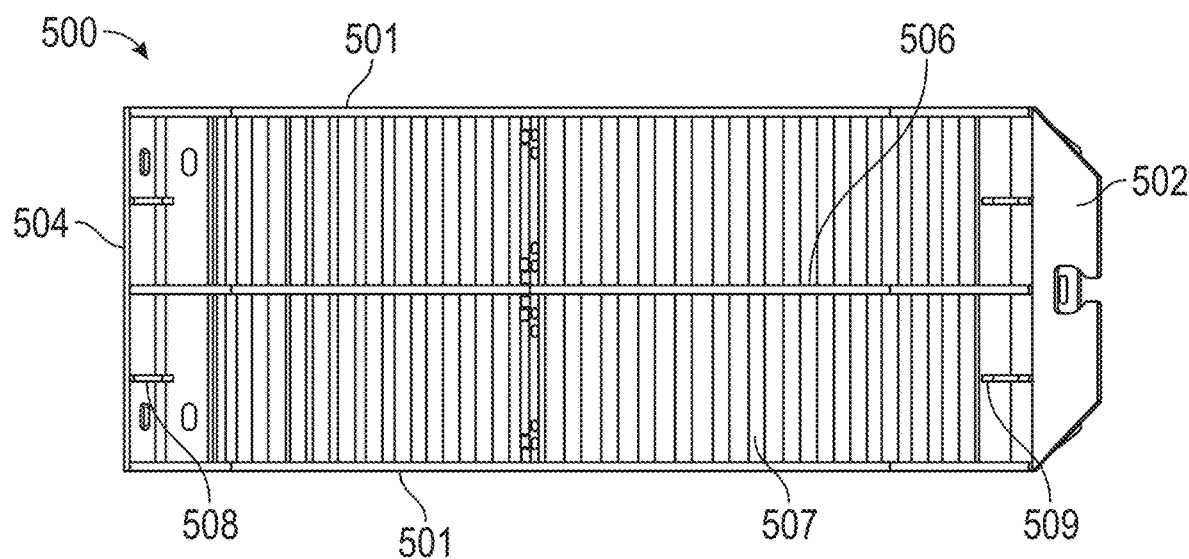
FIG. 23 shows a rear elevation view of the first embodiment of the modified MOG limiting concave assembly of FIG. 22.

A first embodiment 500 of a modified concave is shown in FIGS. 22-23. The first embodiment 500 includes an enhanced side flow rail 501, a C-clamp end 502, a first-end round bar drive 503, a second end plate 504, a quarter wrap center catch 505, an enhanced flow center rail 506, 0.625 inch diameter round bars 507, a left over center catch 508, and a right over center catch 509.

The side flow rails 501 are the curvilinear component that serve as the outer frame of the concave. At the C-clamp end 502 of the side flow rail 501, there exists a C-clamp that extends outwardly from a first-end round bar drive 503. At the second end there exists a second end plate 504. The C-clamp end 502 and the second end plate 504 are spaced from one another and extend generally away from one another. The C-clamp end 502 and the second end plate 504 extend transversely between and are rigidly joined to corresponding ends of the curved by way of the side flow rails 501. The C-clamp end 502 is curved in configuration for supporting the side flow rails 501, but there could exist some straight configurations for supporting the side flow rails 501 as part of the casing (not shown) below the rotor (not shown) of the combine.

The first embodiment 500 includes major central supports in the quarter wrap center catch 505 and the enhanced flow center rail 506. The quarter wrap center catch 505 is roughly equidistant between the C-clamp end 502 and the first-end round bar drive 503. The quarter wrap center catch 505 in combination with the left-over center catch 508 and right-over center catch 509 facilitates secure attachment to cover plates 900, 1000 and MOG limiters 1100, 1200.

The enhanced flow center rail 506 runs parallel to the side flow rails 501 and provides further support to the round bars 507. The round bars 507 are spaced substantially equidistantly from one another so that the gaps that form therebetween comprise a substantially similar or identical dimension.

Figure 24:
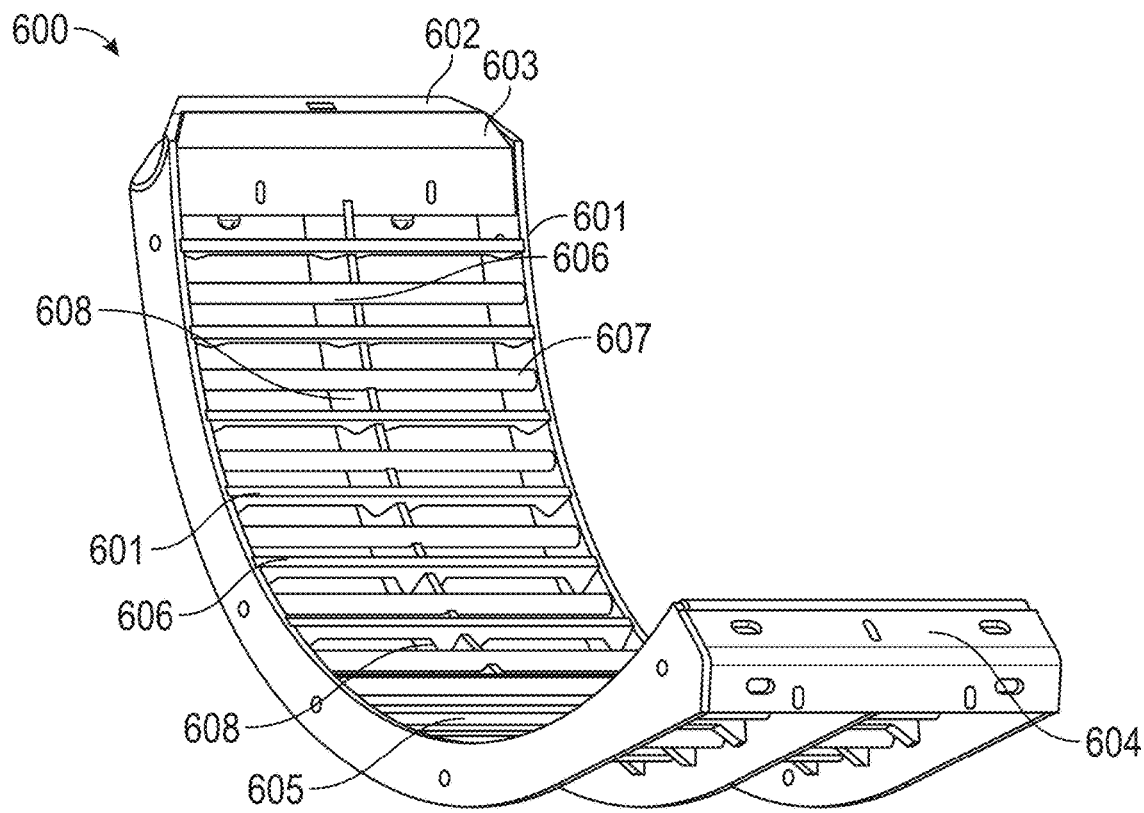
FIG. 24 shows a perspective view of a second embodiment of a modified MOG limiting concave assembly.
Figure 25:
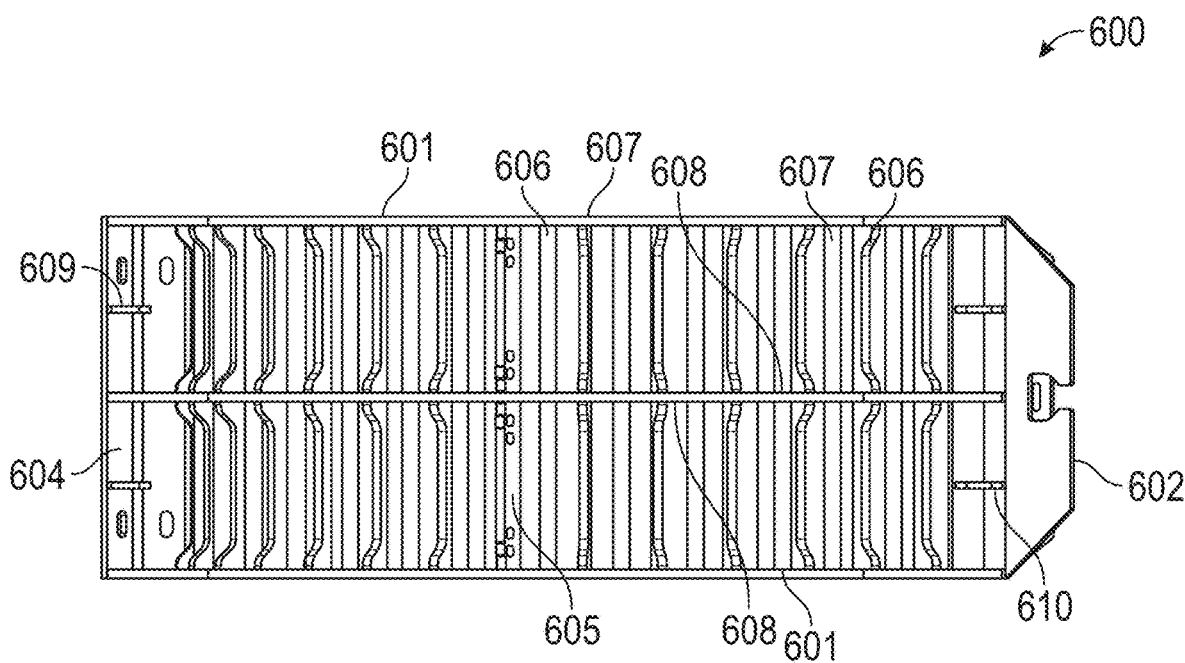
FIG. 25 shows a rear elevation view of the second embodiment of the modified MOG limiting concave assembly of FIG. 24.

A second embodiment 600 of a modified concave is shown in FIGS. 24-25. The second embodiment 600 includes an enhanced side flow rail 601, a C-clamp end 602, a first-end round bar drive 603, a second end plate 604, a quarter wrap center catch 605, an enhanced flow center rail 606, 0.375 rub bars 607 with 0.125 inch prouds, 0.625 inch diameter round bars 608, a left over center catch 609, and a right over center catch 610.

The side flow rails 601 are the curvilinear component that serve as the outer frame of the concave. At the C-clamp end 602 of the side flow rail 601, there exists a C-clamp that extends outwardly from a first-end round bar drive 603. At the second end there exists a second end plate 604. The C-clamp end 602 and the second end plate 604 are spaced from one another and extend generally away from one another. The C-clamp end 602 and the second end plate 604 extend transversely between and are rigidly joined to corresponding ends of the curved by way of the side flow rails 601. The C-clamp end 602 is curved in configuration for supporting the side flow rails 601, but there could exist some straight configurations for supporting the side flow rails 601 as part of the casing (not shown) below the rotor (not shown) of the combine.

The first embodiment 600 includes major central supports in the quarter wrap center catch 605 and the enhanced flow center rail 606. The quarter wrap center catch 605 is roughly equidistant between the C-clamp end 602 and the first-end round bar drive 603. The quarter wrap center catch 605 in combination with the left-over center catch 609 and right-over center catch 610 facilitates secure attachment to cover plates 900, 1000 and MOG limiters 1100, 1200.

The enhanced flow center rail 606 runs parallel to the side flow rails 601 and provides further support to the rub bars 607 and the round bars 608. The rub bars 607 and the round bars 608 alternate. The rub bars 607 and the round bars 608 are spaced substantially equidistantly from one another so that the gaps that form therebetween comprise a substantially similar or identical dimension.

Figure 26:
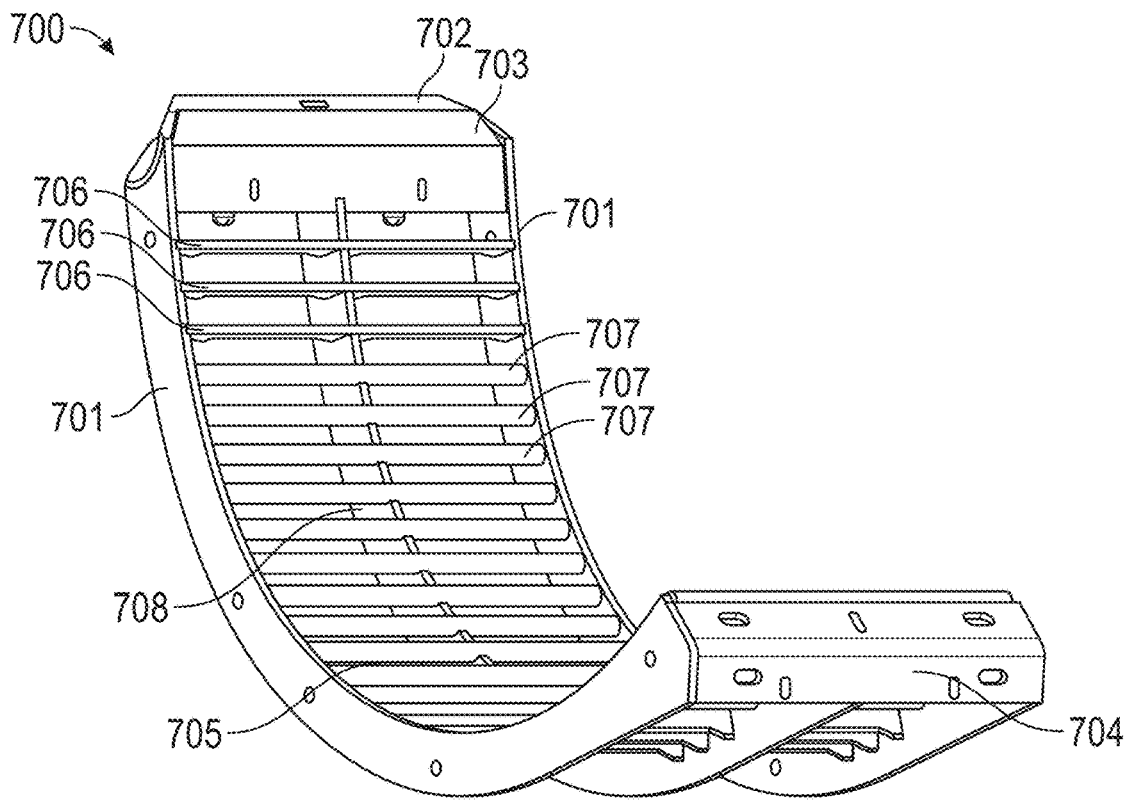
FIG. 26 shows a perspective view of a third embodiment of a modified MOG limiting concave assembly.
Figure 27:
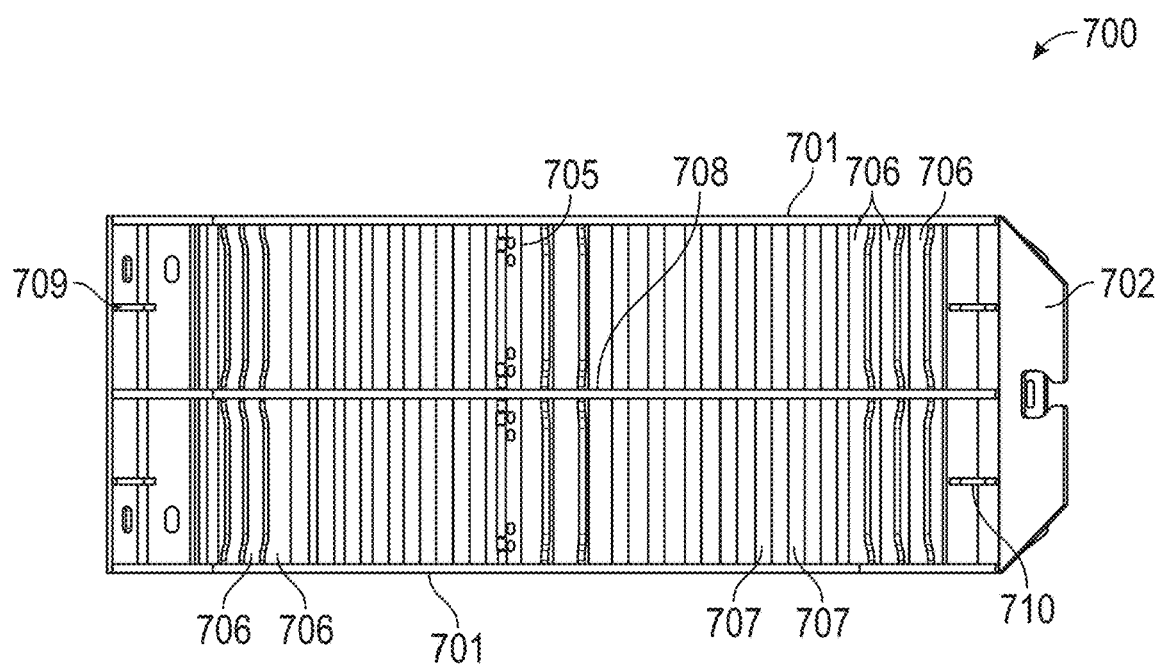
FIG. 27 shows a rear elevation view of the third embodiment of the modified MOG limiting concave assembly of FIG. 26.

A third embodiment 700 of a modified concave is shown in FIGS. 26-27. The third embodiment 700 includes an enhanced side flow rail 701, a C-clamp end 702, a first-end round bar drive 703, a second end plate 704, a quarter wrap center catch 705, an enhanced flow center rail 706, 0.25 inch flat rub bars 707, 0.625 inch diameter round bars 708, a left over center catch 709, and a right over center catch 710.

The side flow rails 701 are the curvilinear component that serve as the outer frame of the concave. At the C-clamp end 702 of the side flow rail 701, there exists a C-clamp that extends outwardly from a first-end round bar drive 703. At the second end there exists a second end plate 704. The C-clamp end 702 and the second end plate 704 are spaced from one another and extend generally away from one another. The C-clamp end 702 and the second end plate 704 extend transversely between and are rigidly joined to corresponding ends of the curved by way of the side flow rails 701. The C-clamp end 702 is curved in configuration for supporting the side flow rails 701, but there could exist some straight configurations for supporting the side flow rails 701 as part of the casing (not shown) below the rotor (not shown) of the combine.

The first embodiment 700 includes major central supports in the quarter wrap center catch 705 and the enhanced flow center rail 706. The quarter wrap center catch 705 is roughly equidistant between the C-clamp end 702 and the first-end round bar drive 703. The quarter wrap center catch 705 in combination with the left-over center catch 709 and right-over center catch 710 facilitates secure attachment to cover plates 900, 1000 and MOG limiters 1100, 1200.

The enhanced flow center rail 706 runs parallel to the side flow rails 701 and provides further support to the rub bars 707 and the round bars 708. The rub bars 707 and the round bars 608 alternate. The rub bars 707 are included in triplets and the remaining bars are round bars 708. The rub bars 707 and the round bars 708 are spaced substantially equidistantly from one another so that the gaps that form therebetween comprise a substantially similar or identical dimension.

Figure 28:
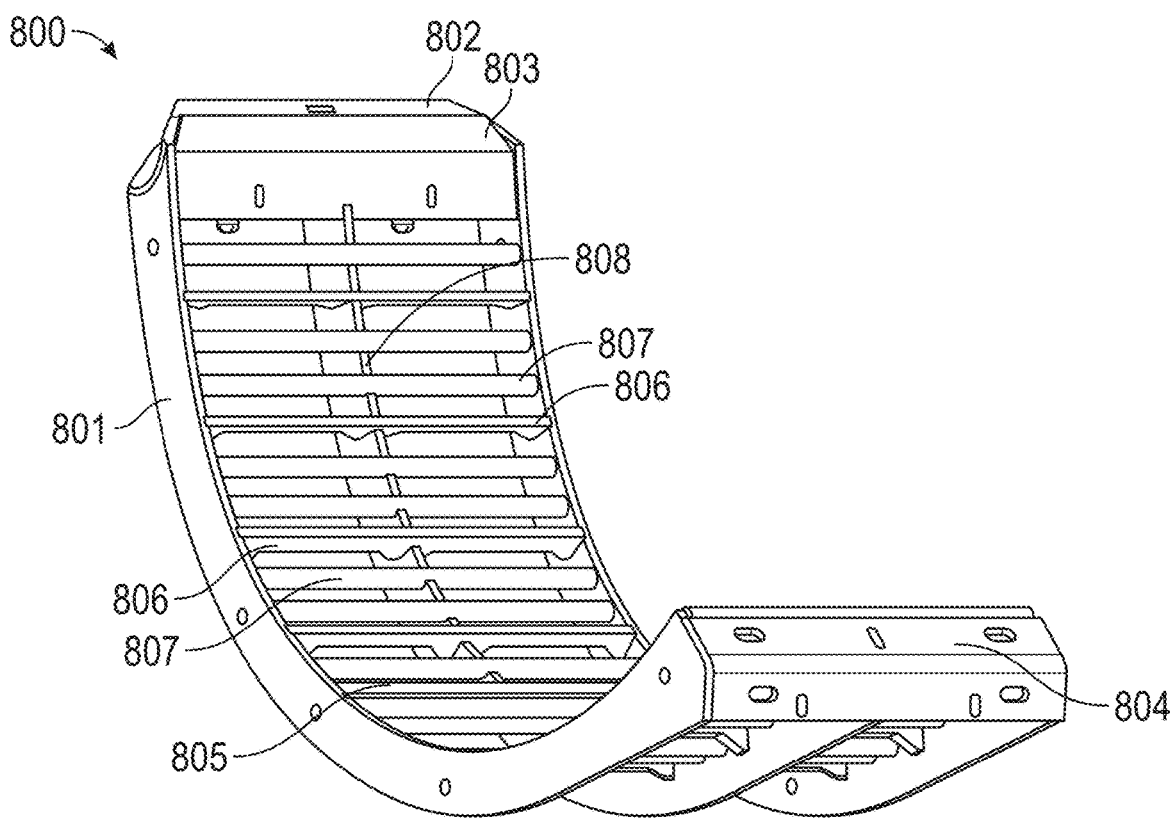
FIG. 28 shows a first perspective view of a fourth embodiment of a modified MOG limiting concave assembly.
Figure 29:
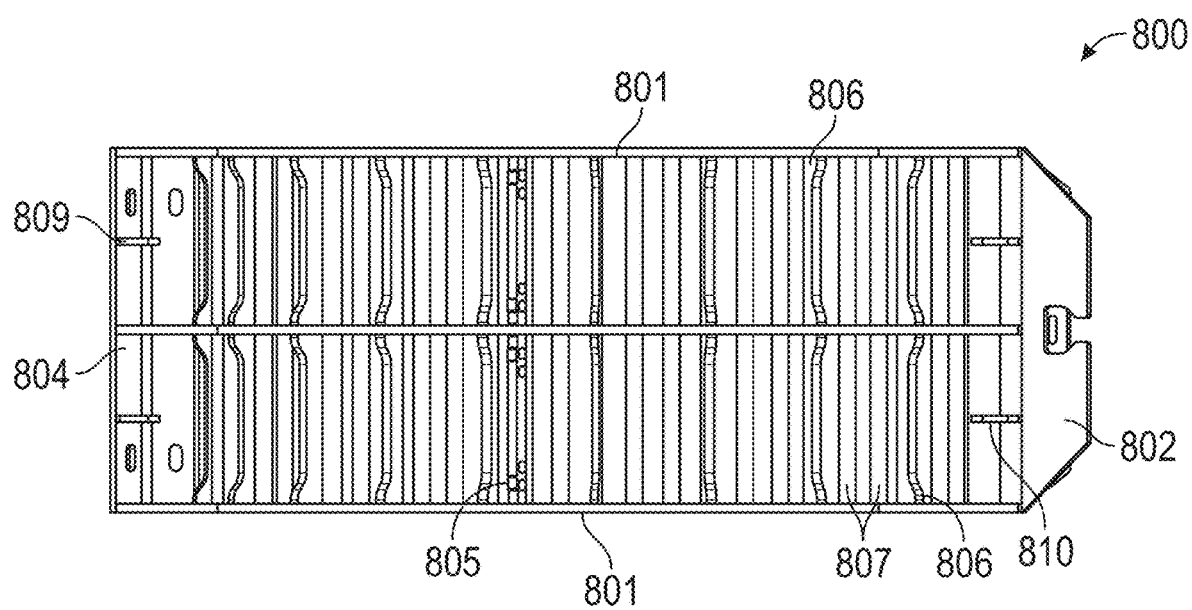
FIG. 29 shows a rear elevation view of the fourth embodiment of the modified MOG limiting concave assembly of FIG. 28.

A fourth embodiment 800 of a modified concave is shown in FIGS. 28-29. The fourth embodiment includes an enhanced side flow rail 801, a C-clamp end 802, a first-end round bar drive 803, a second end plate 804, a quarter wrap center catch 805, an enhanced flow center rail 806, 0.375 inch flat rub bars 807, 0.625 inch diameter round bars 808, a left over center catch 809, and a right over center catch 810.

The side flow rails 801 are the curvilinear component that serve as the outer frame of the concave. At the C-clamp end 802 of the side flow rail 801, there exists a C-clamp that extends outwardly from a first-end round bar drive 803. At the second end there exists a second end plate 804. The C-clamp end 802 and the second end plate 804 are spaced from one another and extend generally away from one another. The C-clamp end 802 and the second end plate 804 extend transversely between and are rigidly joined to corresponding ends of the curved by way of the side flow rails 801. The C-clamp end 802 is curved in configuration for supporting the side flow rails 801, but there could exist some straight configurations for supporting the side flow rails 801 as part of the casing (not shown) below the rotor (not shown) of the combine.

The first embodiment 800 includes major central supports in the quarter wrap center catch 805 and the enhanced flow center rail 806. The quarter wrap center catch 805 is roughly equidistant between the C-clamp end 802 and the first-end round bar drive 803. The quarter wrap center catch 805 in combination with the left-over center catch 809 and right-over center catch 810 facilitates secure attachment to cover plates 900, 1000 and MOG limiters 1100, 1200.

The enhanced flow center rail 806 runs parallel to the side flow rails 801 and provides further support to the rub bars 807 and the round bars 808. The rub bars 807 and the round bars 808 alternate. The rub bars 807 are included every third bar and the remaining bars are round bars 808. The rub bars 807 and the round bars 808 are spaced substantially equidistantly from one another so that the gaps that form therebetween comprise a substantially similar or identical dimension.

Figure 30:
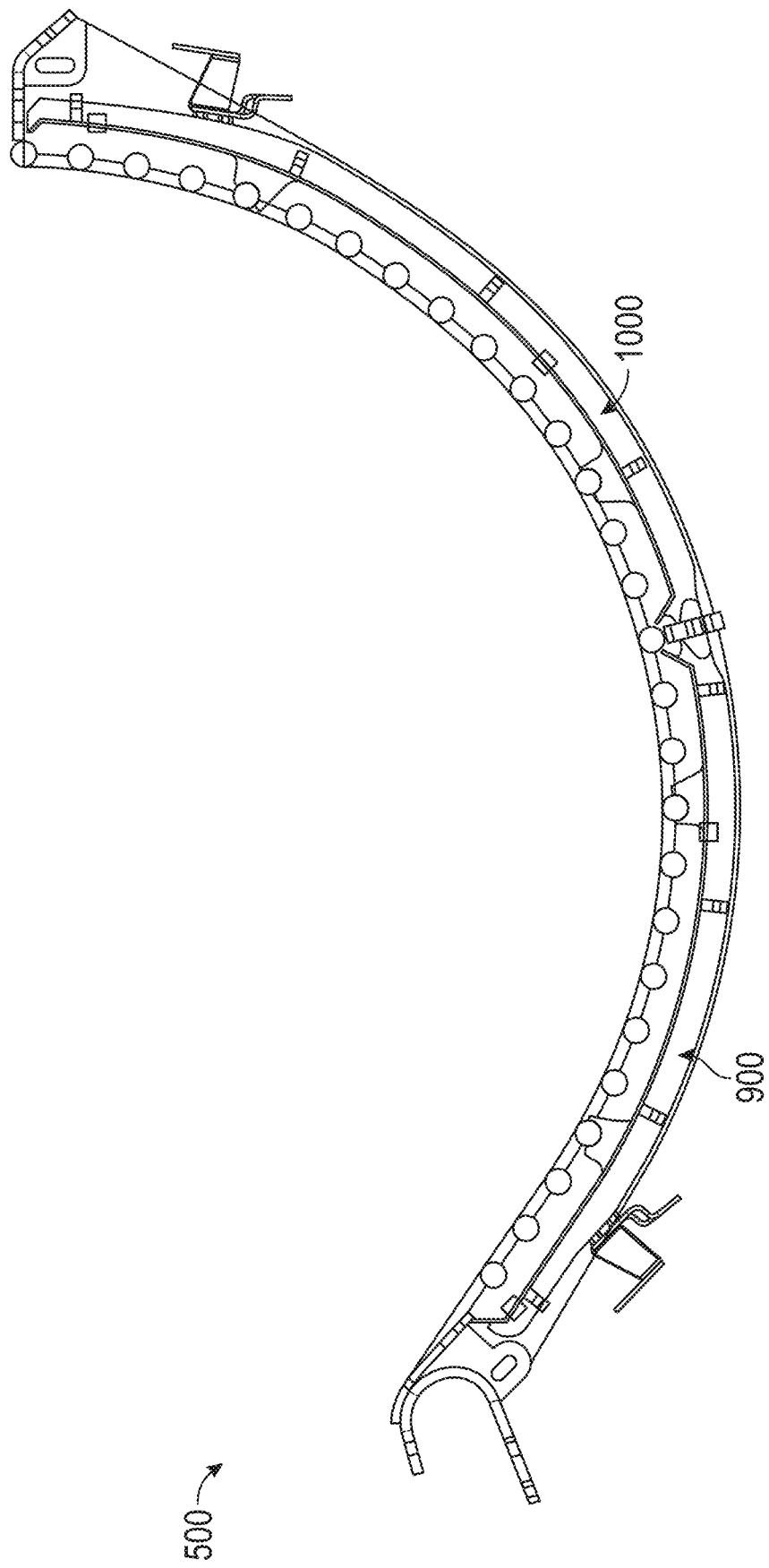
FIG. 30 shows a side elevation view of the first embodiment of the MOG limiting concave assembly of FIG. 22 equipped with cover plates.

As shown in FIG. 30, the first embodiment 600 of the MOG limiting concave assembly of FIG. 22 can be equipped with cover plates 900/1000.

Figure 31:
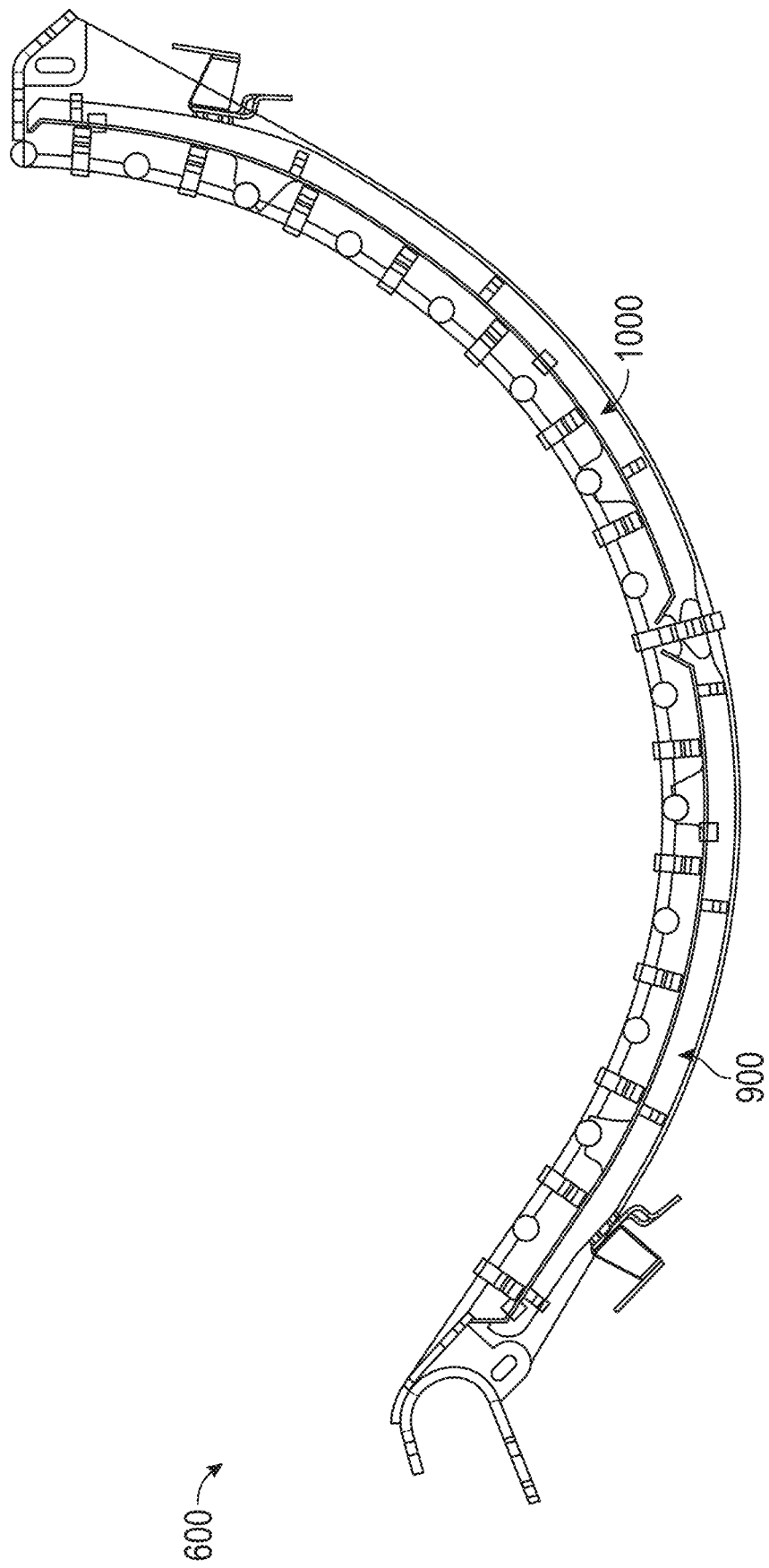
FIG. 31 shows a side elevation view of the second embodiment of the MOG limiting concave assembly of FIG. 24 equipped with cover plates.

As shown in FIG. 31, the second embodiment 800 of the MOG limiting concave assembly of FIG. 24 can be equipped with cover plates 900/1000.

Figure 32:
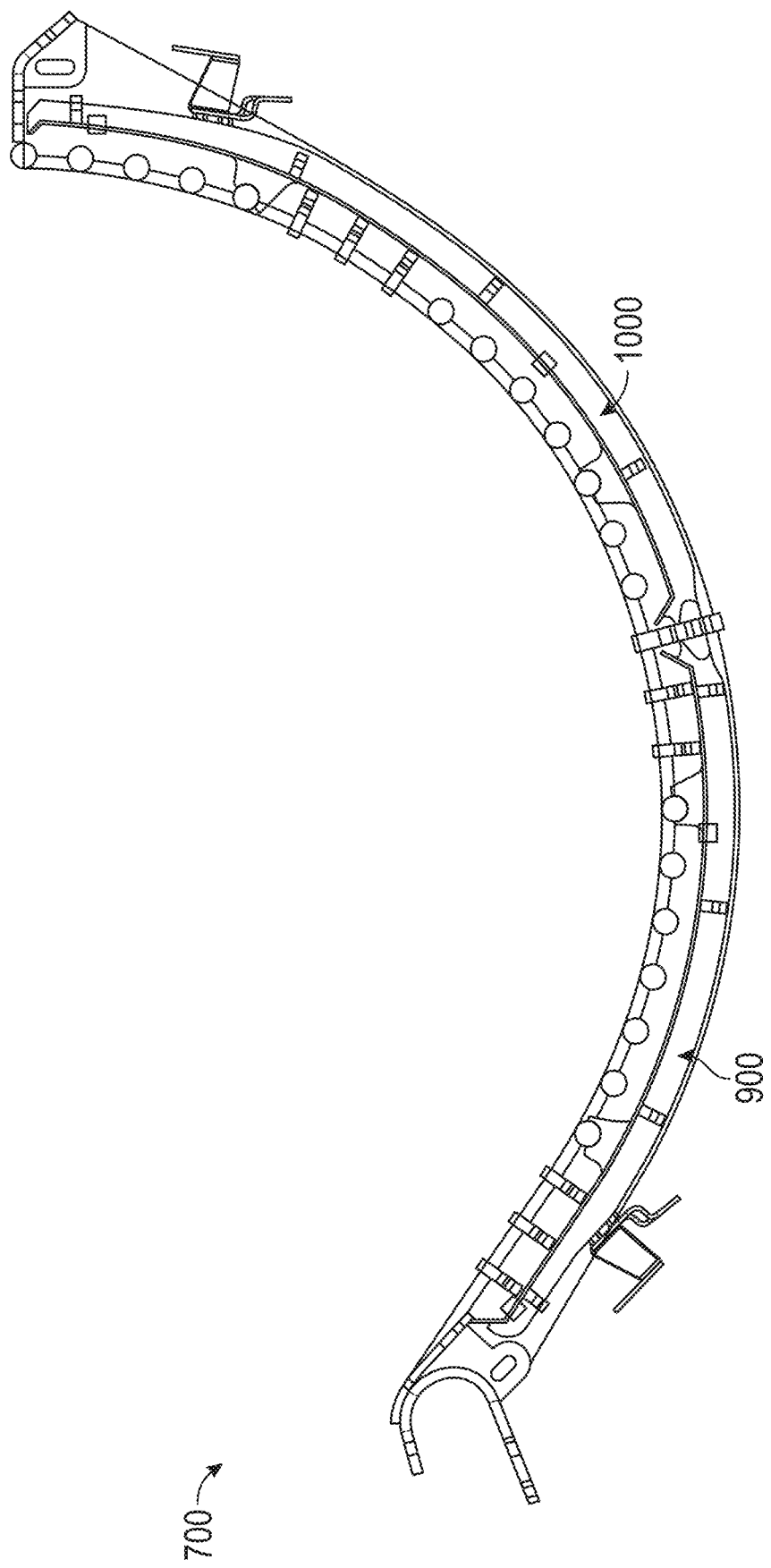
FIG. 32 shows a side elevation view of the three embodiment of the MOG limiting concave assembly of FIG. 26 equipped with cover plates.

As shown in FIG. 32, the third embodiment 800 of the MOG limiting concave assembly of FIG. 26 can be equipped with cover plates 900/1000.

Figure 33:
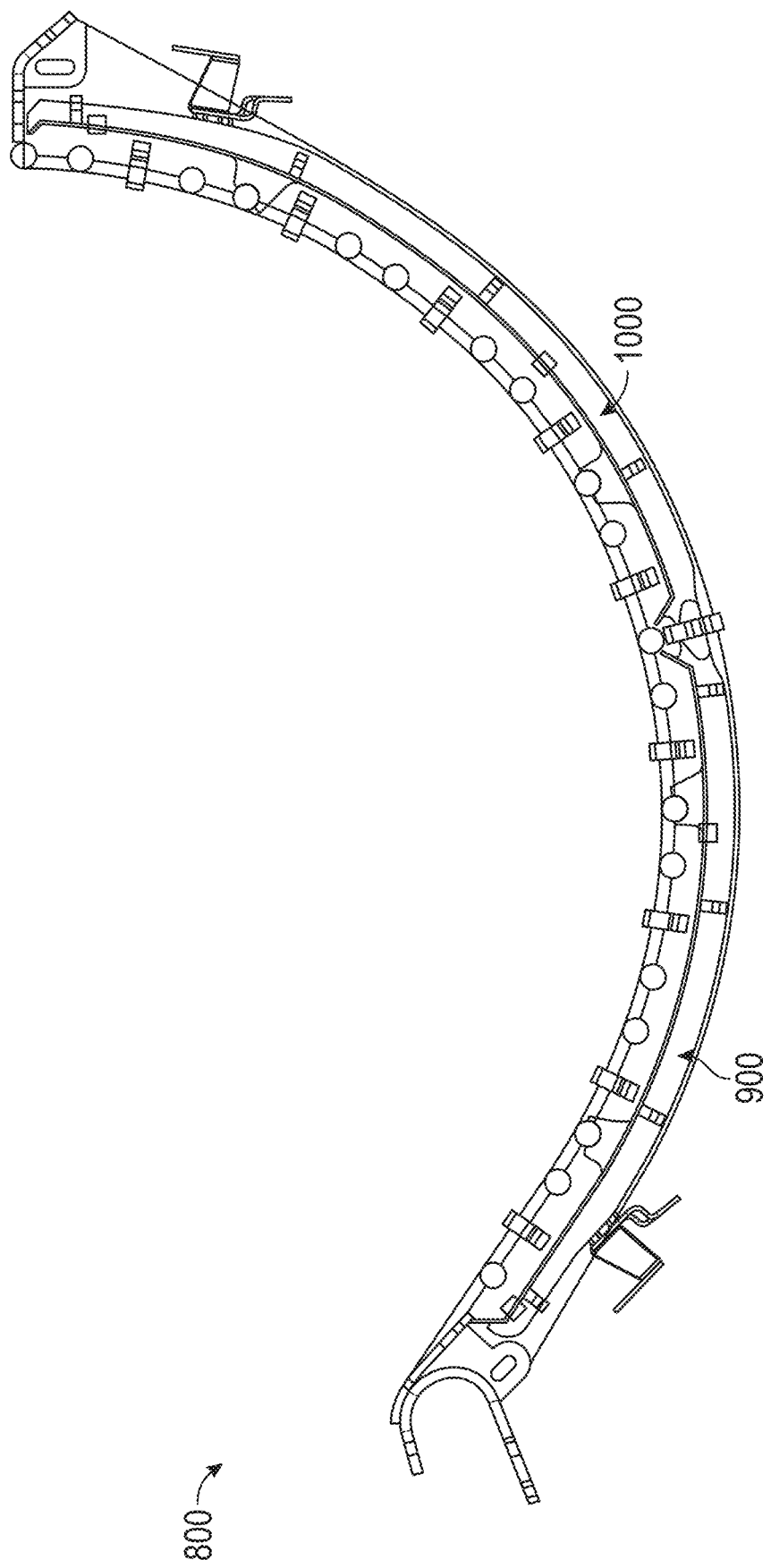
FIG. 33 shows a side elevation view of the fourth embodiment of the MOG limiting concave assembly of FIG. 28 equipped with cover plates.

As shown in FIG. 33, the fourth embodiment 900 of the MOG limiting concave assembly of FIG. 28 can be equipped with cover plate assemblies 900/1000.

Figure 34:
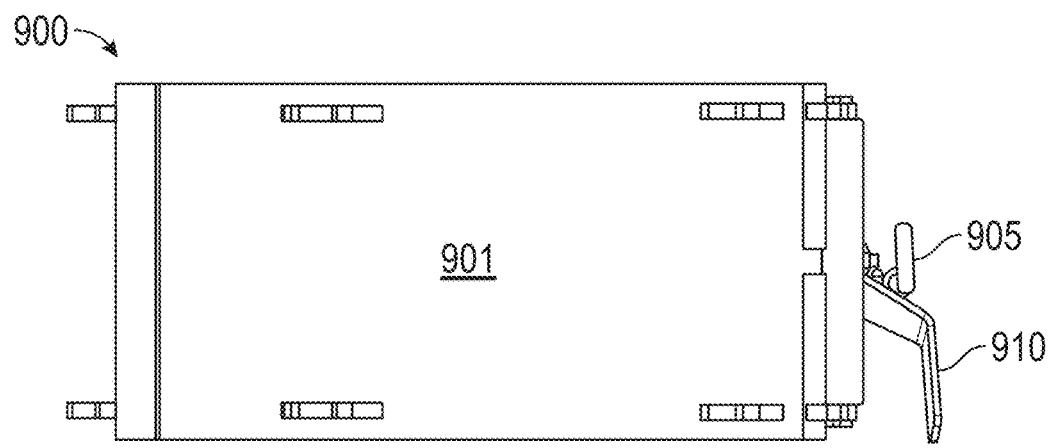
FIG. 34 shows a top plan view of left-side quarter wrap (QW) cover plate assembly.
Figure 35:
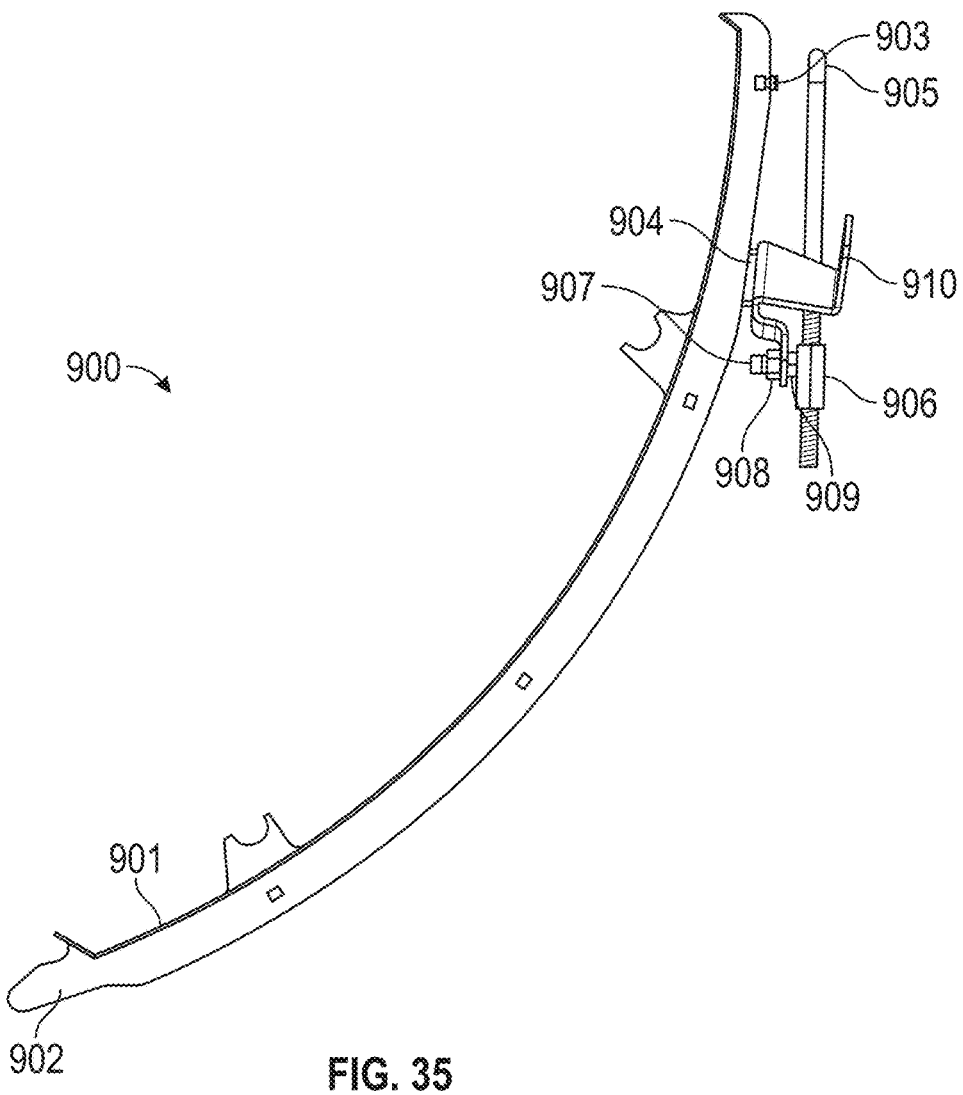
FIG. 35 shows a side elevation view of left-side quarter wrap (QW) cover plate assembly of FIG. 34.

FIGS. 34-35 show a left-side quarter wrap (QW) cover plate assembly 900. The left-side quarter wrap (QW) cover plate assembly 900 includes a left-side quarter wrap cover plate 901, a left-side quarter wrap cover plate support 902, a left-side cover plate over center handle anchor plate 903, a left-side quarter wrap cover plate rail 904, a J-bolt 905, a 0.3125 inch 18-thread long-steel coupling nut 906, a 0.25 inch 18-thread long hex head screw 907, a 0.25 inch 18-thread nylon insert lock nut 908, a 0.25 inch steel washer 909, and a CMF over center handle 910.

Figure 36:
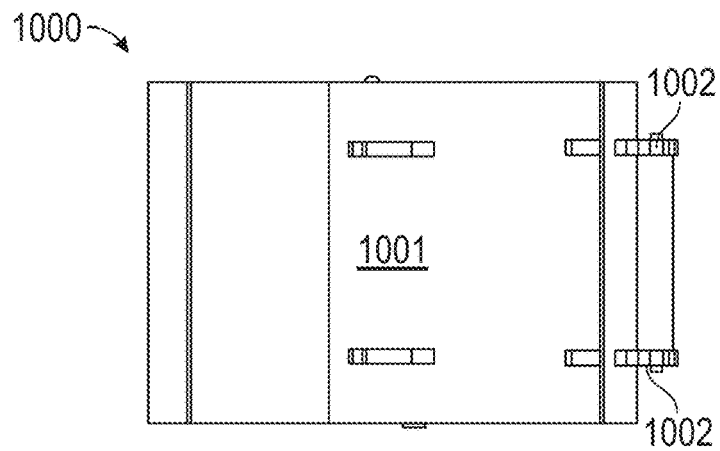
FIG. 36 shows a top plan view of right-side quarter wrap (QW) cover plate assembly.
Figure 37:
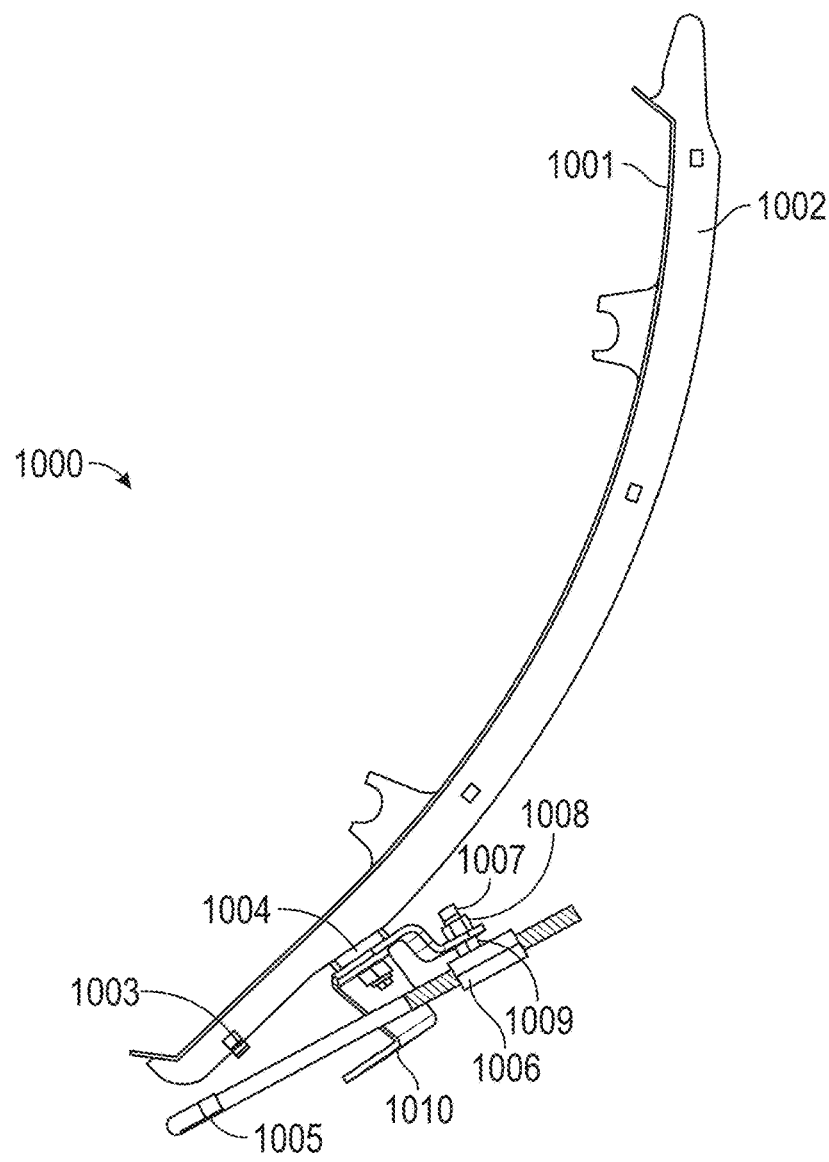
FIG. 37 shows a side elevation view of right-side quarter wrap (QW) cover plate assembly of FIG. 34.

FIGS. 36-37 show a right-side quarter wrap (QW) cover plate assembly 1000. The right-side quarter wrap (QW) cover plate assembly 1000 includes a right-side quarter wrap cover plate 1001, a right-side quarter wrap cover plate support 1002, a right-side cover plate over center handle anchor plate 1003, a right-side quarter wrap cover plate rail 1004, a J-bolt 1005, a 0.3125 inch 18-thread long-steel coupling nut 1006, a 0.25 inch 18-thread long hex head screw 1007, a 0.25 inch 18-thread nylon insert lock nut 1008, a 0.25 inch steel washer 1009, and a CMF over center handle 1010.

The left-side and right-side quarter wrap (QW) cover plate assemblies 900, 1000 retain plant material to fill the large openings and create a mattress-type surface. The matte of plant material provides a gentle & natural rubbing action against each other as they travel over the horizontal grain separation bars while retaining the material in chamber for enough time to complete even the tough or green pods. The left-side and right-side quarter wrap (QW) cover plate assemblies 900, 1000 also allow the operator to run the bottom sieve further open, pushing more air through the top sieve, reducing pod material in the tank. The use of natural plant materials reduces the chances of the rotor splitting soybeans over the longer duration in the chamber.

Use of the cover plates 900, 1000 allows for a more complete thresh, reduces tailings, and creates a cleaner grain sample.

Figure 38:
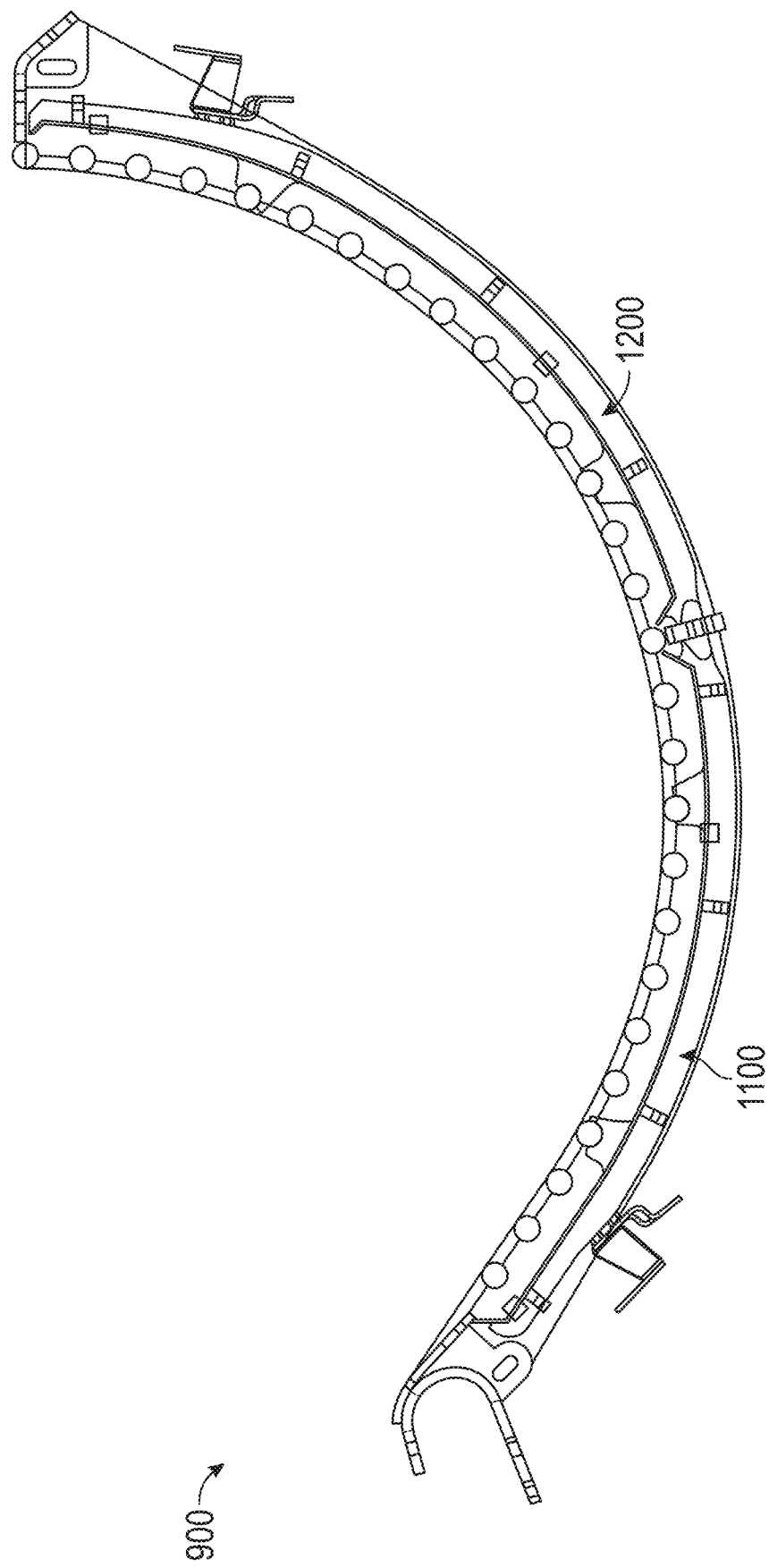
FIG. 38 shows a side elevation view of a quarter wrap (QW) MOG limiter assembly included in the MOG limiting concave assembly of FIG. 22.

As shown in FIG. 38, the first embodiment 500 of the MOG limiting concave assembly of FIG. 22 can be equipped with MOG limiter assemblies 1100/1200.

Figure 39:
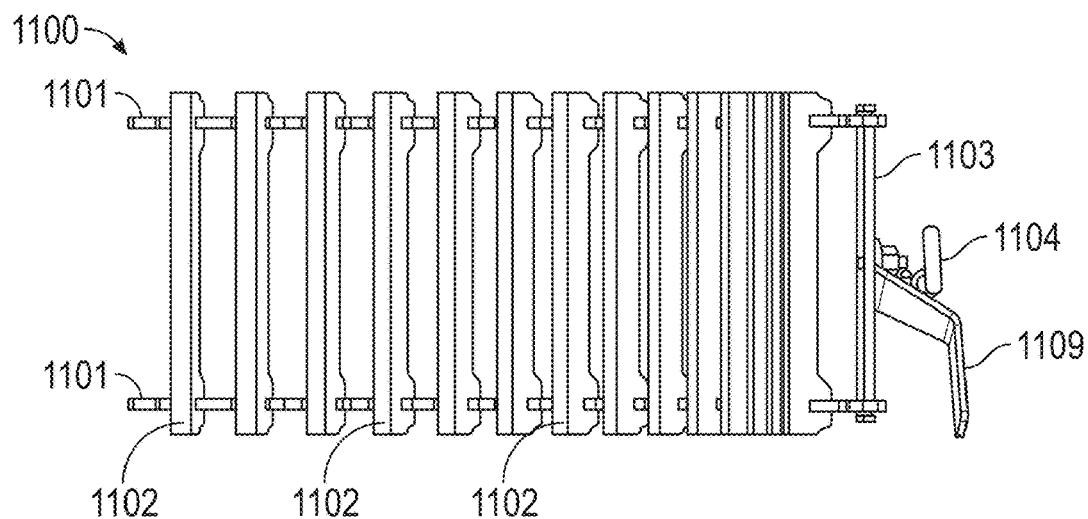
FIG. 39 shows a top plan view of left-side quarter wrap (QW) MOG limiters in the quarter wrap MOG limiter assembly seen in FIG. 38.
Figure 40:
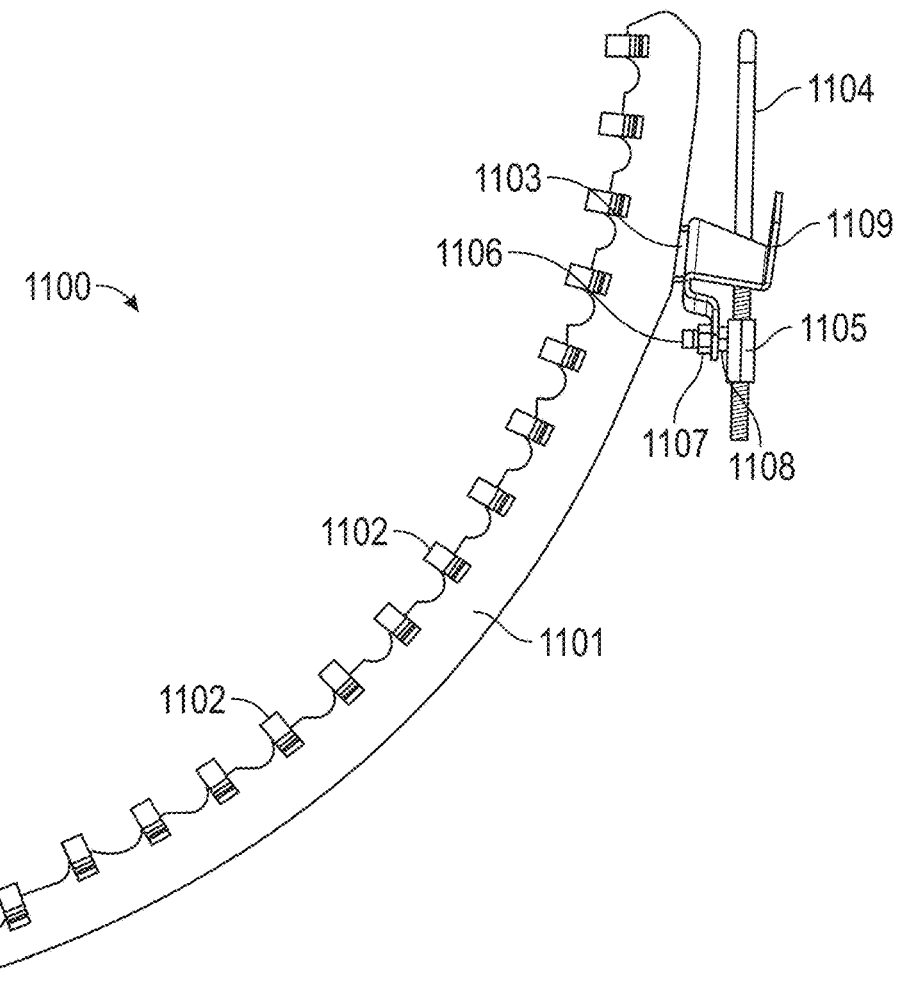
FIG. 40 shows a side elevation view of left-side quarter wrap (QW) MOG limiter assembly of FIG. 39.
Figure 41:
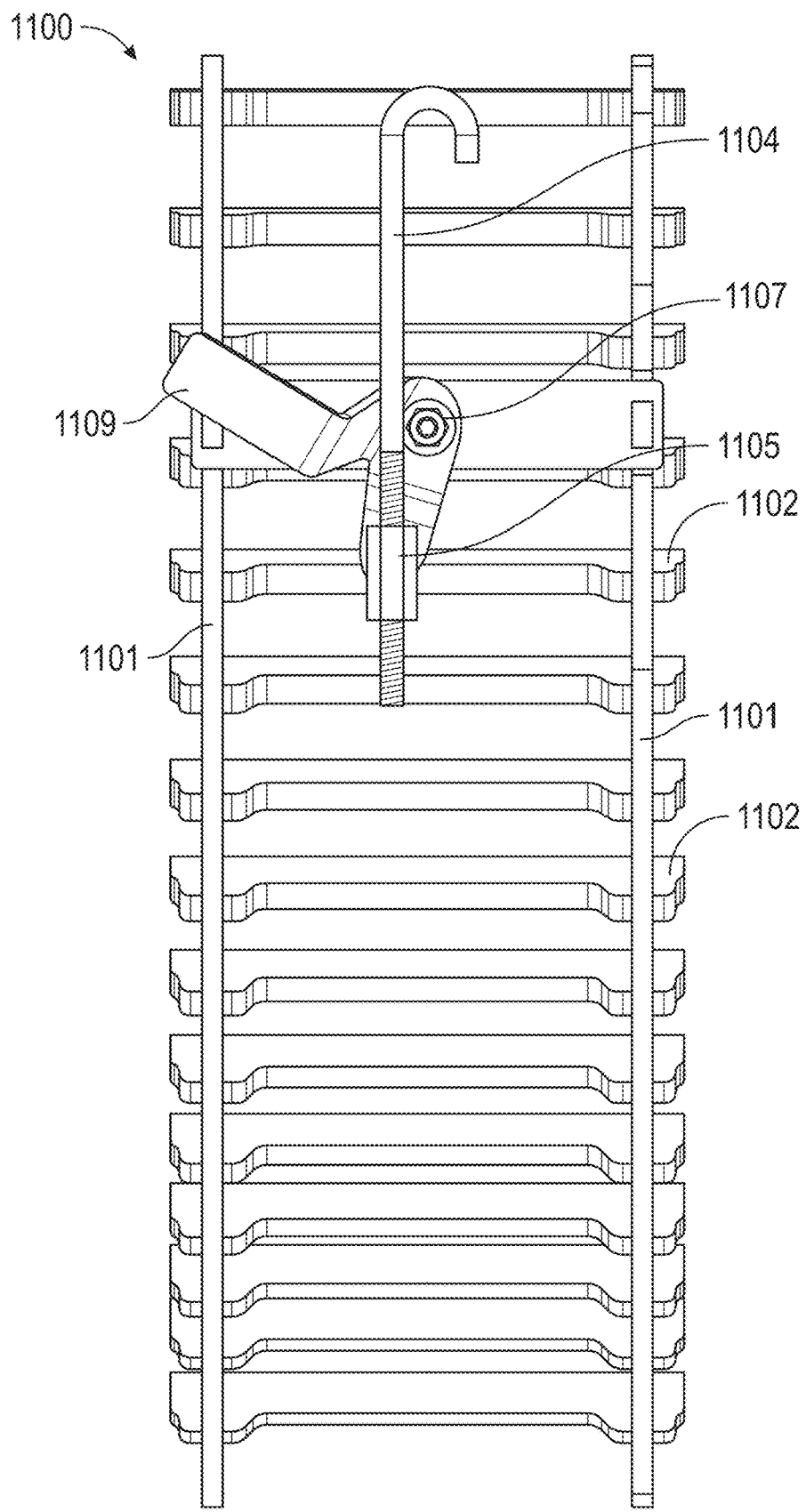
FIG. 41 shows a bottom plan view of left-side quarter wrap (QW) MOG limiter assembly of FIG. 39.

FIGS. 39-41 show a left-side quarter wrap (QW) MOG limiter assembly 1100. The left-side quarter wrap (QW) MOG limiter assembly 1100 includes a left-side quarter wrap MOG limiting rail 1101, a left-side MOG limiting rub bar 1102, a left-side ML over center handle anchor plate 1103, a J bolt 1104, a 0.3125 inch 18-thread long-steel coupling nut 1105, a 0.25 inch 18-thread long hex head screw 1106, a 0.25 inch 18-thread nylon insert lock nut 1107, a 0.25 inch steel washer 1108, and a CMF over center handle 1109.

Figure 42:
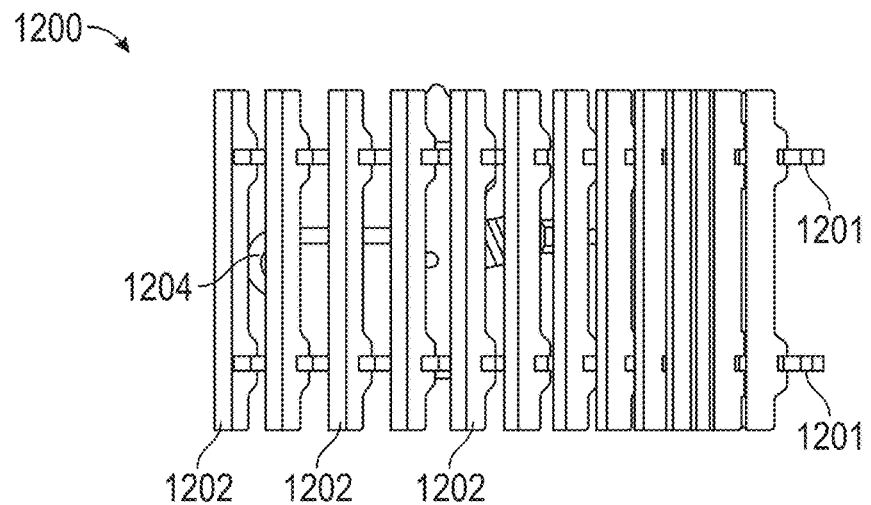
FIG. 42 shows a top plan view of right-side quarter wrap (QW) MOG limiters in the quarter wrap MOG limiter assembly seen in FIG. 38.
Figure 43:
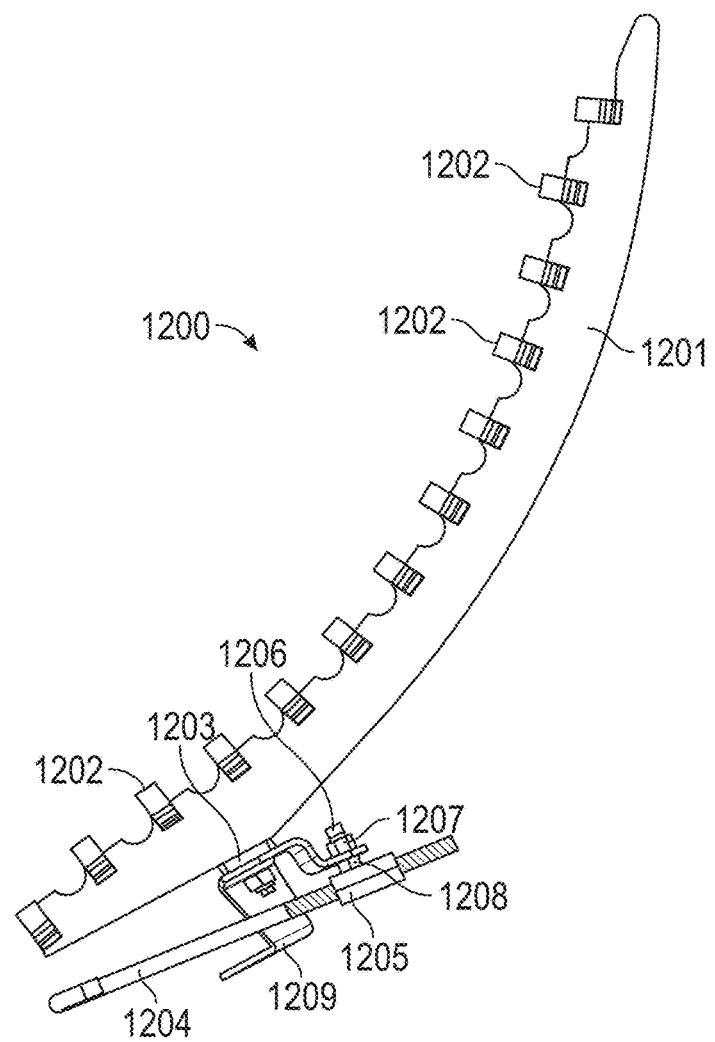
FIG. 43 shows a side elevation view of right-side quarter wrap (QW) MOG limiter assembly of FIG. 42.
Figure 44:
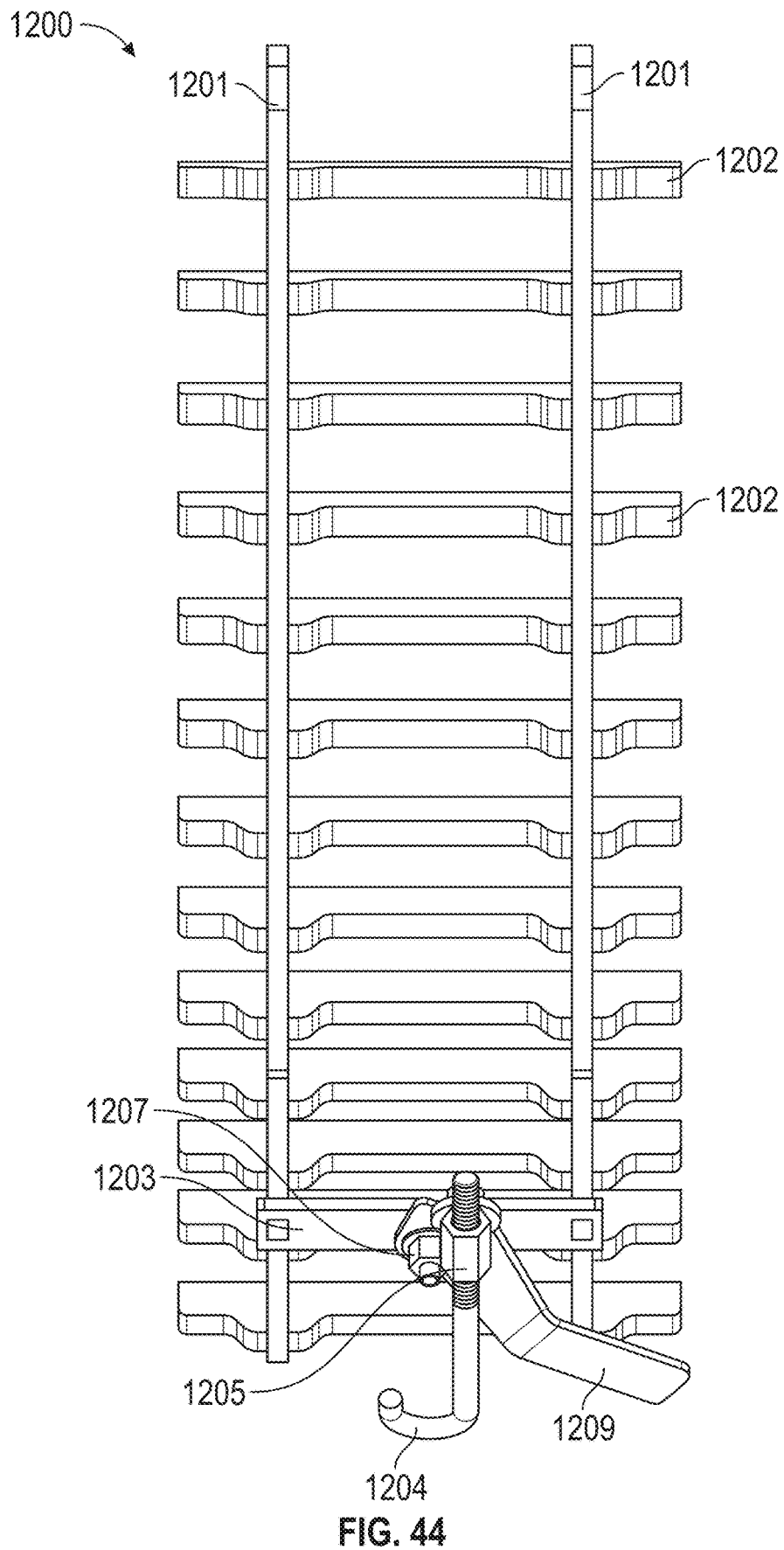
FIG. 44 shows a bottom plan view of right-side quarter wrap (QW) MOG limiter assembly of FIG. 42.

FIGS. 42-44 show a right-side quarter wrap (QW) MOG limiter assembly 1200. The right-side quarter wrap (QW) MOG limiter assembly 1200 includes a right-side quarter wrap MOG limiting rail 1201, a right-side MOG limiting rub bar 1202, a right-side ML over center handle anchor plate 1203, a J bolt 1204, a 0.3125 inch 18-thread long-steel coupling nut 1205, a 0.25 inch 18-thread long hex head screw 1206, a 0.25 inch 18-thread nylon insert lock nut 1207, a 0.25 inch steel washer 1208, a CMF over center handle 1209.

The QW wrap MOG limiter assemblies 1100, 1200 can reduce the size of the openings between bars between 30% and 50%, more preferably between 35% and 45%, and most preferably, by approximately 42%. This limits the flow of excessive MOG leaving the rotor chamber and falling into the auger bed. Because the auger bed now contains a higher percentage of grain and a lower amount of MOG, less air will be required to separate the MOG from the grain on the top sieve. Consistent results in all soybean harvesting moisture and field conditions with lower sieve loss. Ultimately, fewer soybeans are walked out the back of the combine as sieve loss.

The QW wrap MOG limiter assemblies 1100, 1200 match a custom plate built into the mid-point of the concave's arc which allows for a one man install. The QW wrap MOG limiter assemblies 1100, 1200 are easily installed midday to harvest soybeans and can later be removed quickly for a switch back to corn. The modified concaves 600, 700, 800, 900 address the needs of busy farmers who need proof of performance in hundreds of hours of lab and field testing. After installing the QW wrap MOG limiter assemblies 1100, 1200, a cleaner sample and lower sieve loss is achieved when harvesting soybeans and small grains.

Figure 46:
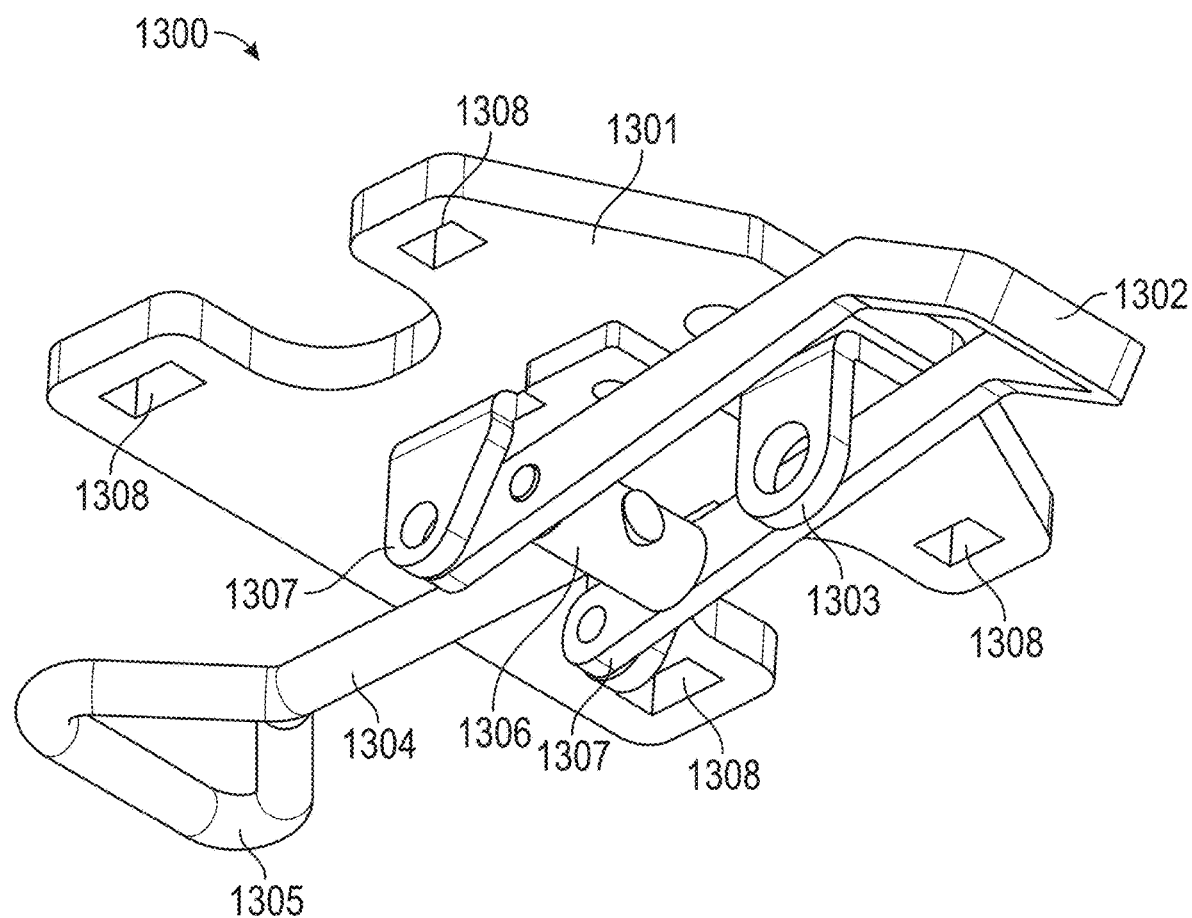
FIG. 46 show a first perspective view over center latch with a pentagonal base, according to some aspects of the present disclosure.
Figure 47:
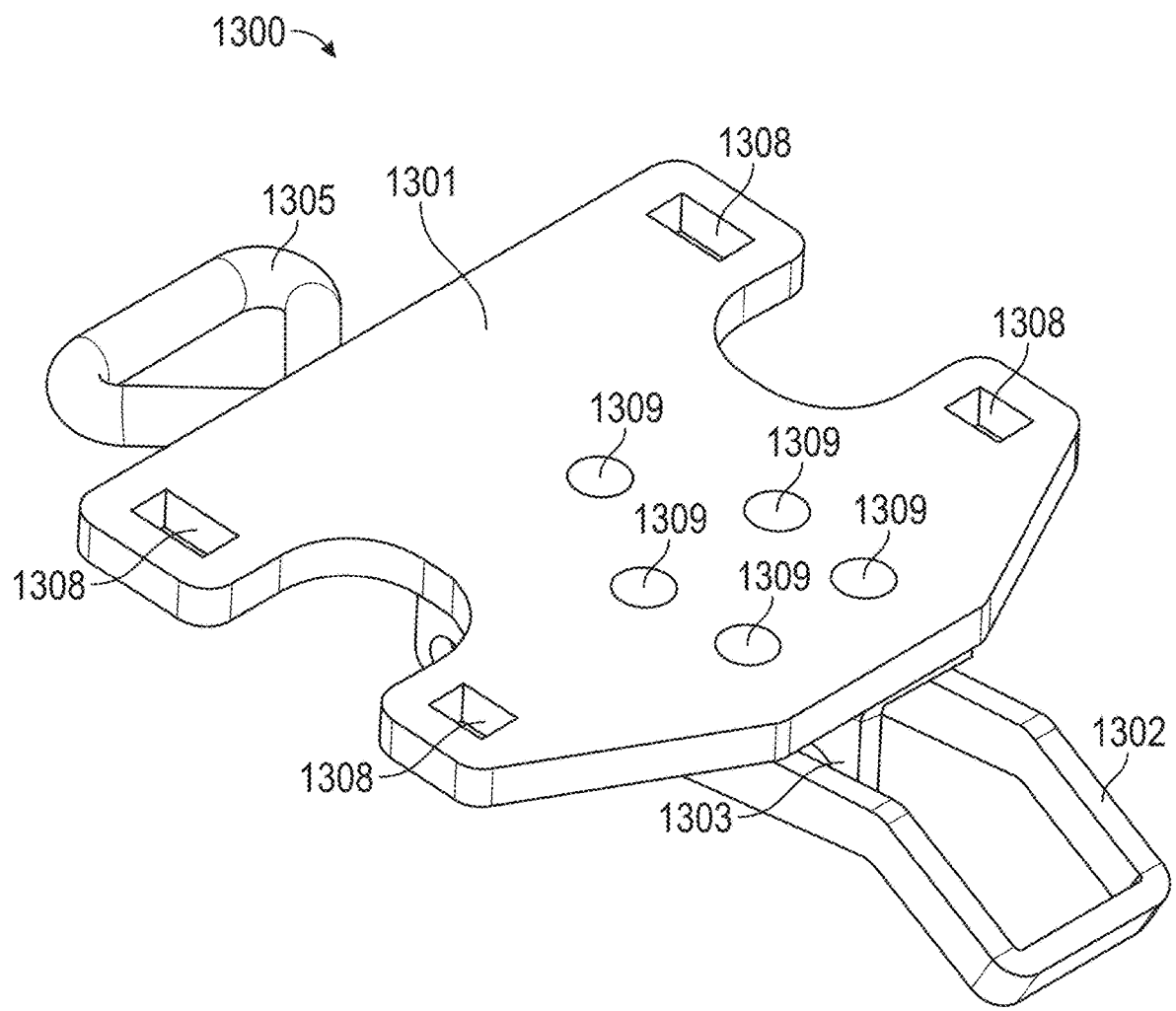
FIG. 47 shows a second perspective view of the over center latch of FIG. 46.
Figure 48:
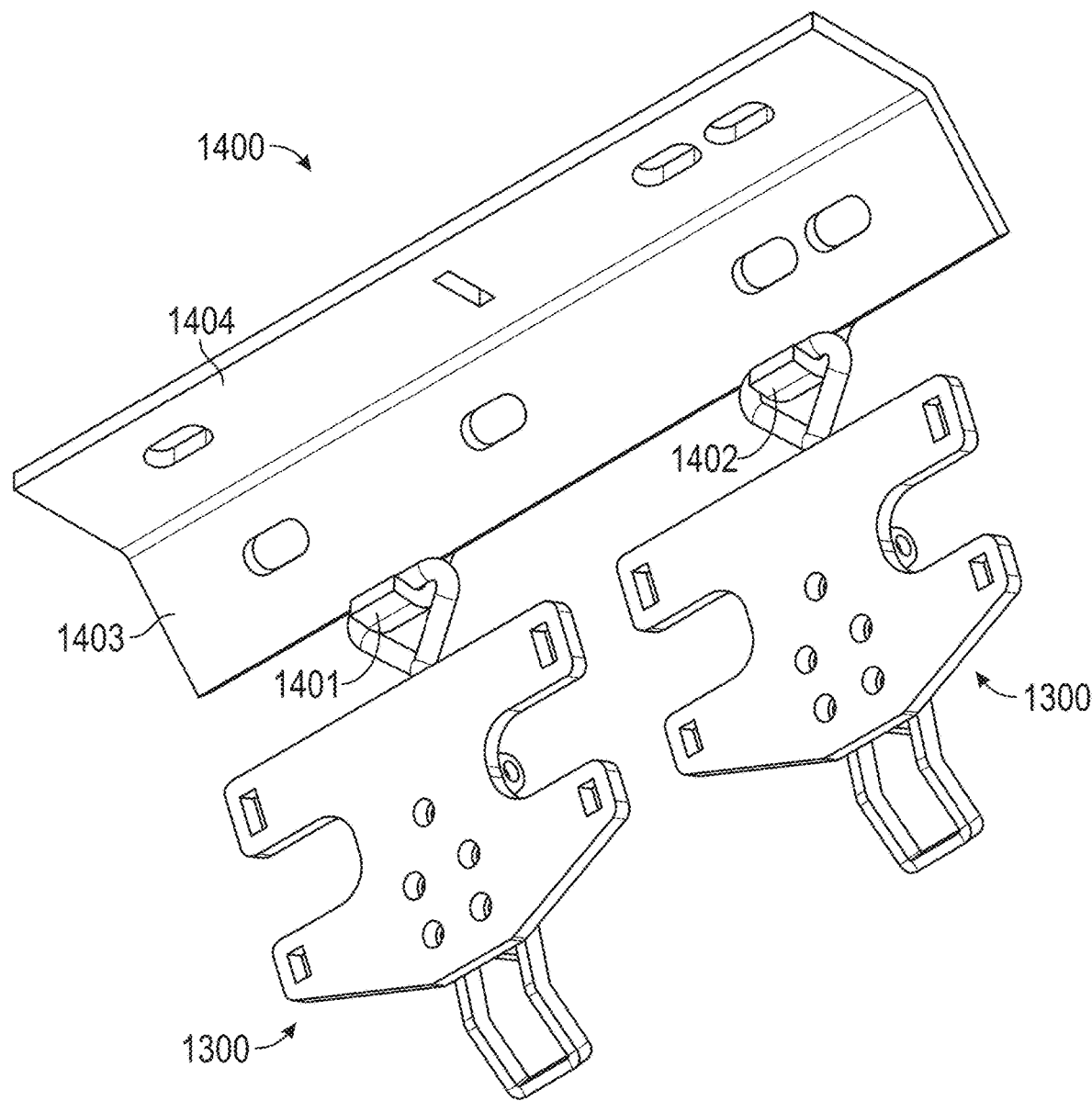
FIG. 48 shows a first perspective view of an attaching assembly for securing the over center latches to concave(s).
Figure 49:
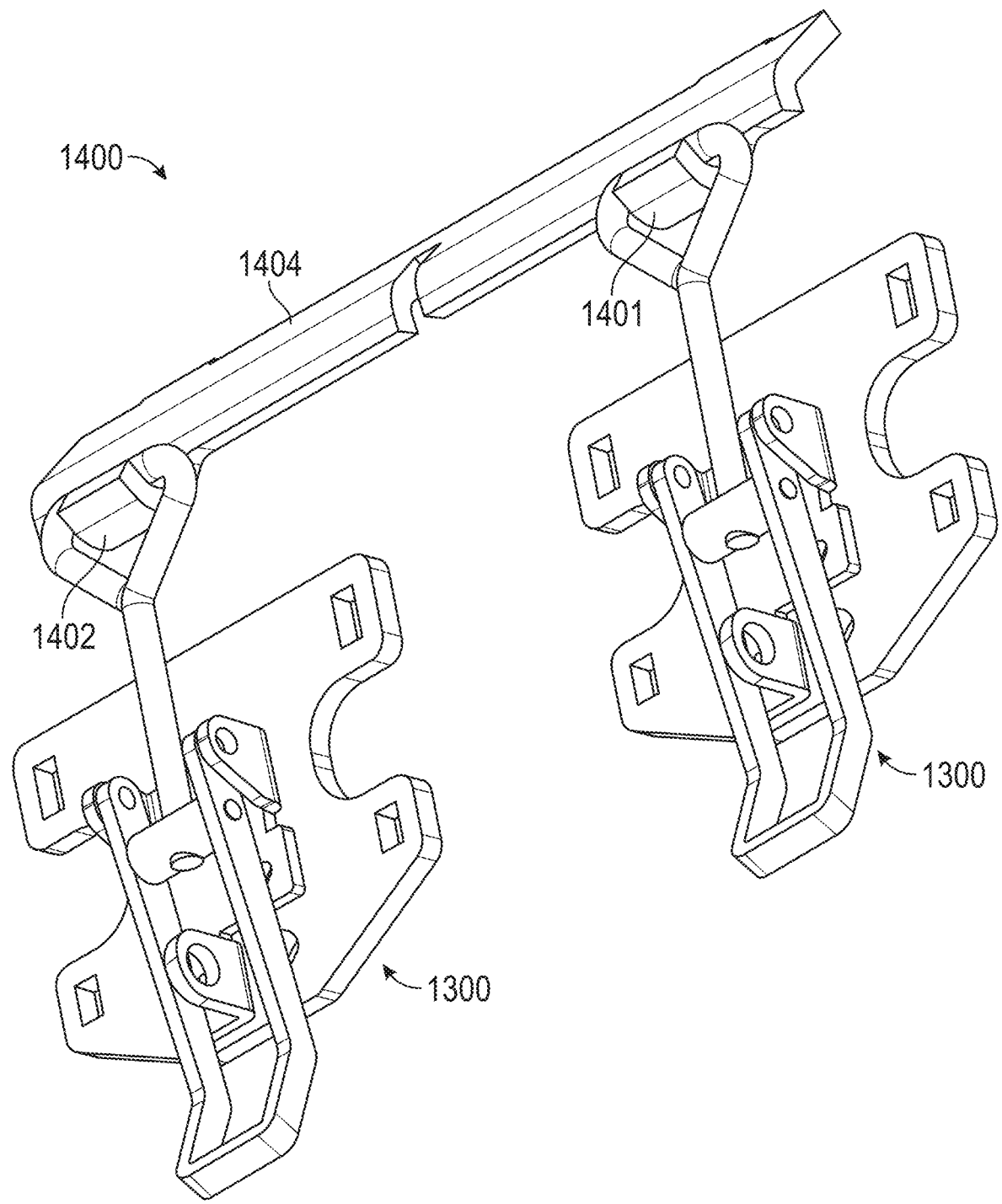
FIG. 49 shows a second perspective view of the attaching assembly of FIG. 48.

FIGS. 46-47 show an over center latch 1300 that can be used to help secure the left-side and right-side quarter wrap (QW) cover plate assemblies 900, 1000 and the QW wrap MOG limiter assemblies 1100, 1200 to the concaves/concave assemblies 101, 500, 600, 700, 800. The over center latch 1300 joins these components while allowing separation when unlocked. The over center latch 1300 engages another piece of hardware on another mounting surface, such as one or more of the first over center catch 1401, second over center catch 1402, solid, extended mounting portion 1500, solid, extended mounting portion 1600A, and solid, extended mounting portion 1600B. Depending on their design and type, catches 1401, 1402 may also be known as strikes.

The main components are the base plate 1301 with lever 1304 and attached loop 1305 and the other being the catch plate(s) 1401, 1402. The tension is created once the loop 1305 is hooked onto the catch plate 1401, 1402 and the lever 1304 is clamped down. Tension is released when the handle 1302 and/or the lever 1304 are pulled up into the vertical position.

Because agricultural applications can result in the latches being damaged, the base plate 1301 should be constructed from a material of sufficient strength, such as mild steel, zinc coated steel and stainless steel (good for corrosive environments). The material used will affect the latches strength and durability.

The over center latch 1300 includes the ability to be locked using a padlock or a safety catch via the padlock hole 1303. This will further prevent the over center latch 1300 from accidently opening during operation.

The over center latch 1300 can be adjustable in length if a threaded screw is included in the lever 1304. The threaded screw can be attached to the center pin 1306. A locking nut can be ensure the threaded screw remains securely in place with respect to the center pin 1306. For applications where the over center latch 1300 is likely to vibrate or be left in an unlocked position, a nylon friction ring can be added instead of a locking nut so that the screw loop will remain in its initial position.

The loop 1305 can be an eye loop, triangle screw loop, or a hinged triangle screw loop which can be used with a variety of different catch plates. Alternatively, instead of a loop 1305, it is to be appreciated that a T-screw, a bent T-screw, a canopy hook, clutch lever, flat hook screw, hook screw, rubber loop, or bend clamp could be utilized.

The center pin 1306 include a centrally located aperture, which allows for connection to the lever 1304. The cars 1307 also include holes that allow for fasteners to be placed therethrough, securing the base plate 1301 (which are directly attached to the plates that include the cars 1307, the handle 1302, and the center pin 1306 to one another.

The base plate 1301 can include slots 1308 to mount the base plate 1301 to a component of the the left-side and right-side quarter wrap (QW) cover plate assemblies 900, 1000 and the QW wrap MOG limiter assemblies 1100, 1200.

The base plate 1301 can also include holes 1309 to help balance, distribute, or even reduce the weight of said base plate 1301.

Each of the concaves/concave assemblies 101, 500, 600, 700, 800 can be fitted with a mounting assembly 1400, which can include the first over center catch 1401, second over center catch 1402, adjacent plate 1403, and an end plate 1404. The adjacent plate 1403 and the end plate 1404 are offset an acute angle.

Figure 50:
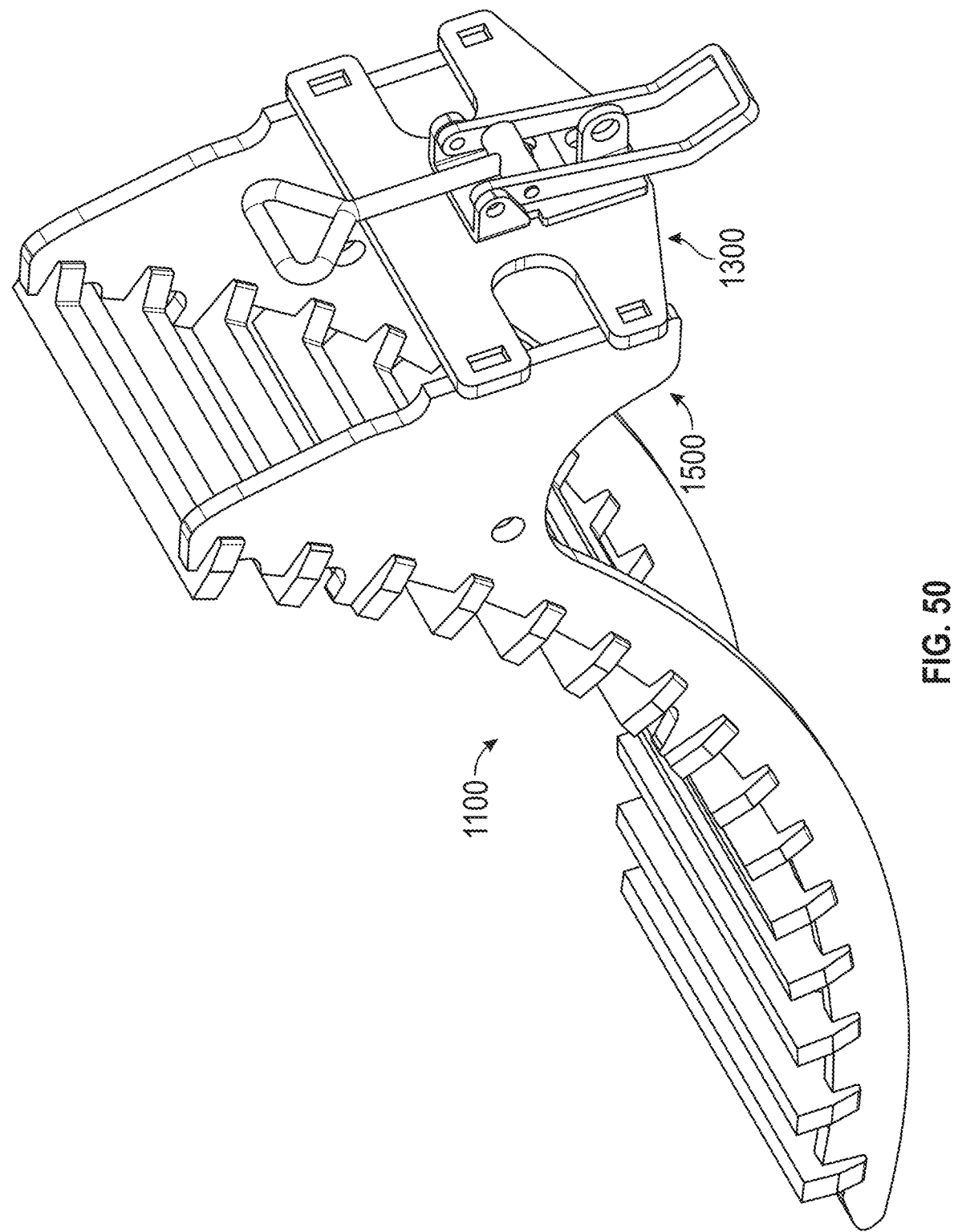
FIG. 50 shows a first perspective view of the over-center latch of FIG. 45 mounted to a solid, extended mounting portion that is included in the left-side quarter wrap (QW) MOG limiter assembly shown in FIG. 38.
Figure 51:
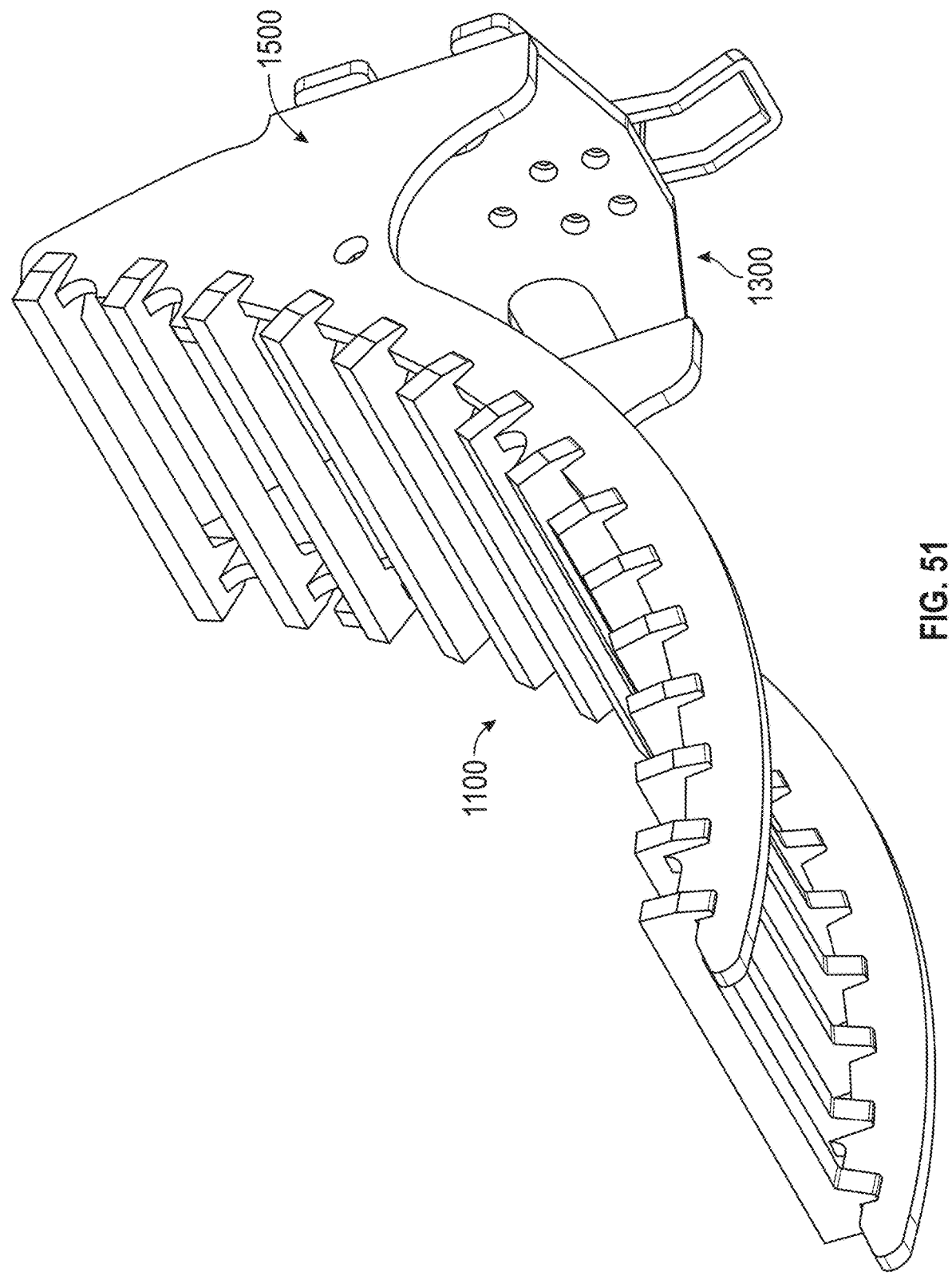
FIG. 51 shows a second perspective view thereof.

In a first example shown in FIGS. 50-51, a left-side quarter wrap (QW) MOG limiter assembly 1100 includes solid, extended mounting portions 1500 that extend downward from the rails 1101. The mounting portions 1500 each have an edge intended to align with the slots 1309 in each side of the body 1301 of the over center latch 1300.

Figure 52:
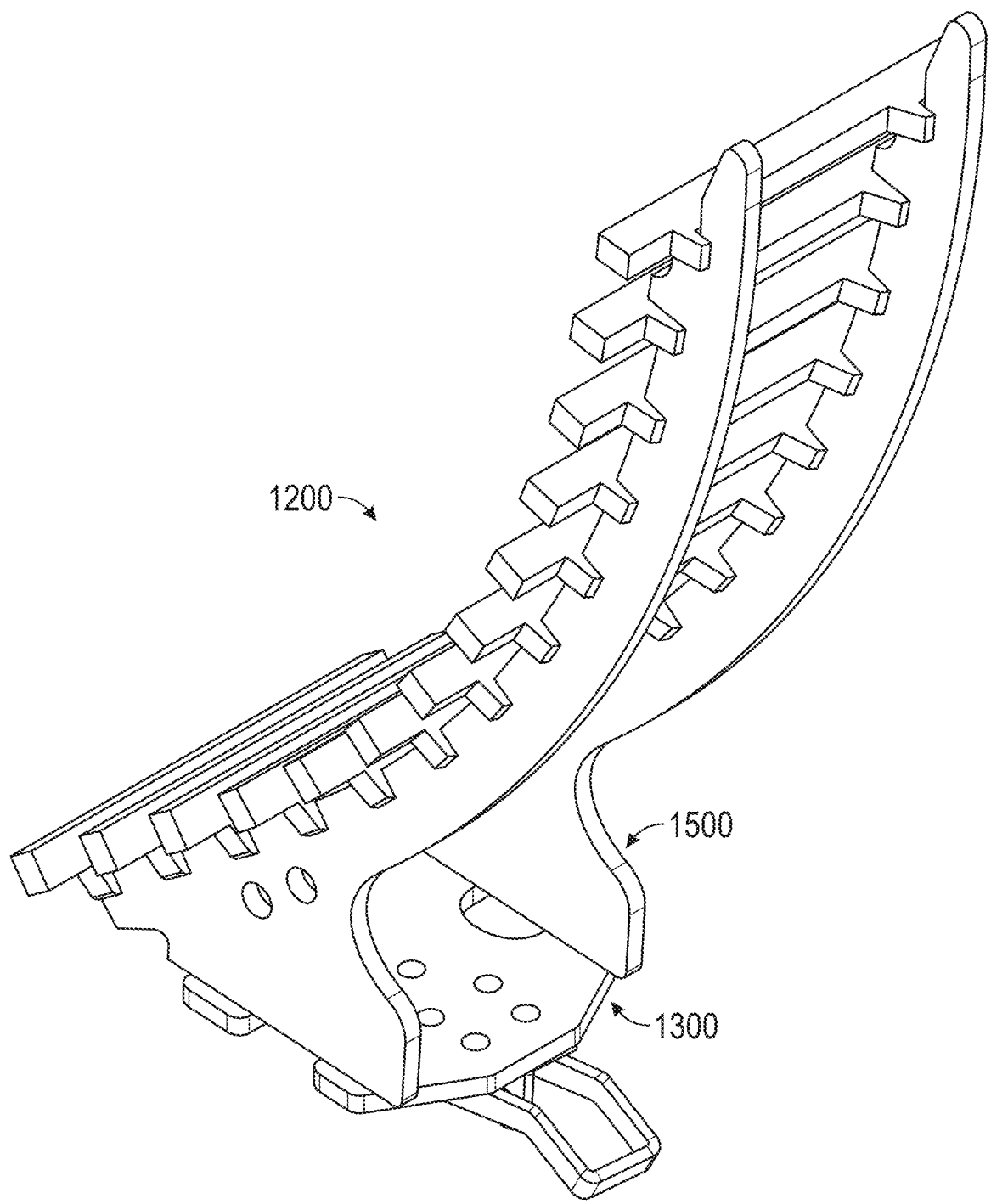
FIG. 52 shows a first perspective view of the over-center latch of FIG. 45 mounted to a solid, extended mounting portion that is included in the right-side quarter wrap (QW) MOG limiter assembly shown in FIG. 42.
Figure 53:
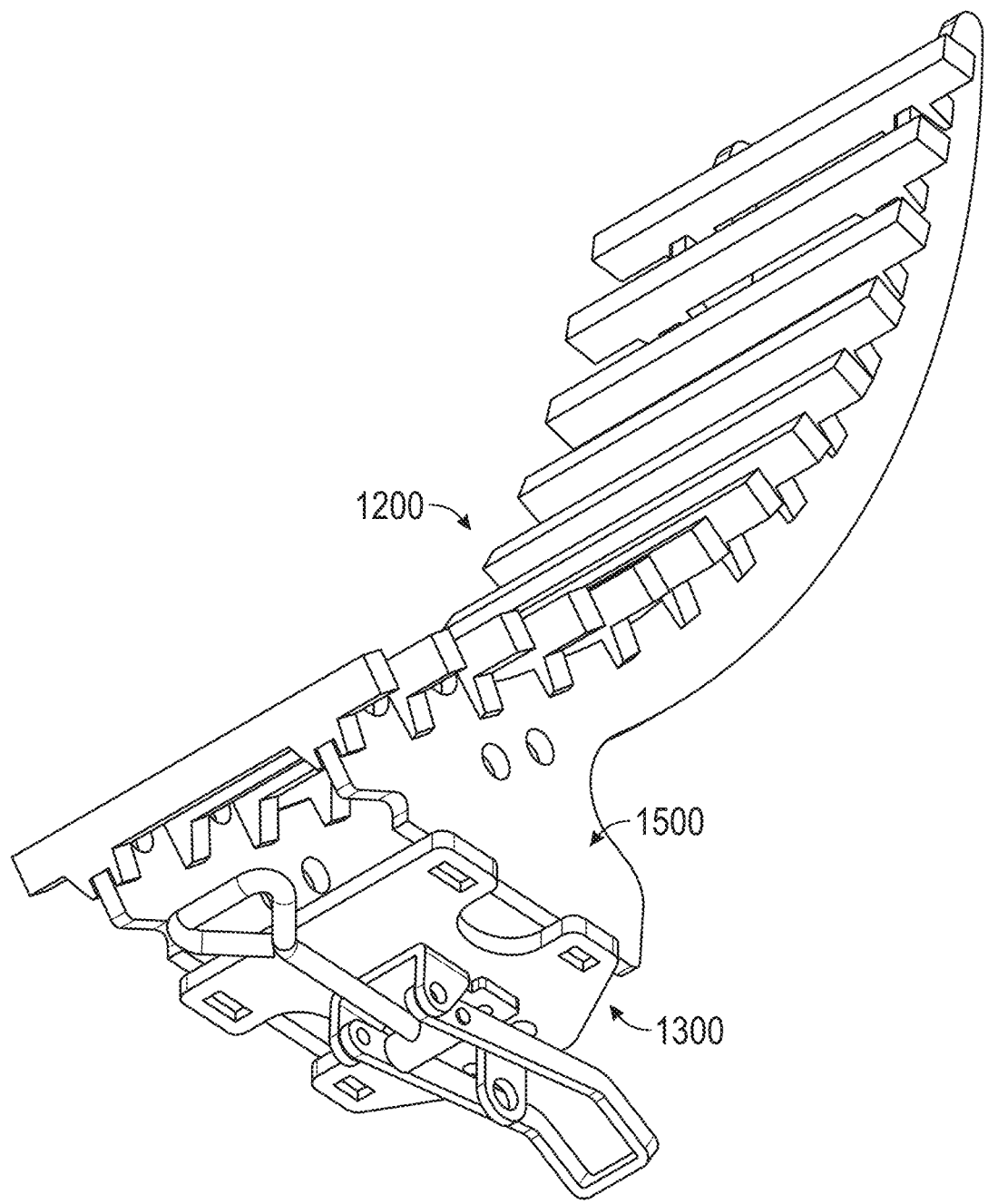
FIG. 53 shows a second perspective view thereof.

Similarly, in a second example shown in FIGS. 52-53, a right-side quarter wrap (QW) MOG limiter assembly 1200 can similarly include the solid, extended mounting portions 1500 that extend downward from the rails 1201. The mounting portions 1500 each have an edge intended to align with the slots 1309 in each side of the body 1301 of the over center latch 1300.

Figure 54:
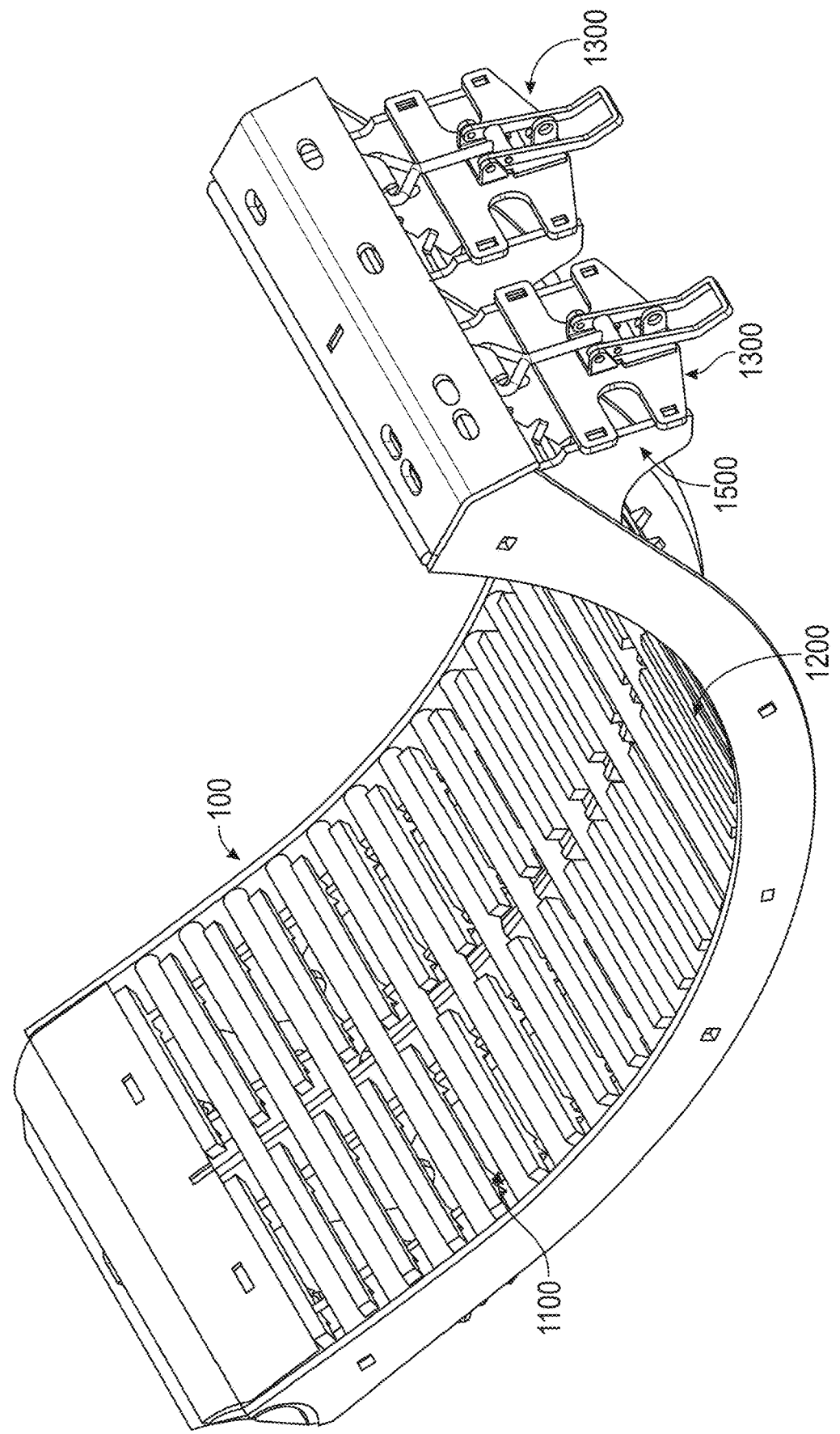
FIG. 54 shows a first perspective view of over-center latches securing two pairs of left-side and right-side MOG limiter assemblies to a concave.
Figure 55:
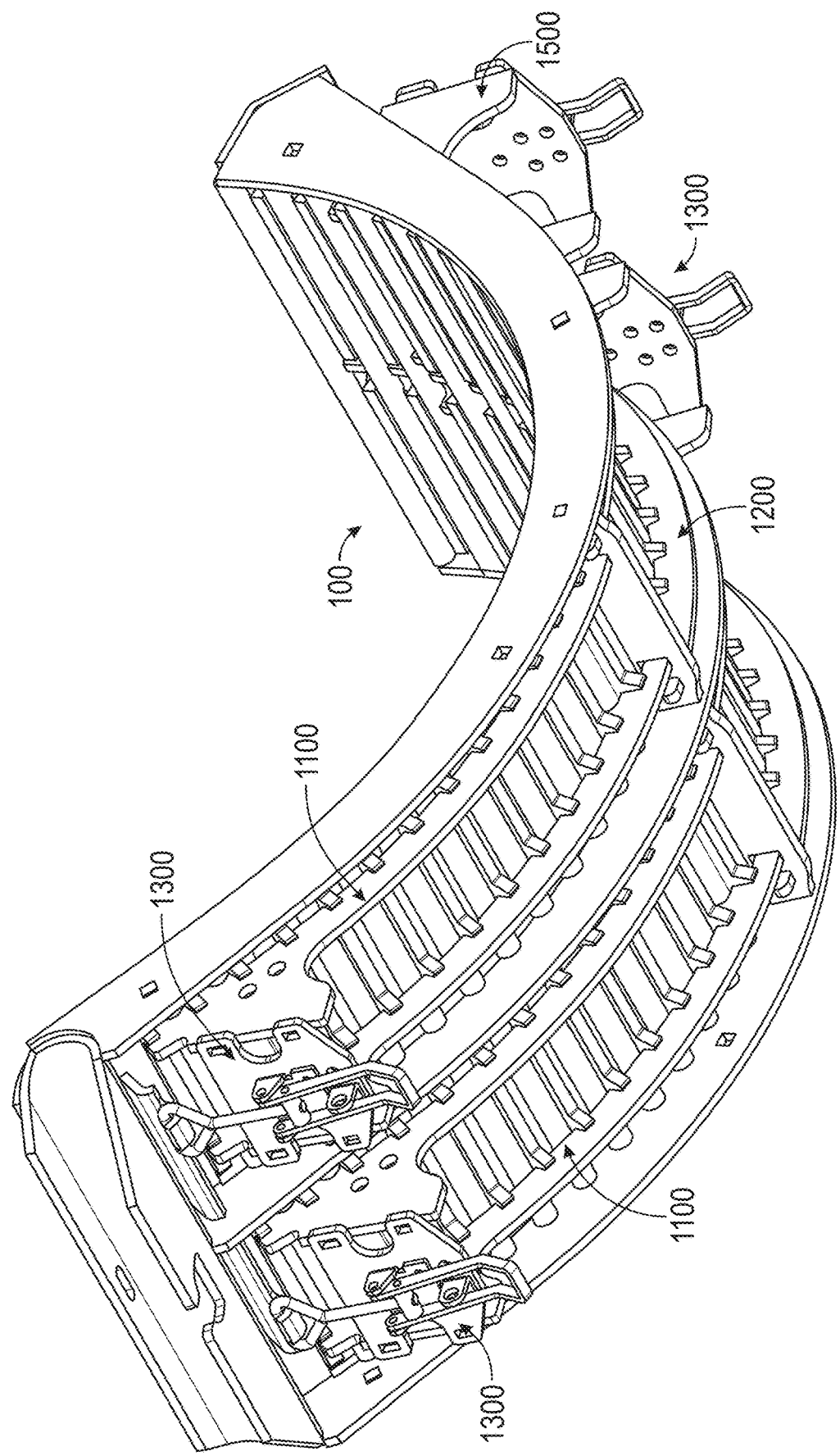
FIG. 55 shows a second perspective view thereof.
Figure 56:
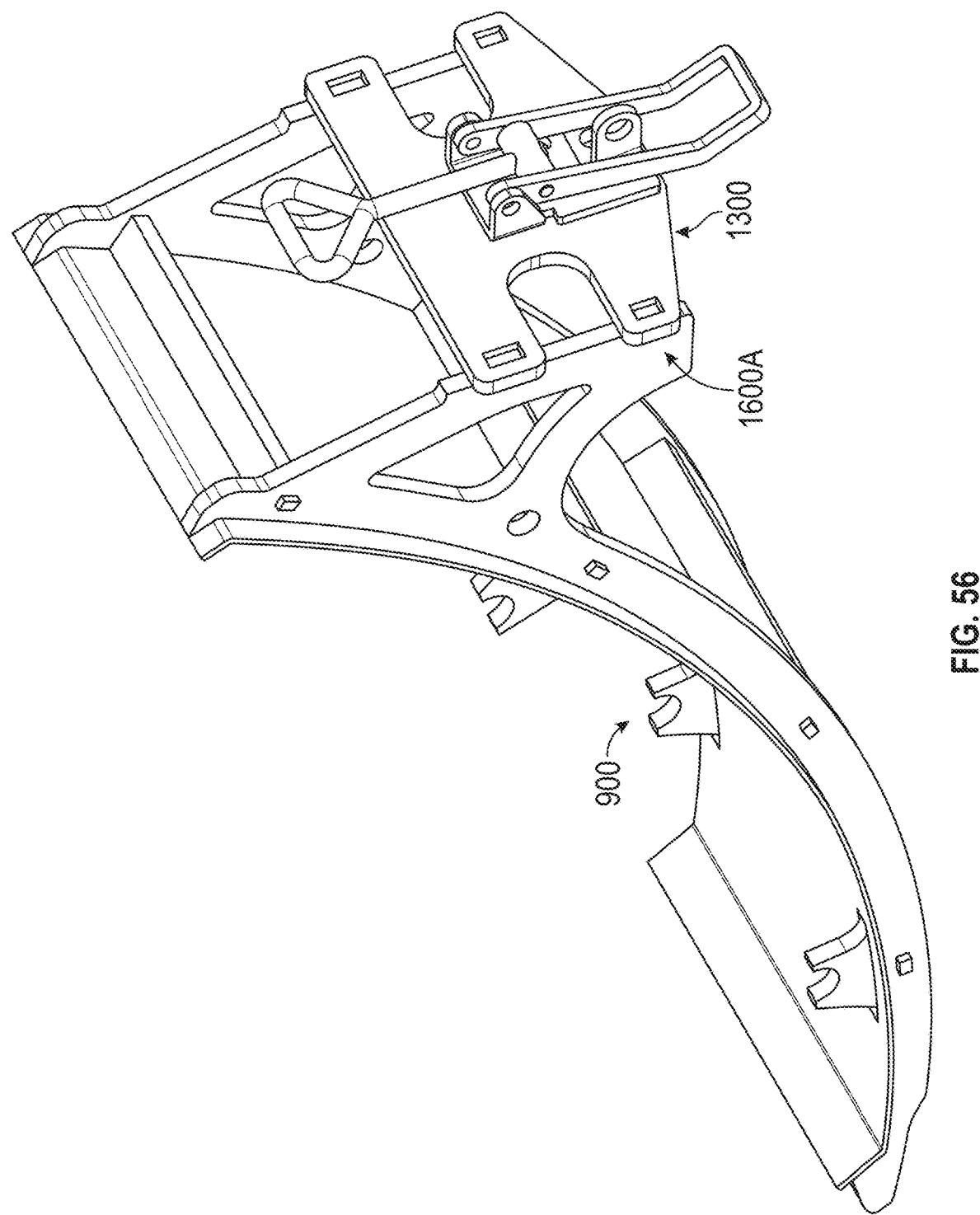
FIG. 56 shows a first perspective view of the over-center latch of FIG. 45 mounted to a triangular mounting portion that is included in the left-side quarter wrap (QW) cover plate assembly shown in FIG. 34.
Figure 57:
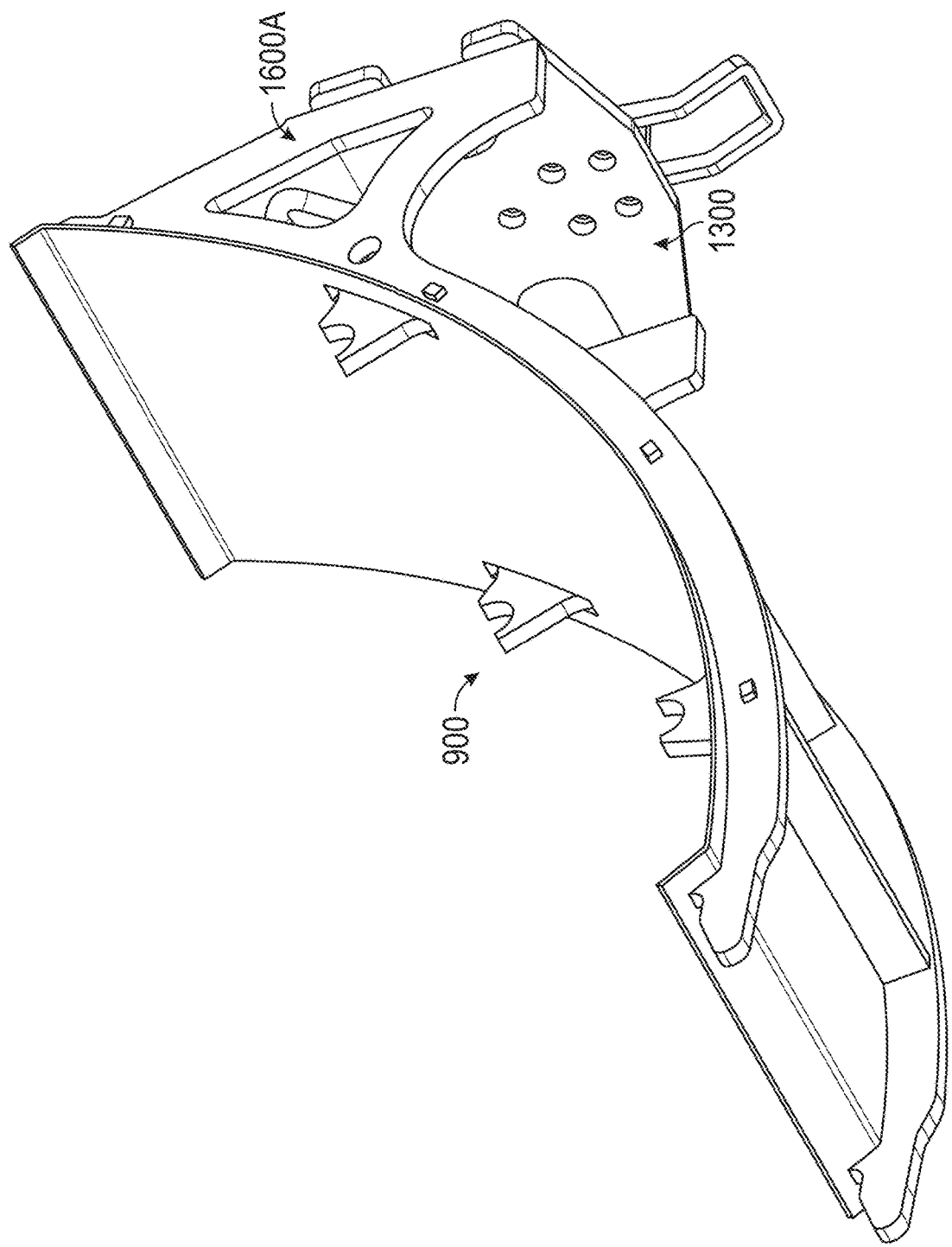
FIG. 57 shows a second perspective view thereof.
Figure 58:
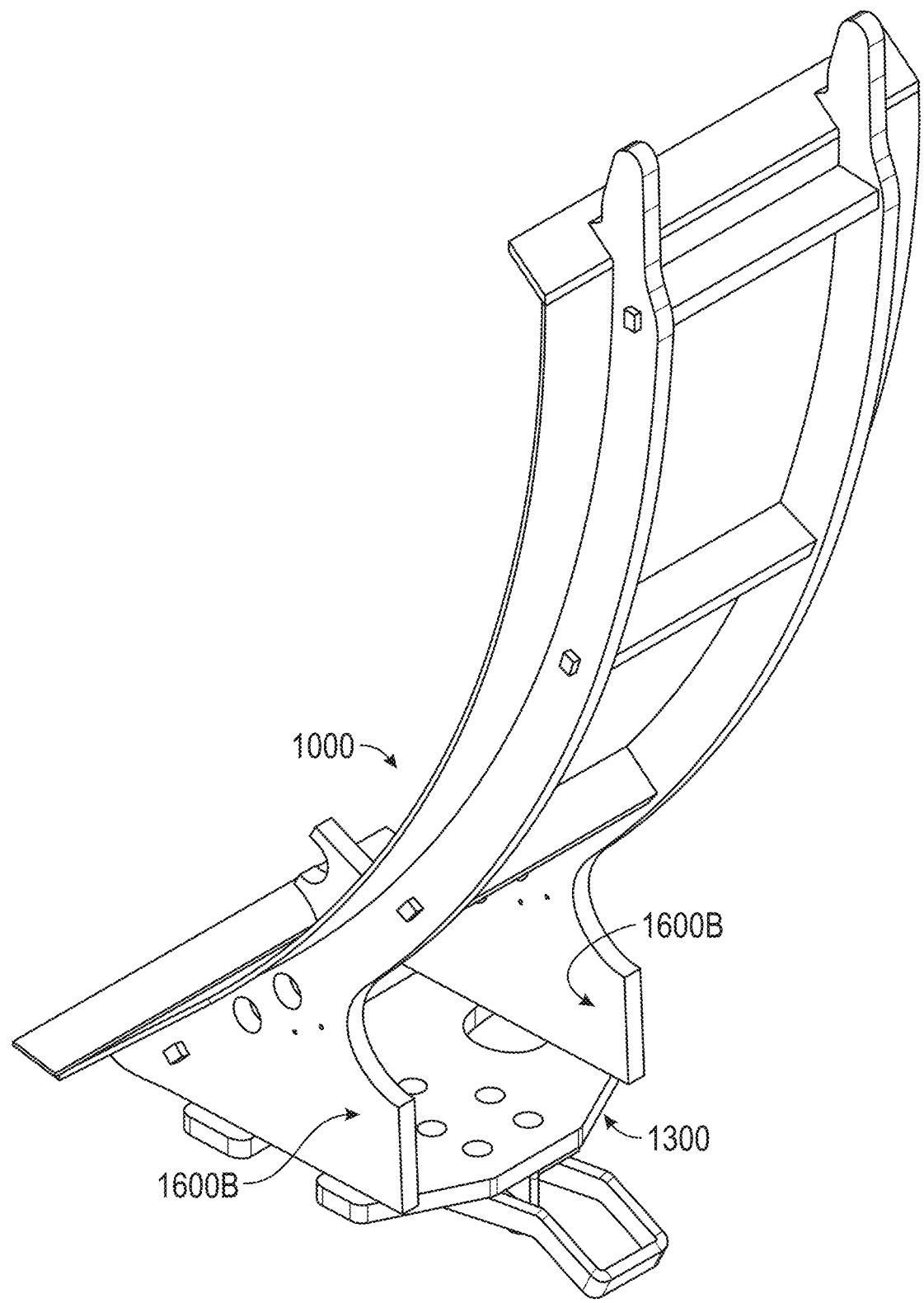
FIG. 58 shows a first perspective view of the over-center latch of FIG. 45 mounted to a solid, extended mounting portion that is included in the right-side quarter wrap (QW) cover plate assembly shown in FIG. 36.
Figure 59:
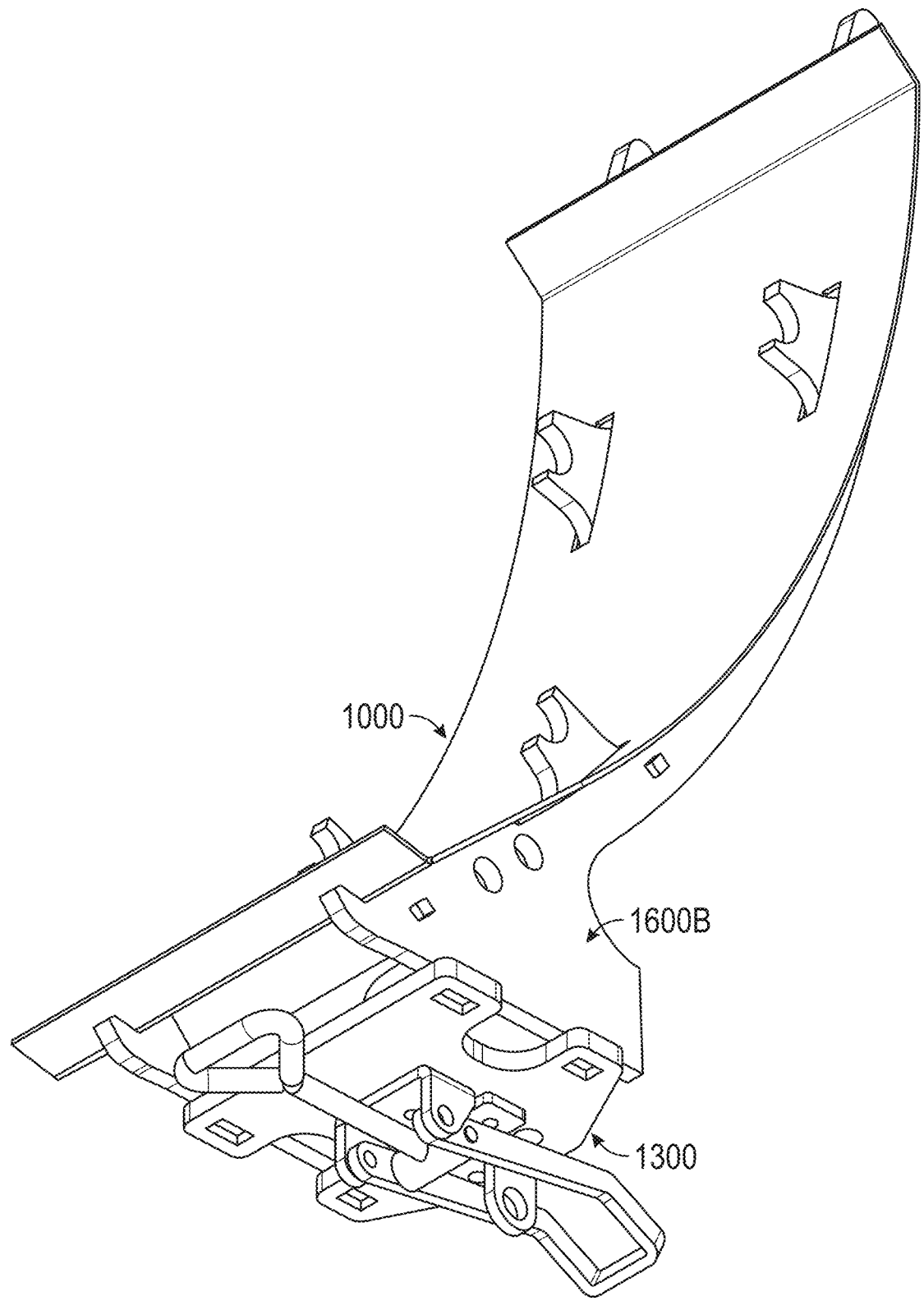
FIG. 59 shows a second perspective view thereof.

When fully assembled, and as shown in FIGS. 54-55 the concave 100 can therefore attach one or more of the left-side quarter wrap (QW) MOG limiter assembly 1100 and one or more of the right-side quarter wrap (QW) MOG limiter assembly 1200 by way of the extended mounting portions 1500, the over center latch 1300, and the mounting assembly 1400.

The over center latch 1300 is also designed so as to be useable with each of the cover plate assemblies 900, 1000, as shown in FIGS. 56-59.

The left-side cover plate assembly 900 can include a triangular mounting portion 1600A that includes a cavity therethrough. Like the solid, extended mounting portion 1500, it is characterized by an edge (the lower leg of the triangle) intended to align with the slots 1309 in each side of the body 1301 of the over center latch 1300.

The right-side cover plate assembly 1000 includes a similar solid, extending mounting portion 1600B to the solid, extended mounting portion 1500 described above.

Figure 60:
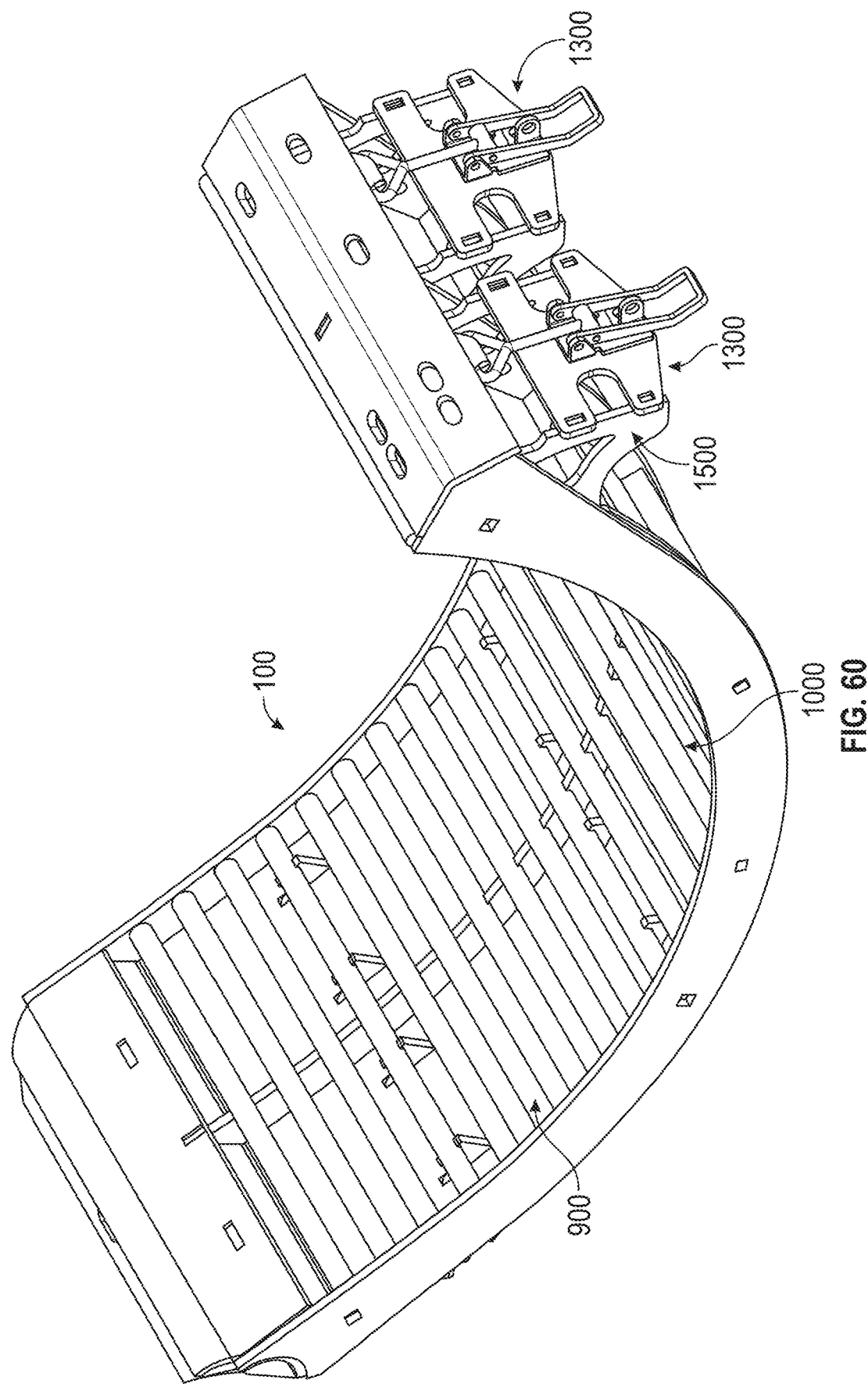
FIG. 60 shows a first perspective view of over-center latches securing two pairs of left-side and right-side MOG limiter assemblies to a concave.
Figure 61:
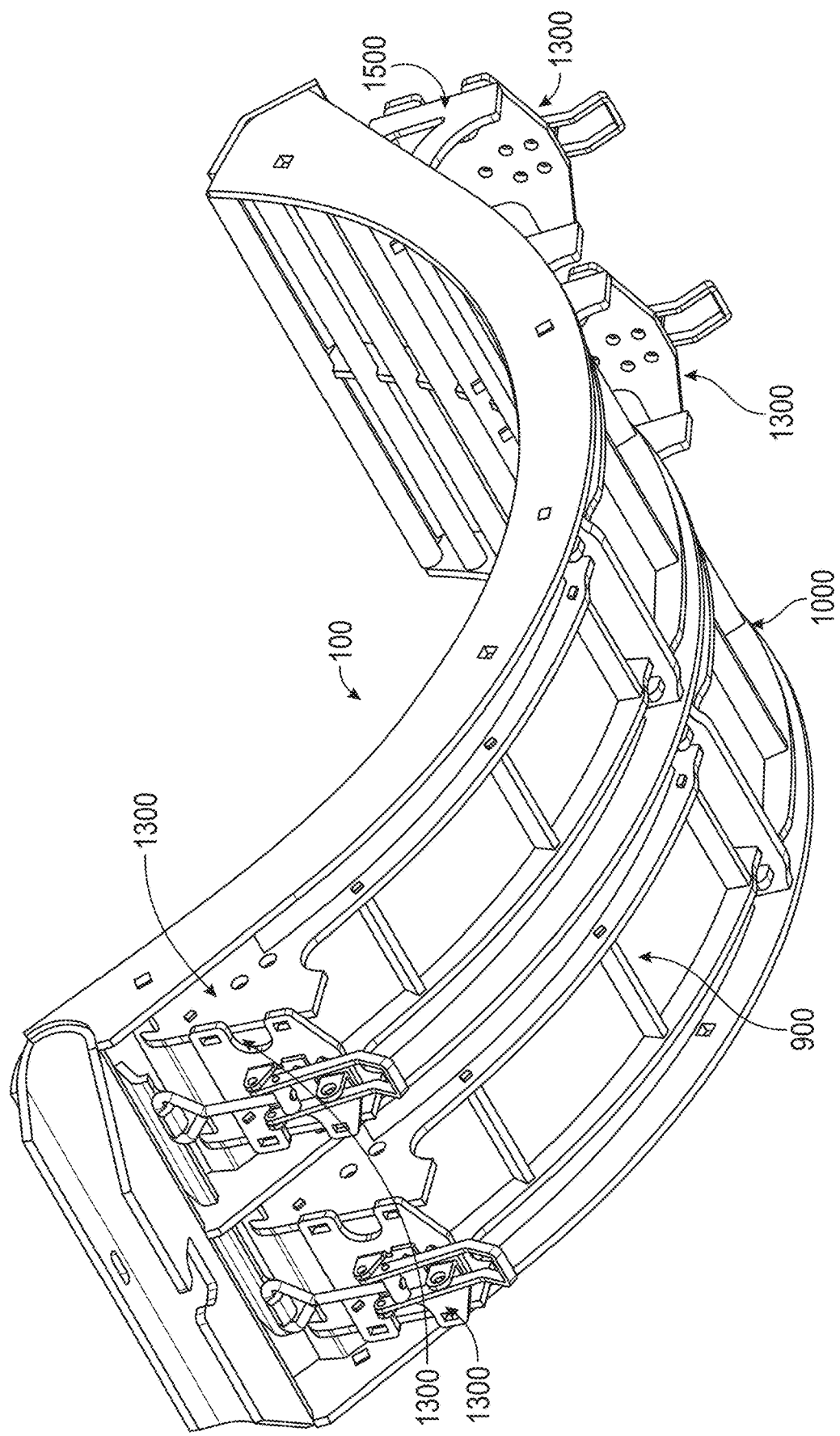
FIG. 61 shows a second perspective view thereof.

When fully assembled, and as shown in FIGS. 60-61 the concave 100 can therefore attach one or more of the left-side quarter wrap (QW) cover plate assembly 900 and one or more of the right-side quarter wrap (QW) cover plate assembly 1000 by way of the extended mounting portions 1500, the over center latch 1300, and the mounting assembly 1400.

It is to be appreciated any one or more of the concaves/concave assemblies 101, 500, 600, 700, 800, mounting assembly 200, cover plates/cover plate assemblies 300, 400, 900, 1000, and MOG limiter assemblies 105, 1100, 1200, can be equipped with sensors and technologies that can automatically adjust based on field conditions and crop type.

It is to be appreciated any one or more of the concaves/concave assemblies 101, 500, 600, 700, 800, mounting assembly 200, cover plates/cover plate assemblies 300, 400, 900, 1000, and MOG limiter assemblies 105, 1100, 1200, can be included in various combinations to form various kits. For example, according to embodiment, the kit includes components selected from the group consisting of: one or more concave, preferably three or more round bar concaves; one or more pairs of left-hand and right-hand cover plates, preferably two or more pairs; one or more pairs of left-hand and right-hand quarter-wrap mog-limiters, preferably six or more pairs; an auger bed bearing holder; a heavy duty stainless steel toggle locking latch used on one or more of the mog limiters and/or cover plates, preferably sixteen of said latches; one or more lynch pins for securing said latches, preferably sixteen of said lynch pins; one or more square wire lock pins, preferably nine or more of said lock pins; and any combination thereof.

From the foregoing, it can be seen that the present disclosure accomplishes at least all of the stated objectives.

EXAMPLES

Figure 21:
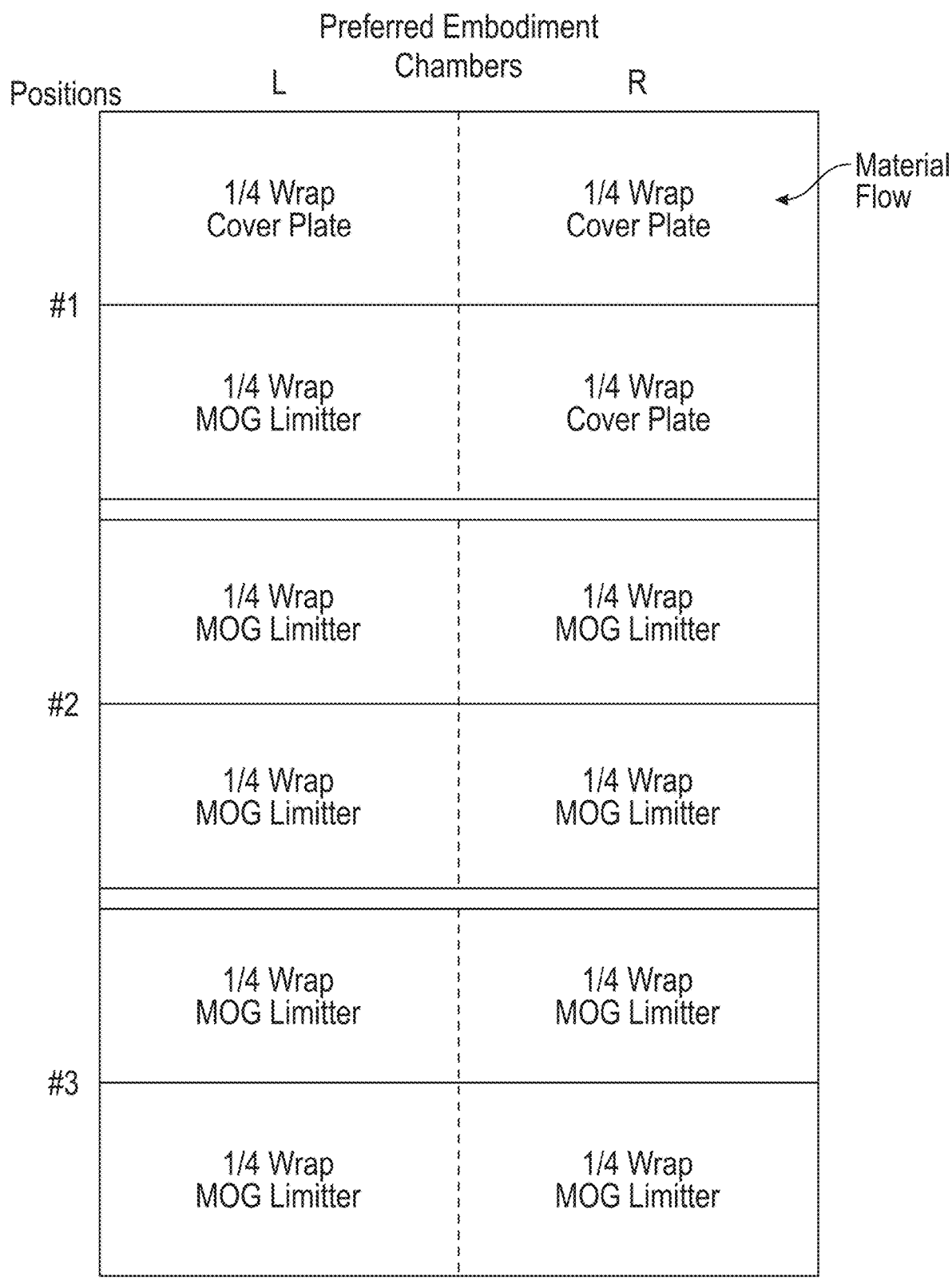
FIG. 21 shows an example configuration that employs a plurality of distinct combinations of concaves with MOG limiters and/or cover plates for the distinct concave position(s) of a combine.

In a preferred embodiment, a number of MOG limiters 105 are employed and strategically positioned on the concaves in positions #1, #2 and #3 within the combine as reflected on FIG. 21. This configuration provides maximum retention of the pods or other small grain within the rotary chamber. Using soybeans as an example, this increased retention at the beginning of the threshing operation allows for increased separation of the bean from the pod and also prevents the pods from dropping through to the cleaning system. In positions #2 and #3, the MOG limiters are solely utilized which allows for the threshed beans to flow out of the rotary chamber while retaining the MOG within the chamber. Experimentation has shown that this configuration is highly effective in opening the soybean pods to free the soybeans in the threshing operation and, thereafter, timely and efficiently exit the threshed soybeans from the rotary chamber to prevent damage or grinding while preventing MOG from flowing out of the chamber and into the cleaning system.

The number of cover plates utilized are directly related to the difficulty in getting the soybean pods to open and release the soybeans in the threshing operation. Therefore, when the farmer is harvesting greener soybeans which have a higher moisture content, retention time within the threshing chamber is increased by the addition of cover plates in position #2 and, depending upon conditions, #3. If the soybean plants being harvested at a particular time are well dried down, then lesser retention time in the threshing chamber is required, so the use of one or more additional MOG limiters in position #1 may allow for maximal efficient soybean harvest.

As a result of the improvements discussed in the present disclosure, the farmer is able to finish harvest of soybeans in an unirrigated field or a field having sandy soil with a combine set-up utilizing two or more MOG limiters in position #1, and then while in the field alter the configuration to match the configuration of FIG. 50 when transitioning to harvest the same variety of soybean plants having the same maturity, but which are greener due to irrigation or other soil factors which afford access to more moisture to the plants or factors which result in the differential moisture content of the plants under harvest.

Experimentation has identified a beneficial set up of a John Deere combine. This set up involves the use of three modified round bar concaves in positions #1, #2 and #3. MOG limiters are readily used on such concave designs and afford the farmer the maximum of adjustability based upon the harvest conditions being faced at the time. As for the Case IH combine, experimentation has identified a beneficial set up whereby the Max Flow concave is utilized on position #1 on which cover plates may be used as required and modified round bar concaves in positions #2 and #3 whereupon MOG limiters may be adjustably employed by the farmer.

Regarding the embodiment shown throughout FIGS. 22-23, the modified MOG limiting concave assembly 100 was tested with wheat, and the wheat farmer was pleased with the results utilizing a plate on both the upper section and lower section of the 1st column with MOG Limiters in the remaining positions. The modified MOG limiting concave assembly 100 utilizes a ⅝" round bar having a ¾" gap in between; and a ⅜" wide MOG Limiter bar.

Regarding the embodiment shown throughout FIGS. 24-25, the modified MOG limiting concave assembly 200 utilizes alternating ⅝" round bars with ⅜" square bars, having a ⅛" gap with the top of the square bar positioned at an elevation ¼" above the top point of the round bars.

Regarding the embodiment shown throughout FIGS. 26-27, the modified MOG limiting concave assembly 300 utilizes a ¼" round bar having a ⅛" gap; and a grouping of ¼" square bars having a 1⅛" gap; and further having a ⅛" elevation of the top of the square bars above top elevation point of the round bars.

Regarding the embodiment shown throughout FIGS. 28-29, the modified MOG limiting concave assembly 400 utilizes a ⅝" round bar having a ¾" gap between each; every 3rd bar is a ⅜" square bar having a ⅛" gap on each side in relation to the round bar; and further having a ⅛" elevation of the top of the square bars above top elevation point of the round bars.

Comparative field data was gathered in a first field for the harvest of soybeans utilizing the following assemblies: the (1) OEM-JD S670 35' Conventional 3" and (2) the Calmer-JD S680 40' draper, as shown in Table 1:

| Sample Area | Loose Beans | Pods | x3 Beans/ Pod | Total | Loss per Sq Ft | BU/AC |
|---|---|---|---|---|---|---|
| 35 sq ft | 168 | 21 | 63 | 231.00 | 6.60 | 1.65 |
| 35 sq ft | 114 | 0 | 0 | 114.00 | 3.26 | 0.81 |
| | | | | Difference | 3.34 | 0.84 |
| Average BU/AC Loss with OEM ⅝"gap Concaves: | | | | | 1.65 | |
| Average BU/AC Loss with Calmer ¾"gap Concaves: | | | | | 0.81 | |
| Calmer BU/AC Advantage: | | | | | 0.84 | 50.6% |

Comparative field data was gathered in a second field for the harvest of soybeans utilizing the following assemblies: the (1) OEM-JD 9670 30' Head and (2) the Calmer—JD S680 40' draper, as shown in Table 2:

| Sample Area | Loose Beans | Pods | x3 Beans/ Pod | Total | Loss per Sq Ft | BU/AC |
|---|---|---|---|---|---|---|
| 30 sq ft | 165 | 25 | 75 | 240.00 | 8.00 | 2.00 |
| 30 sq ft | 113 | 7 | 21 | 134.00 | 4.47 | 1.12 |
| | | | | Difference | 3.53 | 0.88 |
| Average BU/AC Loss with OEM ⅝"gap Concaves: | | | | | 2.00 | |
| Average BU/AC Loss with Calmer ¾"gap Concaves: | | | | | 1.12 | |
| Calmer BU/AC Advantage: | | | | | 0.88 | 44.2% |

Comparative field data was gathered in a third field for the harvest of soybeans utilizing the following assemblies: the (1) OEM—JD 9670 30' Head and (2) the Calmer—JD S680 40' draper, as shown in Table 3:

| Sample Area | Loose Beans | Pods | x3 Beans/ Pod | Total | Loss per Sq Ft | BU/AC |
|---|---|---|---|---|---|---|
| 30 sq ft | 98 | 8 | 24 | 122.00 | 4.07 | 1.02 |
| 40 sq ft | 130 | 0 | 0 | 130.00 | 3.25 | 0.81 |
| | | | | Difference | | 0.82 | 20.1% |
| Average BU/AC Loss with OEM ⅝"gap Concaves: | | | | | 1.02 | |
| Average BU/AC Loss with Calmer ¾"gap Concaves: | | | | | 0.81 | |
| Calmer BU/AC Advantage: | | | | | 0.20 | 20.1% |

The average results from the three counts are shown in Table 4:

| | |
|---|---|
| Average Soybean Difference: | 2.56 |
| Average BU/AC Loss with OEM 5/8"gap Concaves with no inserts: | 1.56 |
| Average BU/AC Loss with Calmer 3/4"gap Concaves with cover plates and MOG limiters: | 0.91 |
| Advantage Calmer | 0.64 41.2% |

A high performance upgrade kit that reduces grain loss during harvest was compared across corn and soybeans, as shown in Table 5:

| Crop | # Samples | Grain Loss | BU/AC |
|---|---|---|---|
| Corn | 1 Sample with JD Rotary Combine | 51% | 0.9 |
| Corn | 2 Samples with CASE Flagship | 47.1% | 1.76 |
| Soybeans | 2 Samples with JD Rotary Combine | 41.2% | .64 |

Another such high performance upgrade kit that reduces grain loss during harvest was compared across different types of combines, as shown in Table 6:

| 3 Combine Comparison | CASE Flagship | CASE Legacy | JD S-Series |
|---|---|---|---|
| Kernels (BU/AC) with the kits described herein installed | 2.90 | 1.57 | 0.73 |
| | 1.45 | 0.8 | 0.36 |

Figure 45:
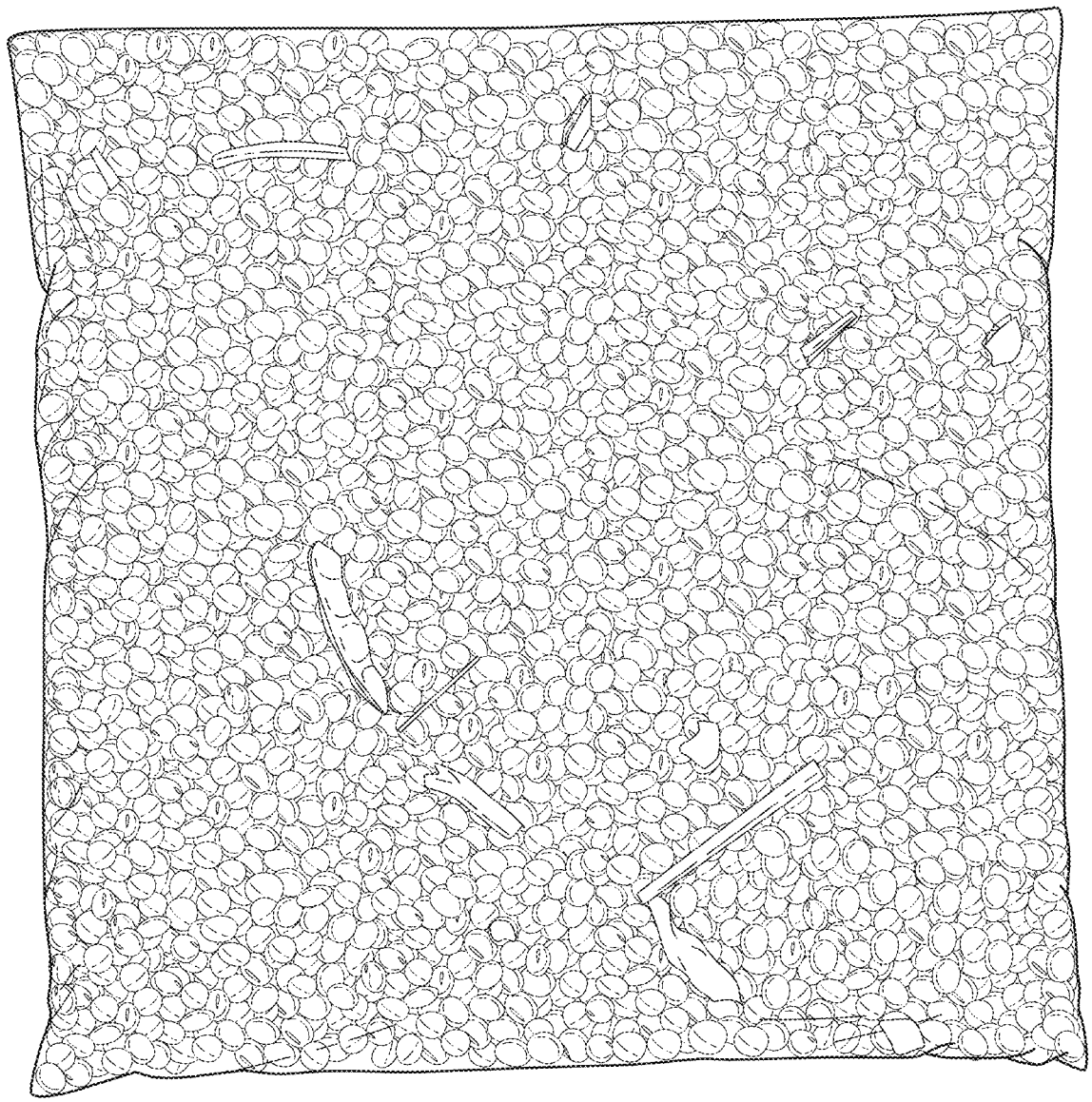
FIG. 45 shows the experimental results for the harvest of soybeans using the quarter wrap (QW) MOG limiter assemblies and/or quarter wrap (QW) cover plate assemblies described above.

FIG. 45 shows soybean pods that were harvested using a high performance upgrade kit that reduces grain loss during harvest.

Another comparison among residue data in a Calmer BT Super Chopper vs. JD RowMax is shown in Table 7:

| | "Small % <4"" long" | "Medium % 4-8"" long" | "Large % >8"" long" |
|---|---|---|---|
| 6 rows of Calmer 12 Blade Choppers | 39.1% | 31.7% | 29.3% |
| 6 rows of John Deere RowMax | 18.4% | 30.7% | 50.9% |

Residue was separated into categories; each category was weighed. Weights are presented as a % of total weight for residue produced.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 8

| | List of Reference Characters |
|---|---|
| 100 | assembly |
| 101 | concave |
| 102 | upper concave connector |
| 102A | upper concave connector (opposite side) |
| 103 | lower concave connector |
| 104 | insert slot |
| 105 | MOG limiter |
| 106 | insert |
| 107 | rail support |
| 108 | mounting plate |
| 109 | notch |
| 110 | concave crossbar |
| 111 | hinge point |
| 112 | bolts |
| 200 | mounting plate |
| 201 | threaded post |
| 202 | J-hook, threaded at one end |
| 203 | hexagonal sleeve (female threaded) |
| 204 | lever |
| 300 | left-side cover |
| 301 | curvilinear plate |
| 302 | first arced support |
| 303 | second arced support |
| 304 | slot |
| 305 | mounting plate |
| 306 | bridge support |
| 400 | right-side cover |
| 401 | curvilinear plate |
| 402 | first arced support |
| 403 | second arced support |
| 404 | slot |
| 405 | mounting plate |
| 406 | bridge support |
| 500 | first embodiment of a modified concave |
| 501 | an enhanced side flow rail |
| 502 | a C-clamp end |
| 503 | first-end round bar drive |
| 504 | second end plate |
| 505 | quarter wrap center catch |
| 506 | an enhanced flow center rail |
| 507 | round bars |
| 508 | left over center catch |
| 509 | right over center catch |
| 600 | second embodiment of a modified concave |
| 601 | an enhanced side flow rail |
| 602 | a C-clamp end |
| 603 | first-end round bar drive |
| 604 | second end plate |
| 605 | quarter wrap center catch |
| 606 | an enhanced flow center rail |
| 607 | rub bars |
| 608 | round bars |
| 609 | left over center catch |
| 610 | right over center catch |
| 700 | third embodiment of a modified concave |
| 701 | an enhanced side flow rail |
| 702 | a C-clamp end |
| 703 | first-end round bar drive |
| 704 | second end plate |
| 705 | quarter wrap center catch |
| 706 | an enhanced flow center rail |
| 707 | rub bars |
| 708 | round bars |
| 709 | left over center catch |
| 710 | right over center catch |
| 800 | fourth embodiment of a modified concave |
| 801 | an enhanced side flow rail |

TABLE 8-continued

| | List of Reference Characters |
|---|---|
| 802 | a C-clamp end |
| 803 | first-end round bar drive |
| 804 | second end plate |
| 805 | quarter wrap center catch |
| 806 | an enhanced flow center rail |
| 807 | rub bars |
| 808 | round bars |
| 809 | left over center catch |
| 810 | right over center catch |
| 900 | left-side quarter wrap (QW) cover plate assembly |
| 901 | left-side quarter wrap cover plate |
| 902 | left-side quarter wrap cover plate support |
| 903 | left-side cover plate over center handle anchor plate |
| 904 | left-side quarter wrap cover plate rail |
| 905 | J-bolt |
| 906 | threaded long-steel coupling nut |
| 907 | threaded long hex head screw |
| 908 | threaded nylon insert lock nut |
| 909 | steel washer |
| 910 | CMF over center handle |
| 1000 | right-side quarter wrap (QW) cover plate assembly |
| 1001 | right-side quarter wrap cover plate |
| 1002 | right-side quarter wrap cover plate support |
| 1003 | right-side cover plate over center handle anchor plate |
| 1004 | right-side quarter wrap cover plate rail |
| 1005 | J-bolt |
| 1006 | threaded long-steel coupling nut |
| 1007 | threaded long hex head screw |
| 1008 | threaded nylon insert lock nut |
| 1009 | steel washer |
| 1010 | CMF over center handle |
| 1100 | left-side quarter wrap (QW) MOG limiter assembly |
| 1101 | left-side quarter wrap MOG limiting rail |
| 1102 | left-side MOG limiting rub bar |
| 1103 | left-side ML over center handle anchor plate |
| 1104 | J bolt |
| 1105 | threaded long steel coupling nuts |
| 1106 | threaded long hex head screw |
| 1107 | threaded nylon insert locknut |
| 1108 | steel washer |
| 1109 | CMF over center handle |
| 1200 | right-side quarter wrap (QW) MOG limiter assembly |
| 1201 | right-side quarter wrap MOG limiting rail |
| 1202 | right-side MOG limiting rub bar |
| 1203 | right-side ML over center handle anchor plate |
| 1204 | J bolt |
| 1205 | threaded long steel coupling nuts |
| 1206 | threaded long hex head screw |
| 1207 | threaded nylon insert locknut |
| 1208 | steel washer |
| 1209 | CMF over center handle |
| 1300 | center over latch |
| 1301 | base plate (e.g., pentagonal body) |
| 1302 | handle |
| 1303 | padlock hole |
| 1304 | latch arm |
| 1305 | loop |
| 1306 | center pin |
| 1307 | ear |
| 1308 | slot |
| 1309 | hole |
| 1400 | mounting assembly |
| 1401 | first over center catch |
| 1402 | second over center catch |
| 1403 | adjacent plate |
| 1404 | end plate |
| 1500 | solid, extended mounting portion |
| 1600A | triangular mounting portion |
| 1600B | solid, extended mounting portion |

GLOSSARY

Unless defined otherwise, all technical and scientific terms used above have the same meaning as commonly understood by one of ordinary skill in the art to which embodiments of the present disclosure pertain.

The terms "a," "an," and "the" include both singular and plural referents.

The term "or" is synonymous with "and/or" and means any one member or combination of members of a particular list.

As used herein, the term "exemplary" refers to an example, an instance, or an illustration, and does not indicate a most preferred embodiment unless otherwise stated.

The term "about" as used herein refers to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variables, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "invention" is not intended to refer to any single embodiment of the particular invention but encompass all possible embodiments as described in the specification and the claims. The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

What is claimed is:

1. An over-center latch for attaching a cover plate or MOG limiter to an outer surface of a concave for a combine comprising:
    a pentagonal base plate formed from steel including a pair of ears protruding therefrom;
    a lever with a loop at one end that is configured to attach to a catch plate, wherein an end opposite the one end with a loop is operatively connected to the pentagonal base plate via a center pin that allows the lever to rotate with respect to a handle, in which the handle is connected to the pair of ears;
    wherein either the handle or the lever can be pulled into a vertical position;
    wherein the over-center latch secures the cover plate or MOG limiter to the outer surface of the concave.

2. The over-center latch of claim 1, further comprising a padlock hole protruding from the pentagonal base plate.

3. The over-center latch of claim 1, further comprising a threaded screw at the end of the lever that attaches to the center pin.

4. The over-center latch of claim 3, further comprising a locking nut that can attach the threaded screw at the end of the lever to the center pin.

* * * * *